United States Patent [19]
Wakabayashi et al.

[11] Patent Number: 5,504,669
[45] Date of Patent: Apr. 2, 1996

[54] INFORMATION PROCESSING DEVICE AND ACCESSORY CONTROL DEVICE

[75] Inventors: Kenichi Wakabayashi; Chitoshi Takayama; Tadashi Shiozaki, all of Suwa, Japan

[73] Assignee: Seiko Epson Corporation, Japan

[21] Appl. No.: 911,558

[22] Filed: Jul. 7, 1992

[30] Foreign Application Priority Data

Oct. 23, 1991 [JP] Japan ................................. 3-305457

[51] Int. Cl.⁶ .................................................. G06F 19/00
[52] U.S. Cl. ........................ 364/131; 395/110; 395/115
[58] Field of Search ................................. 364/131–136, 364/DIG. 1 MS File, DIG. 2 MS File; 395/110, 112, 114, 115, 116, 164, 165, 166, 162, 163, 828, 829, 833, 835, 892, 893, 894, 853, 854

[56] References Cited

U.S. PATENT DOCUMENTS

| | | | |
|---|---|---|---|
| 4,441,164 | 4/1984 | Pavan et al. | 364/900 |
| 4,953,103 | 8/1990 | Suzuki | 395/114 X |
| 5,038,025 | 8/1991 | Kodera | 235/492 |
| 5,075,874 | 12/1991 | Steeves et al. | 364/DIG. 2 |
| 5,137,379 | 8/1992 | Ukai et al | 395/110 X |
| 5,142,614 | 8/1992 | Schneider et al. | 395/115 |
| 5,195,176 | 3/1993 | Lung | 395/110 X |
| 5,208,732 | 5/1993 | Baudoin et al. | 361/386 |

*Primary Examiner*—Joseph Ruggiero

[57] ABSTRACT

A system has an electronic device, such as a printer, and an accessory control device, such as a cartridge, that couples physically and electrically to the electronic device. The electronic device includes a microprocessor, memory, a connector adapted to couple with the accessory device, a data output means, and a data output notification means. The accessory device includes a microprocessor, memory, an interrupt request receiving means, a notification cancellation means and a data fetch means.

The present invention transfers data efficiently between an electronic device and an accessory control device in cases in which information processing is performed by installing the accessory control device in the electronic device.

In operation, an electronic control device of printer that is transferring data, reflects the data to be transferred in the lower 8 bits of the address signal line (CAB) and outputs it. Data corresponding to the address specified by this address is read from a ROM and held in latches. Holding of the data is announced by interrupt request signal AMDINTO or the signal EWRDY. When the microprocessor of the cartridge, receives this notification and reads the data held in the latches the transfer of data from the electronic device is complete.

31 Claims, 29 Drawing Sheets

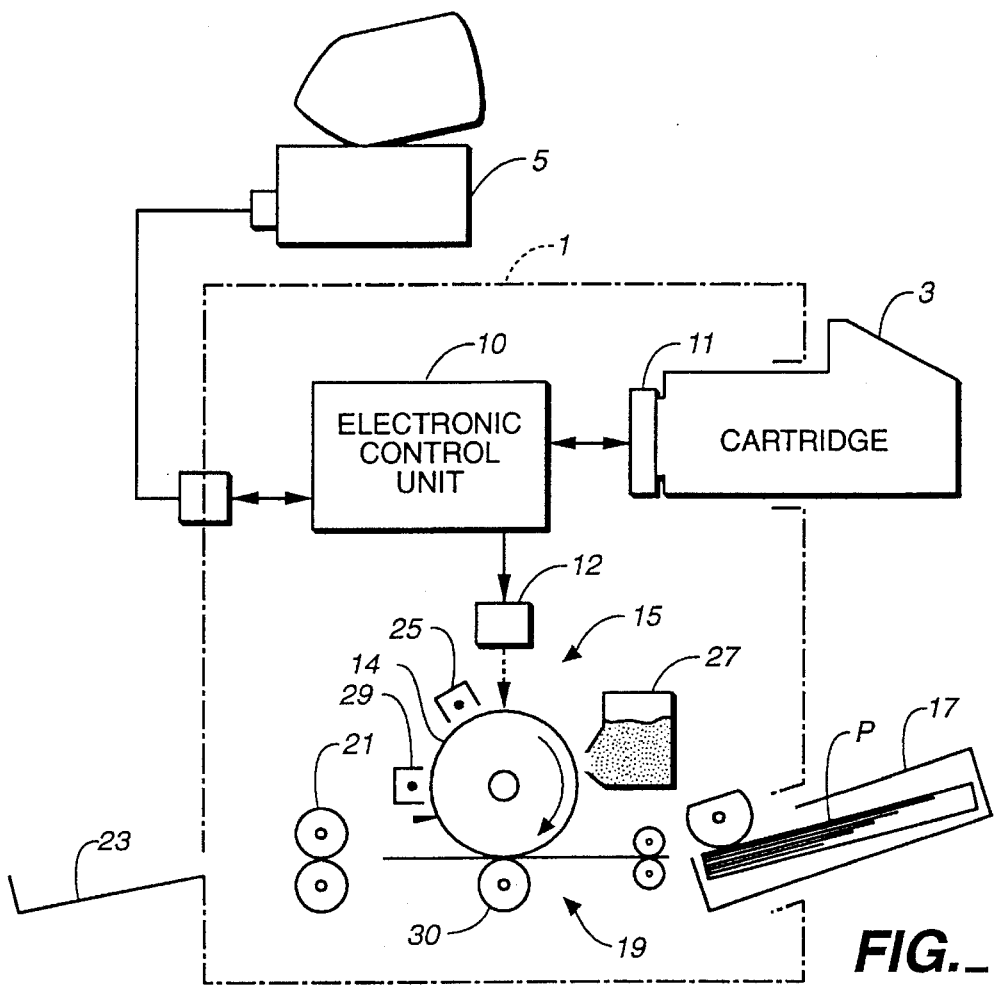
FIG._1
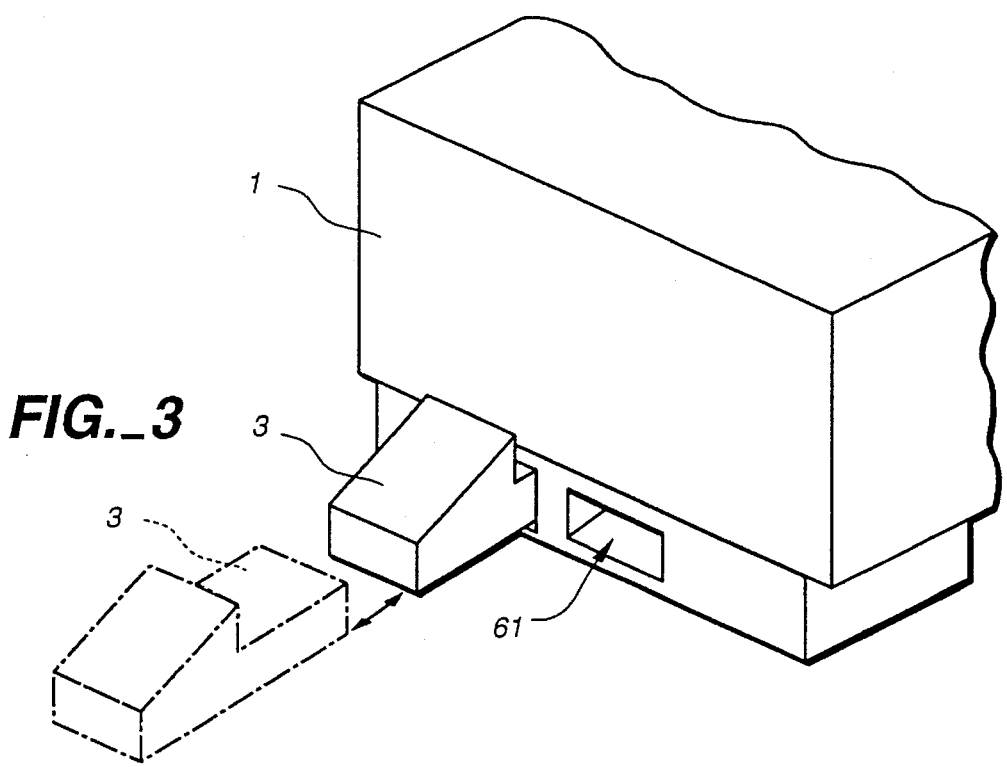
FIG._3

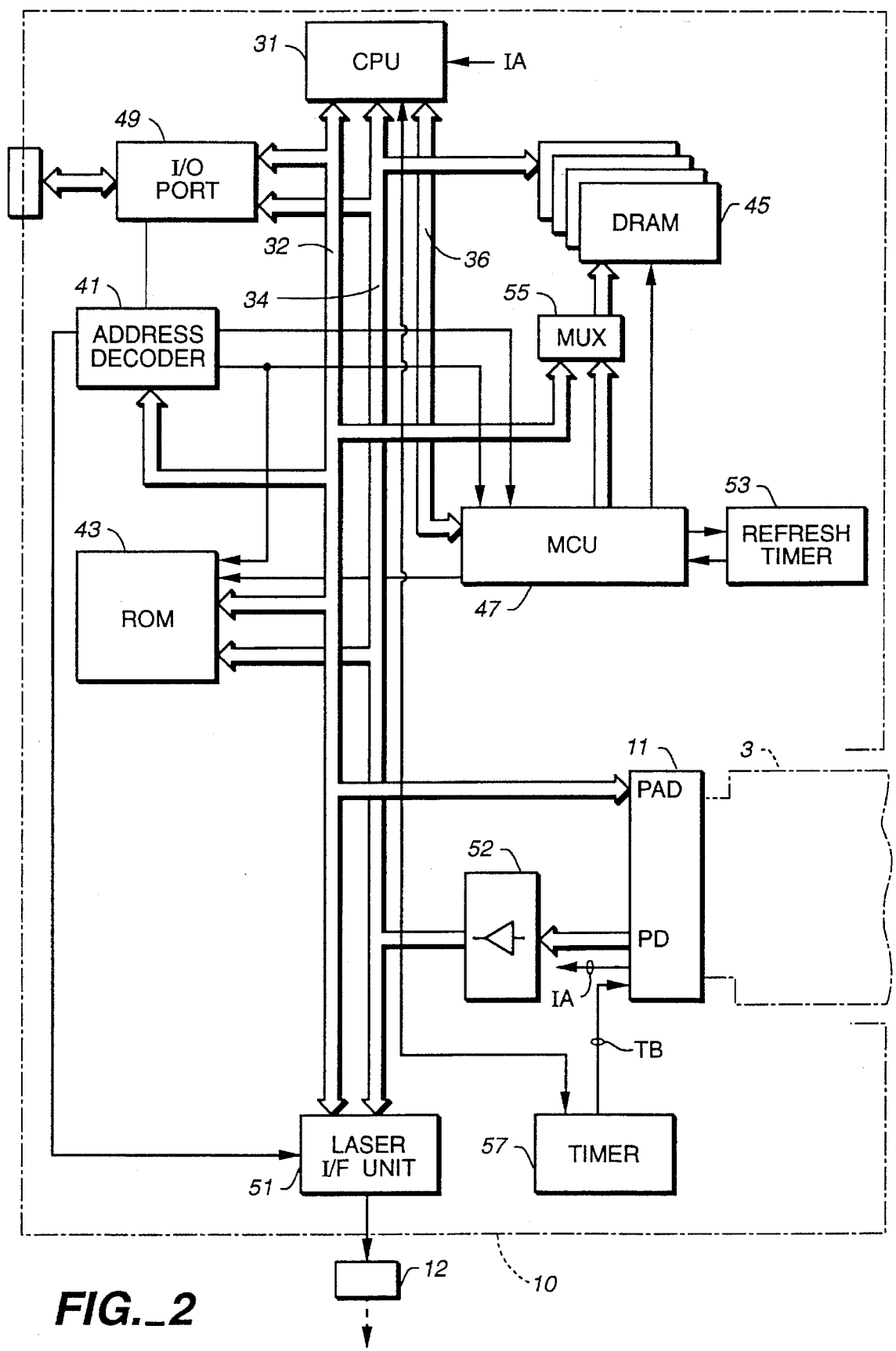
FIG._2

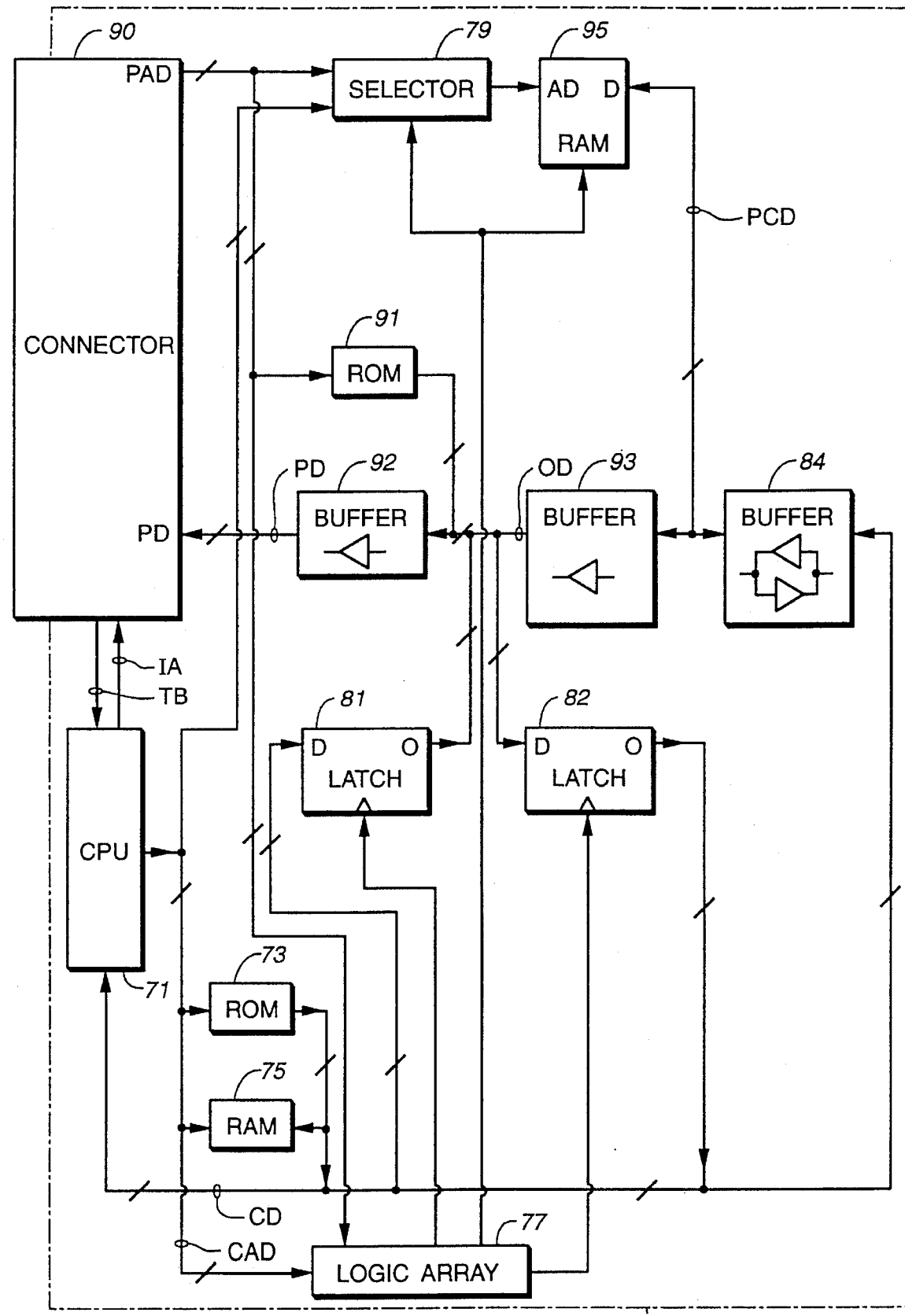
FIG._4

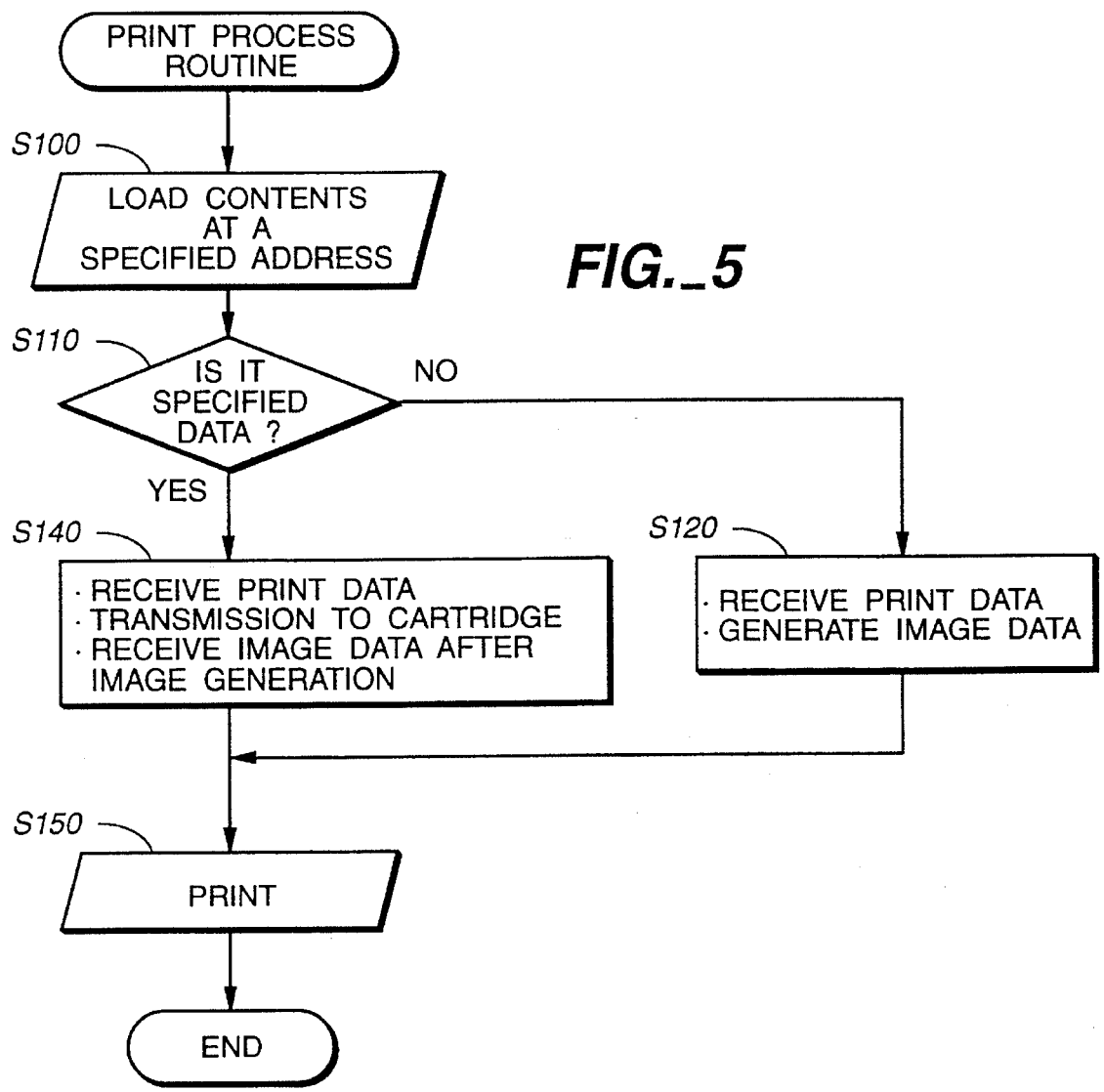
FIG._5
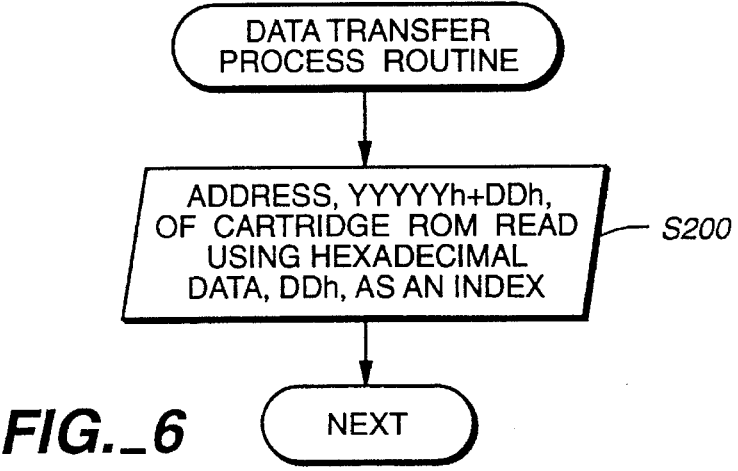
FIG._6

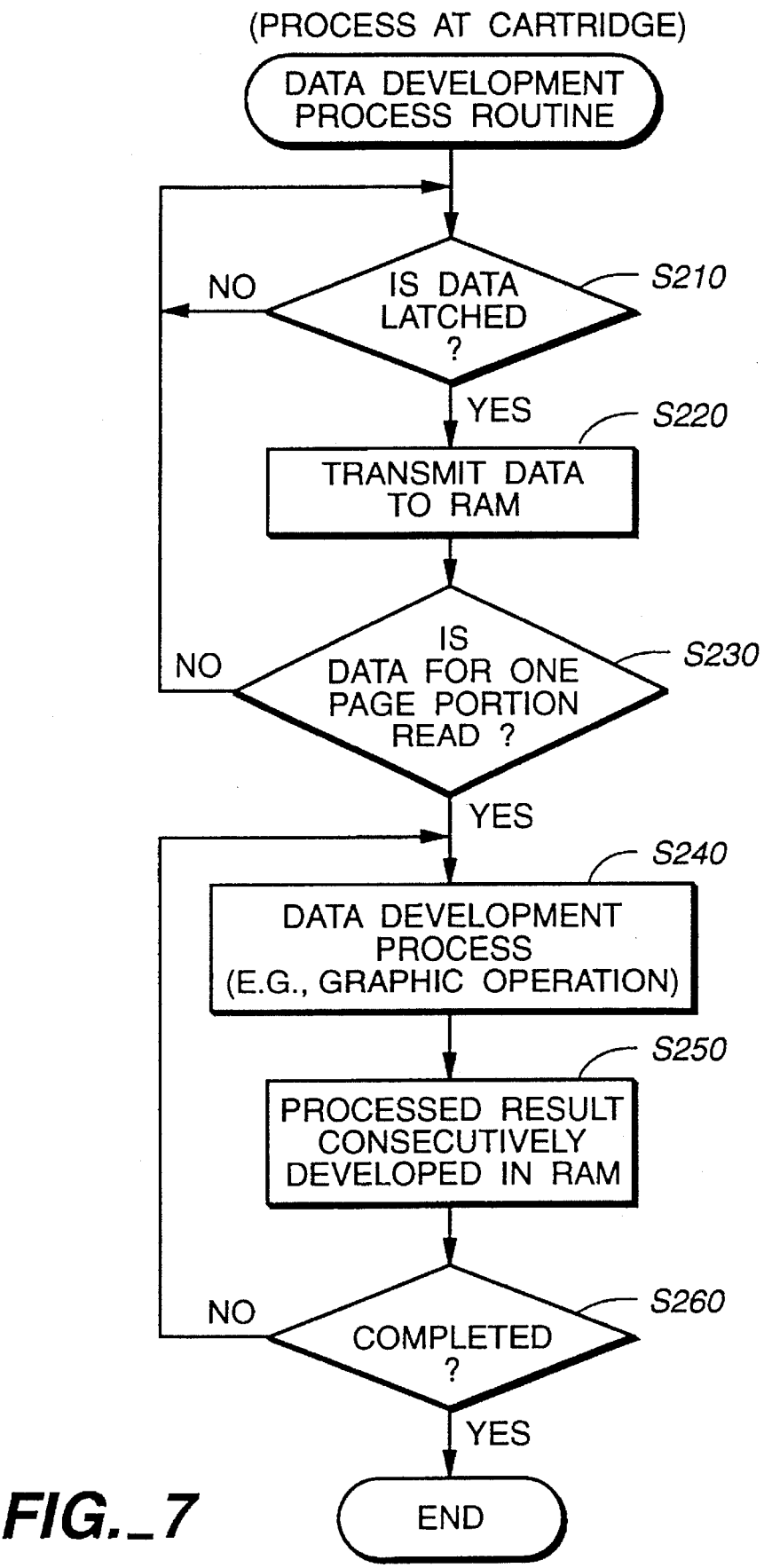
FIG._7

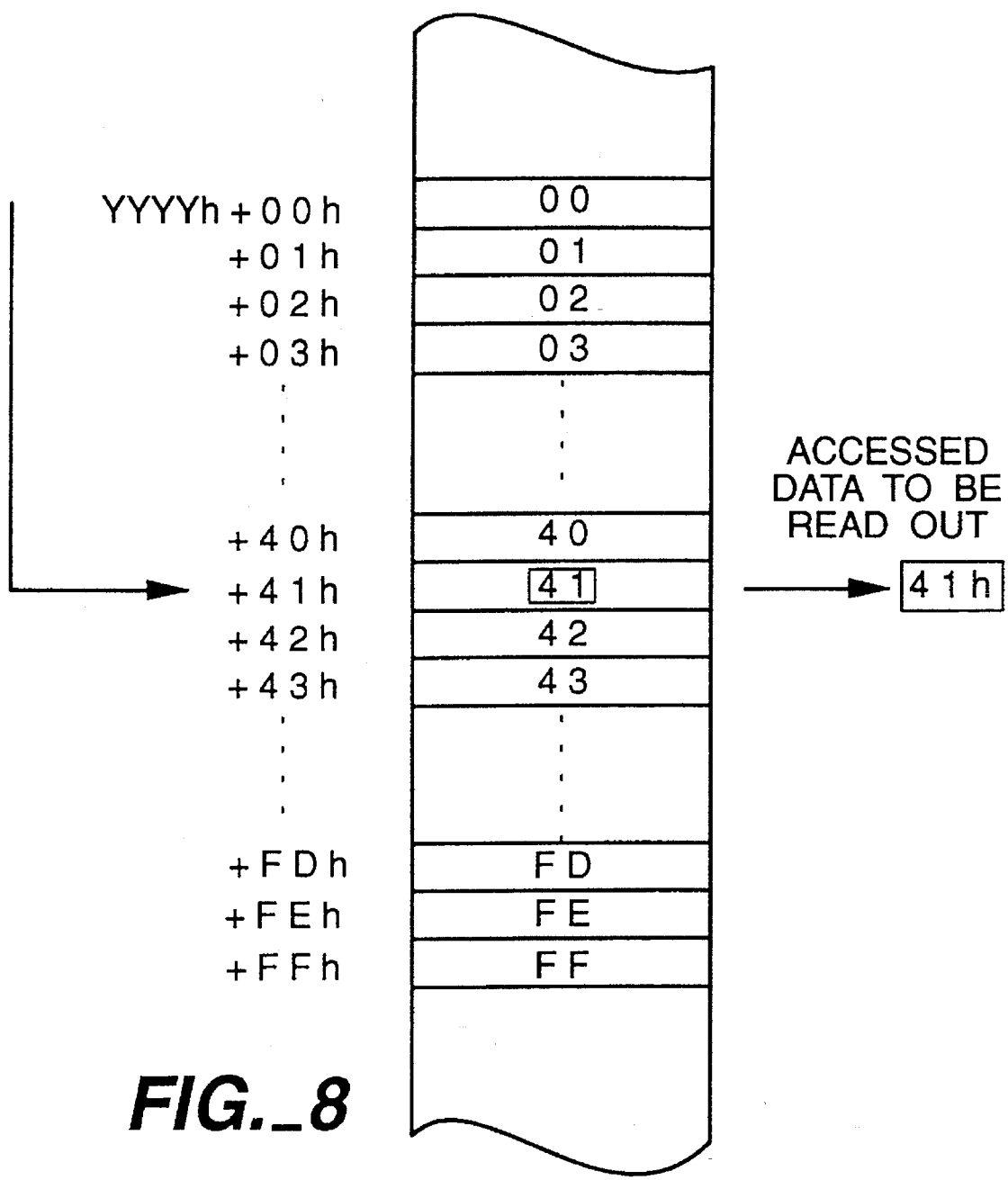
FIG._8

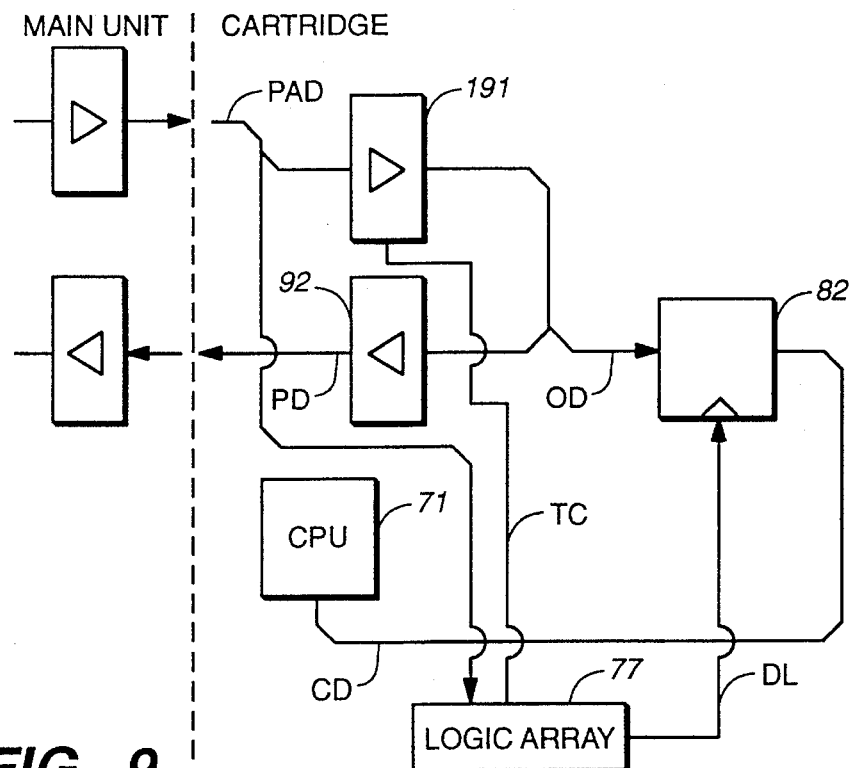
FIG._9
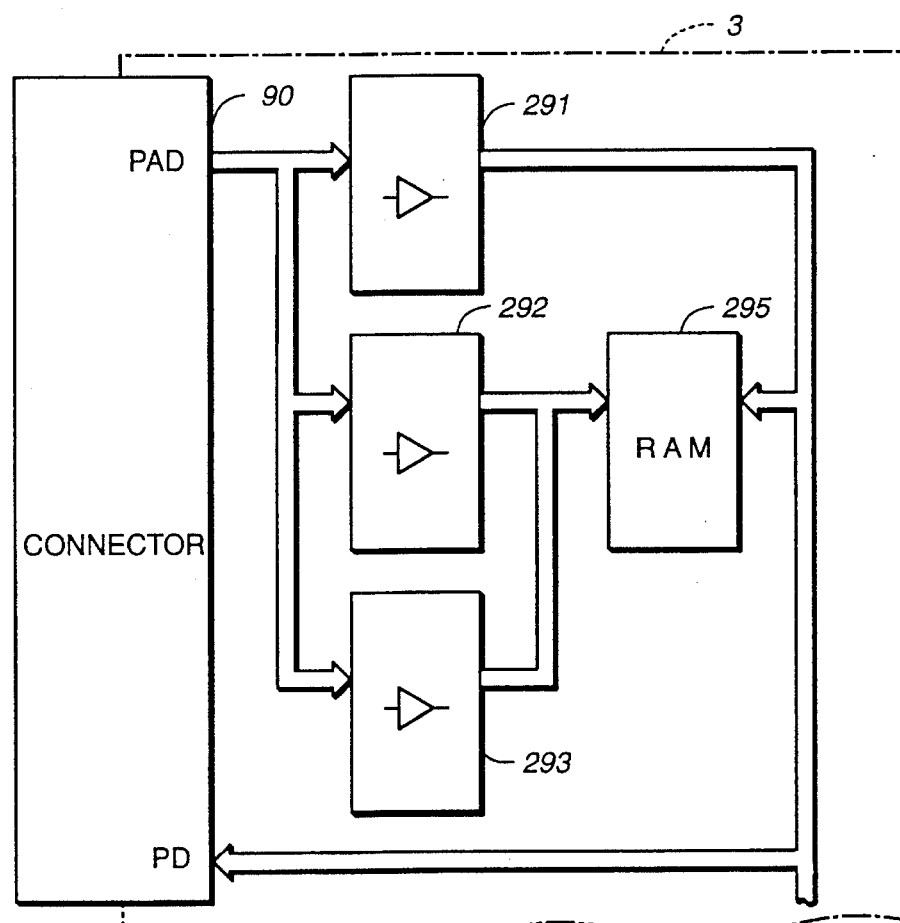
FIG._10

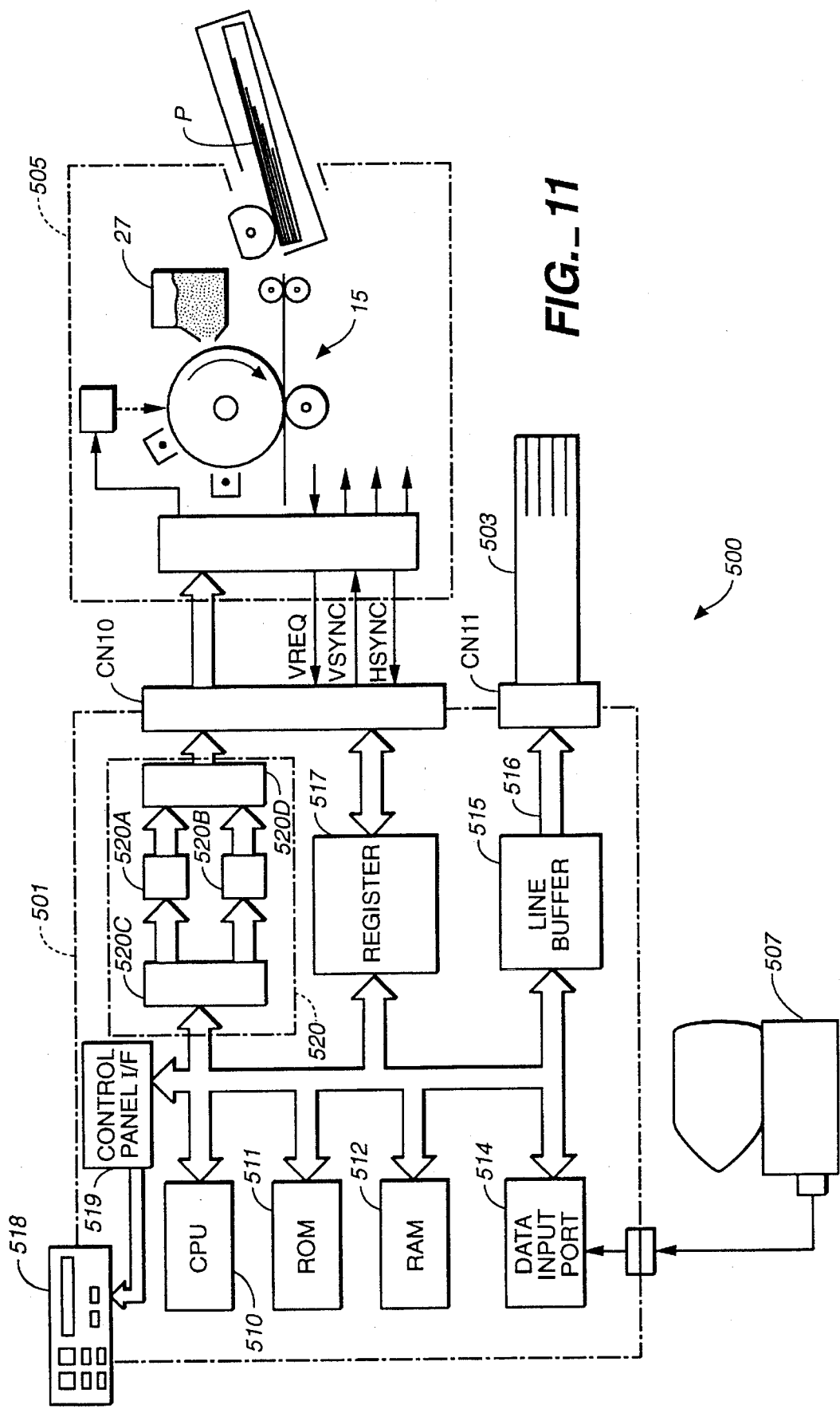
FIG._11

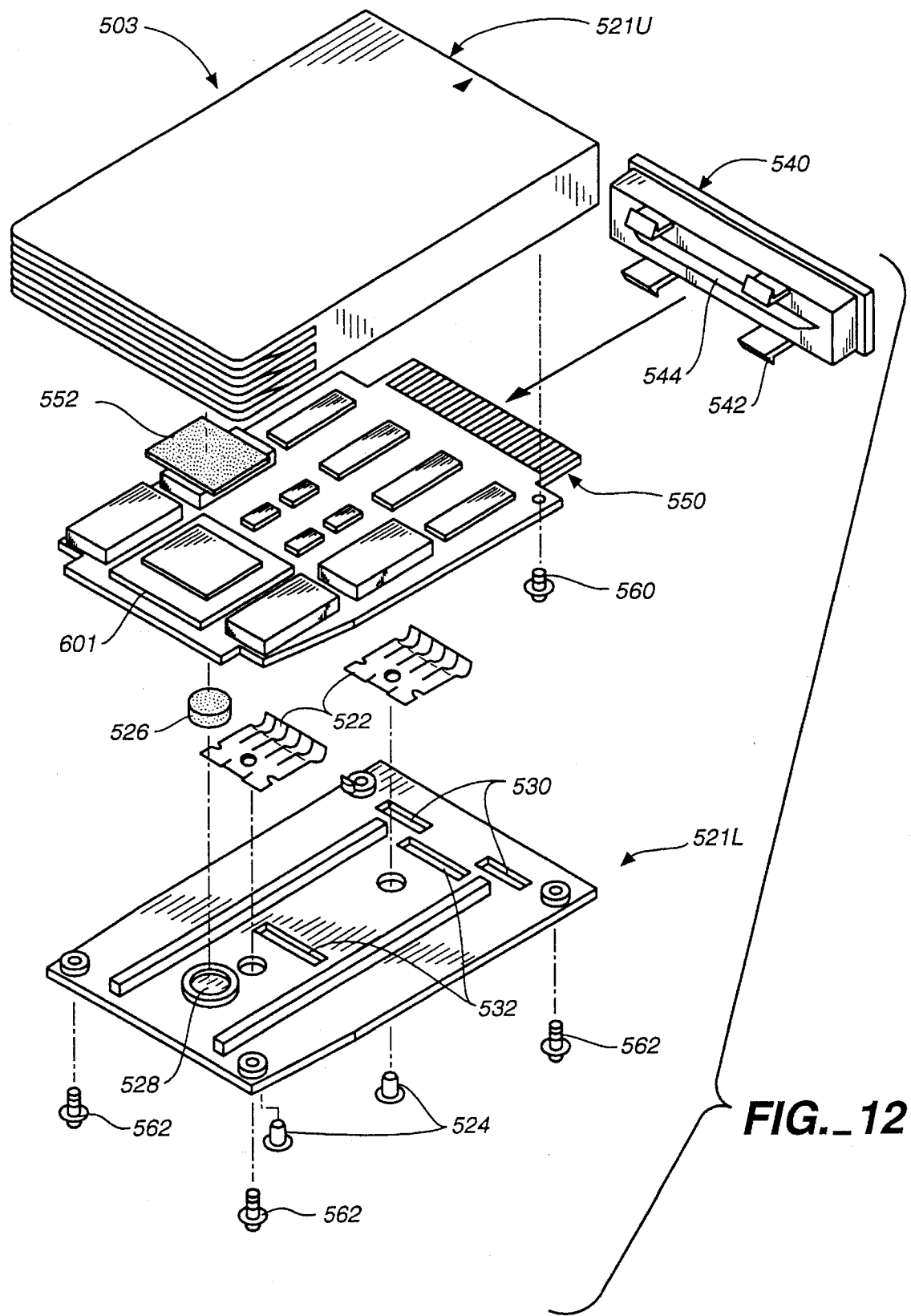
FIG._12

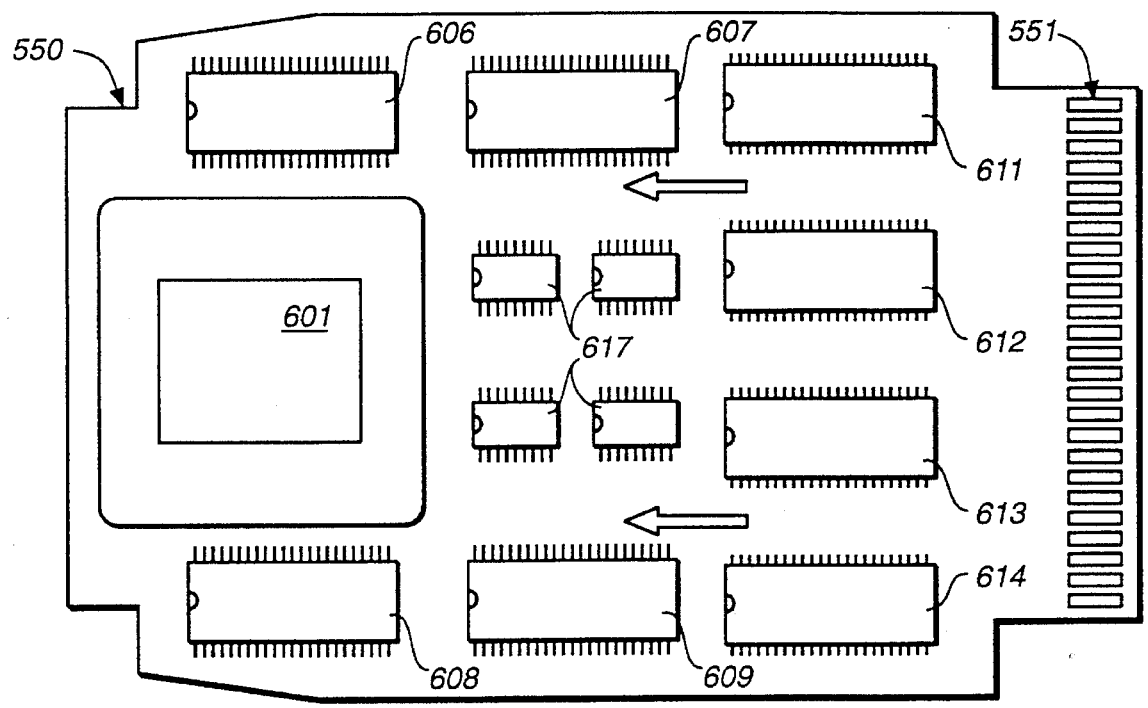
FIG._13A
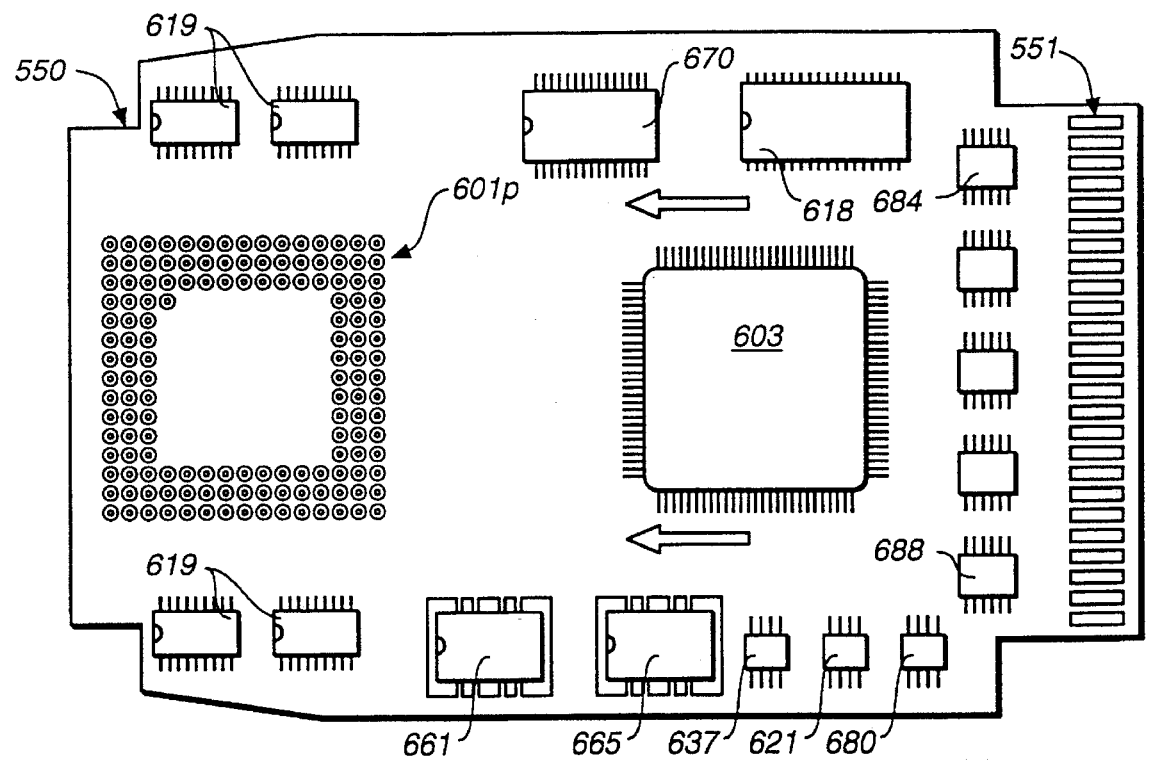
FIG._13B

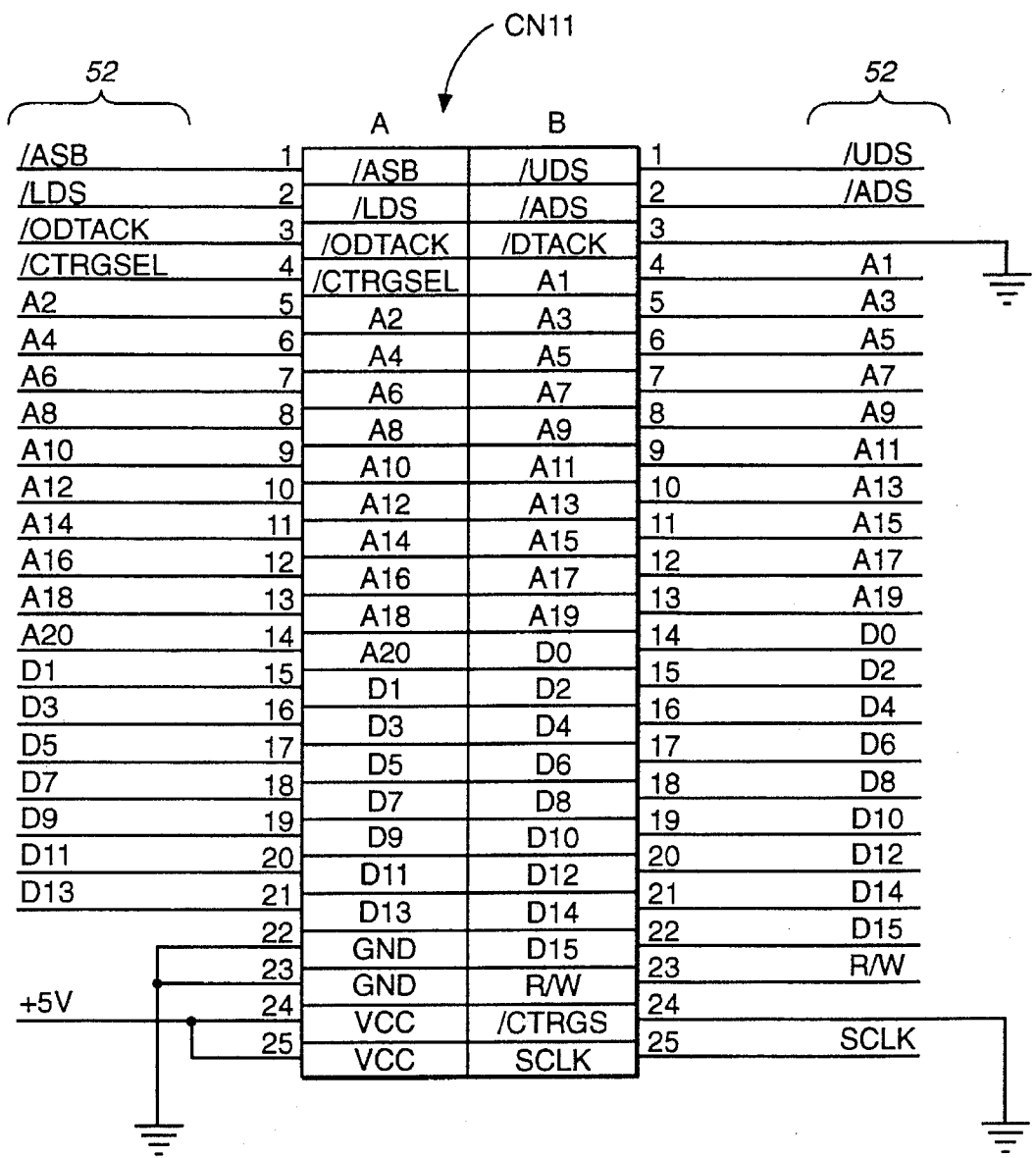
FIG._14
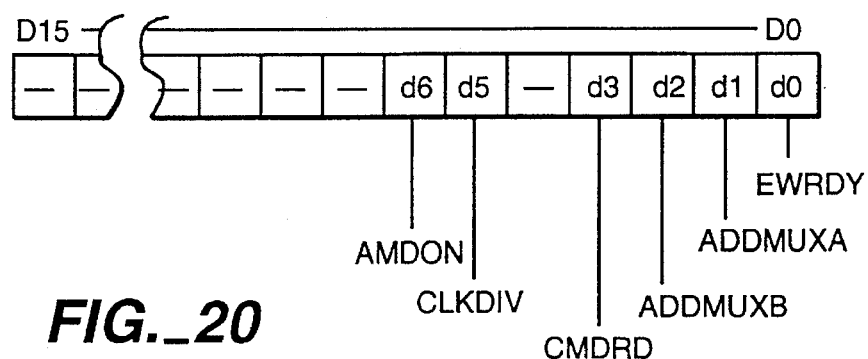
FIG._20

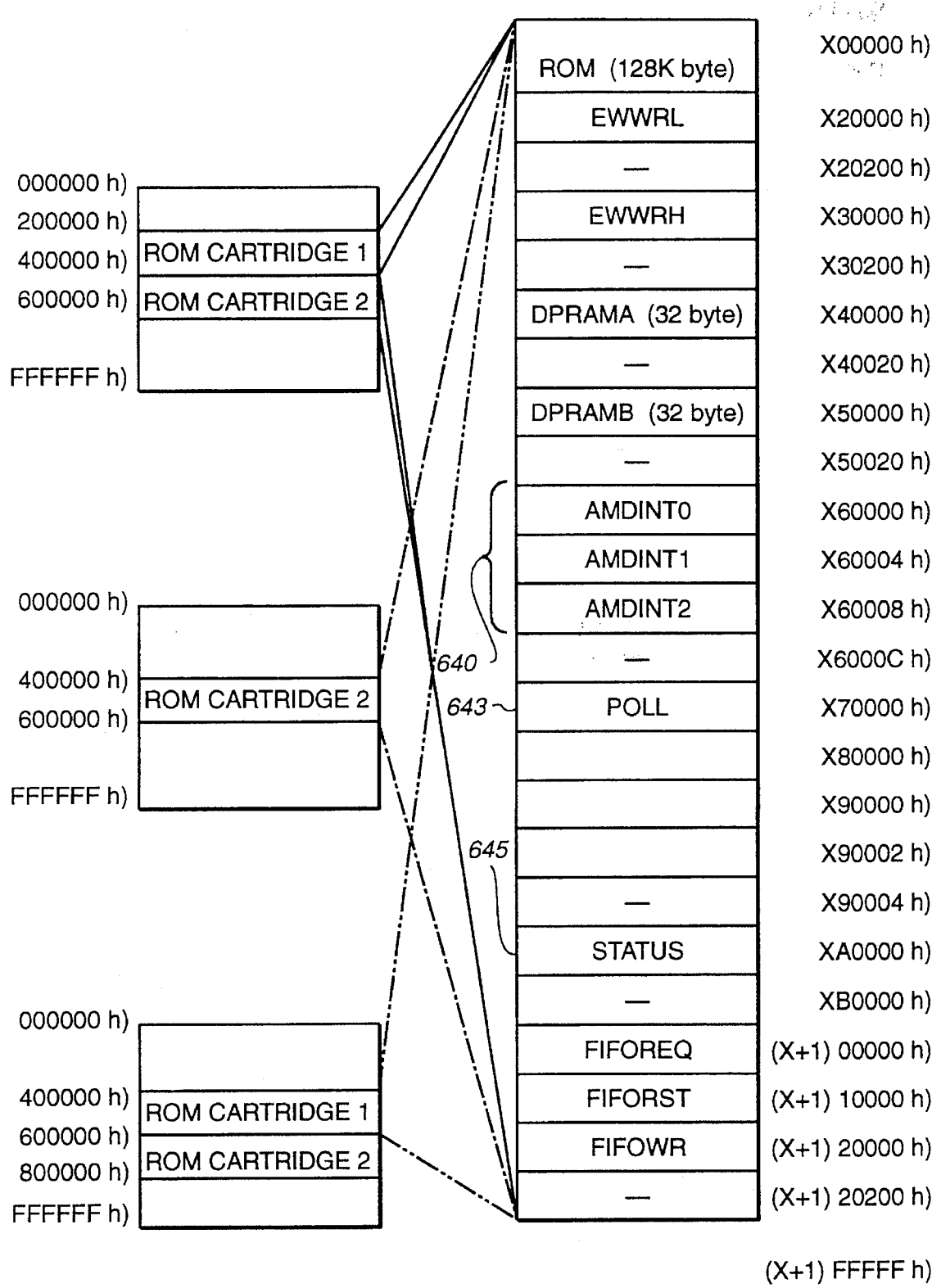
FIG._15

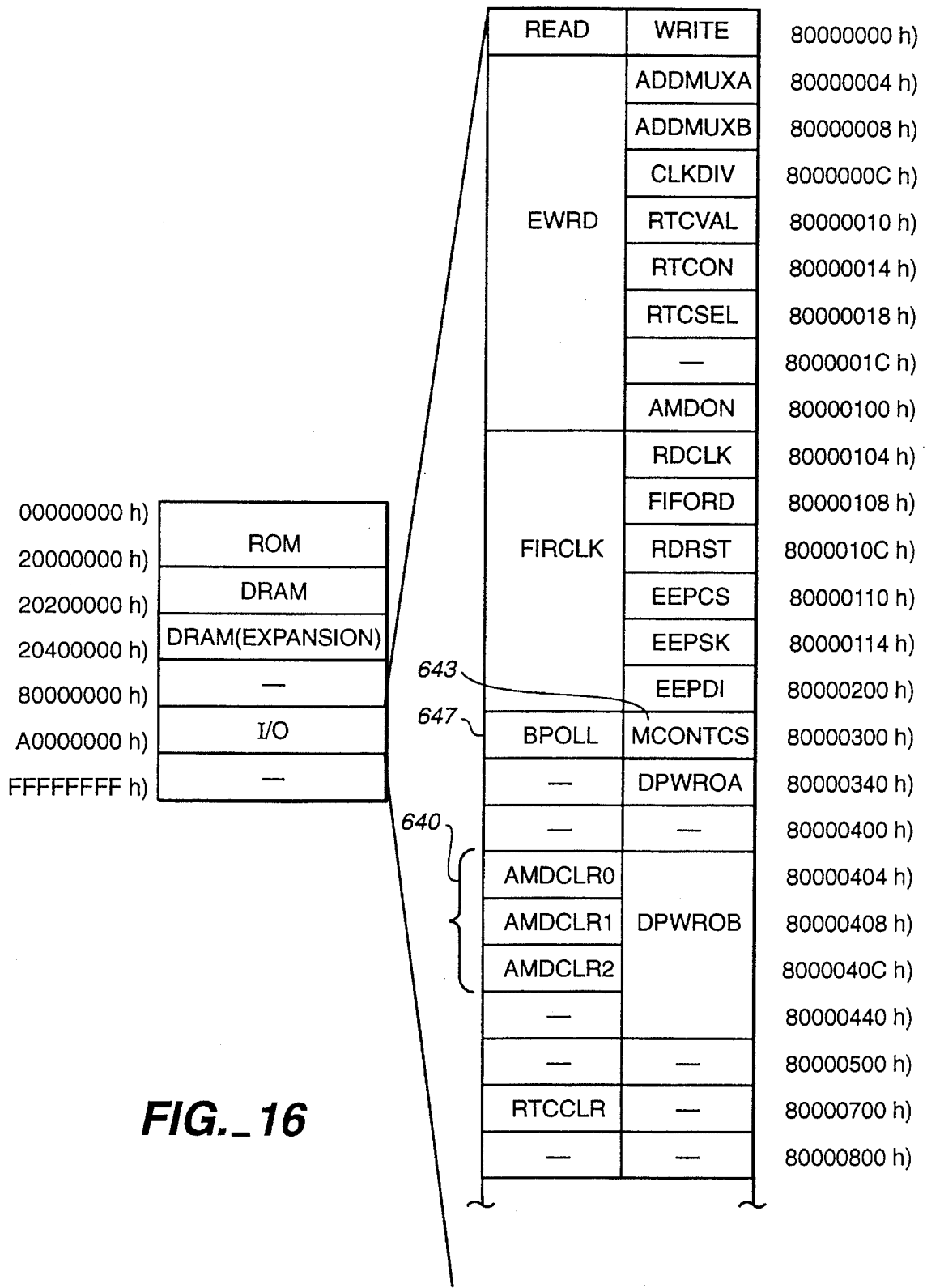
FIG._16

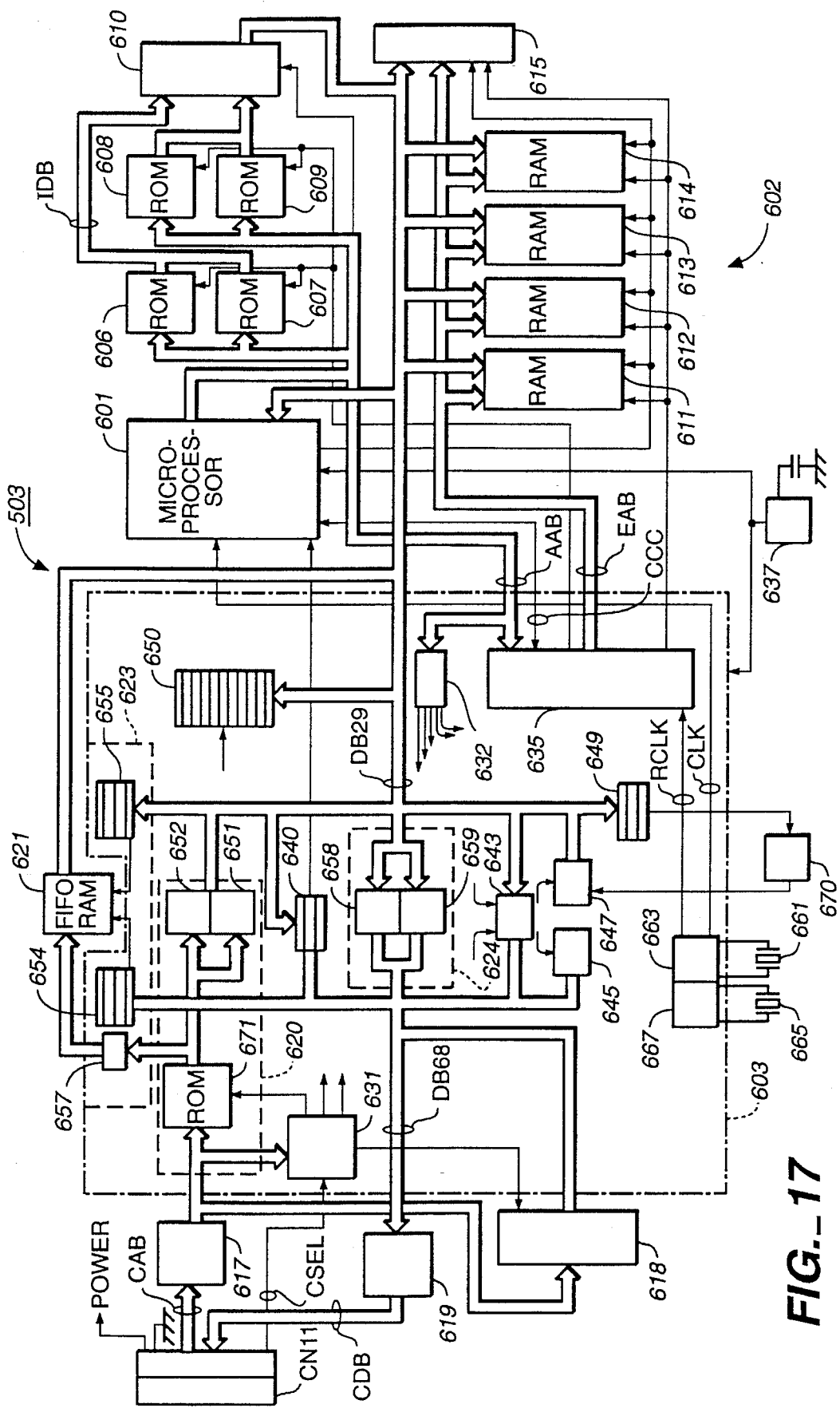
FIG._17

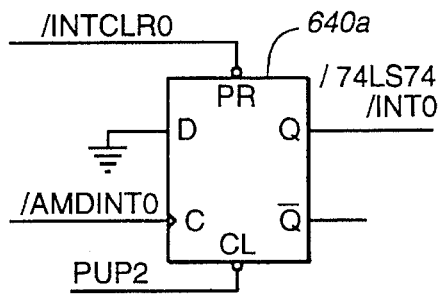
FIG._18A
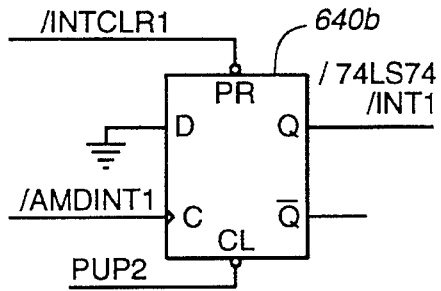
FIG._18B
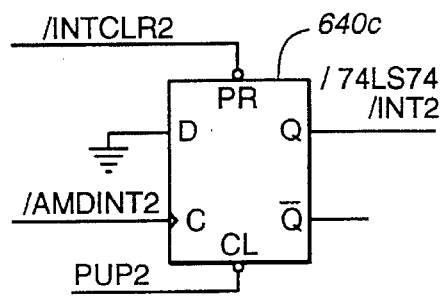
FIG._18C
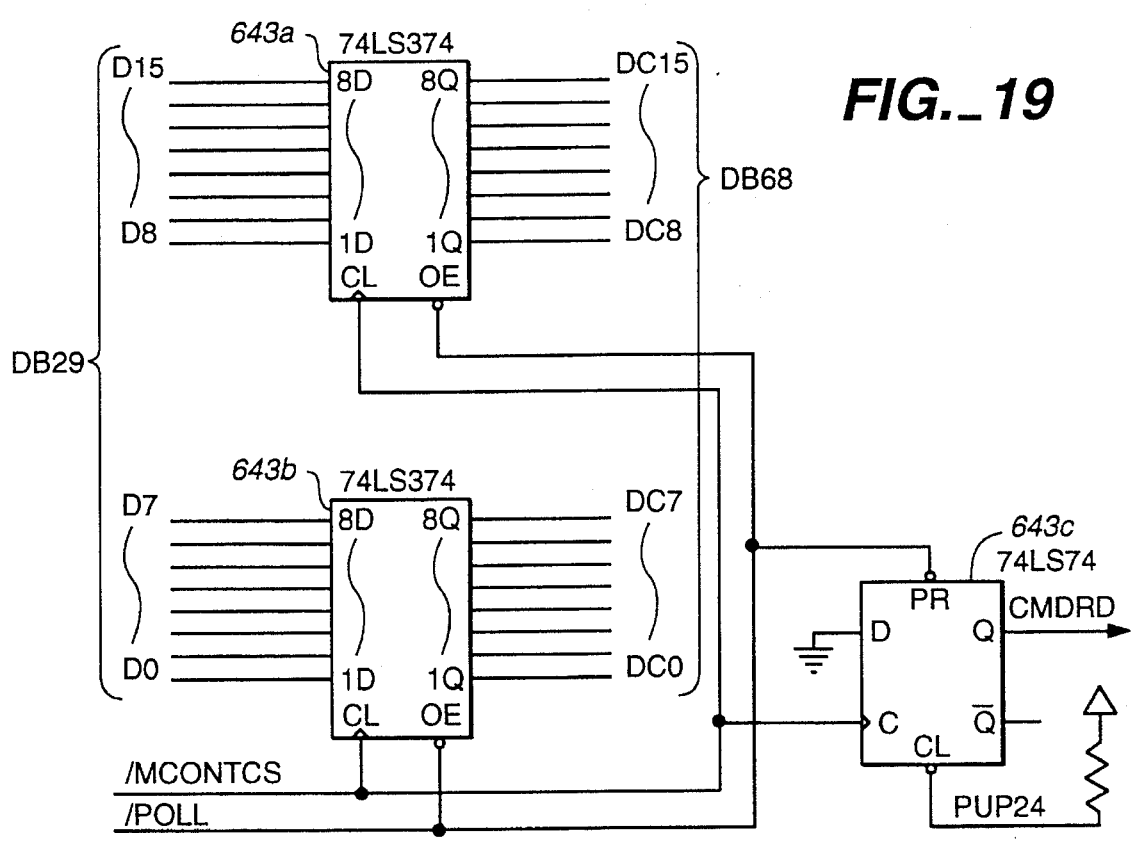
FIG._19

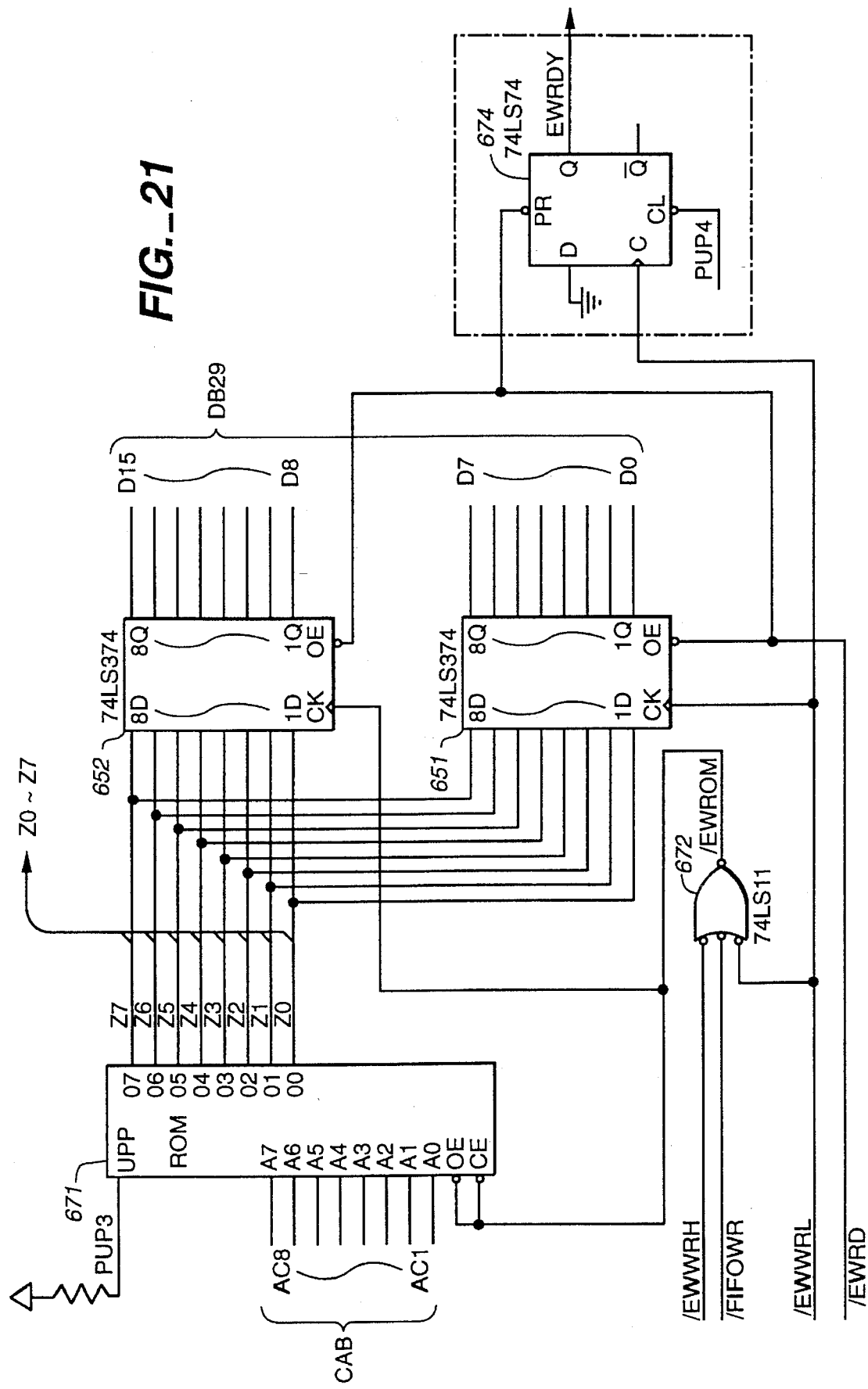
FIG._21

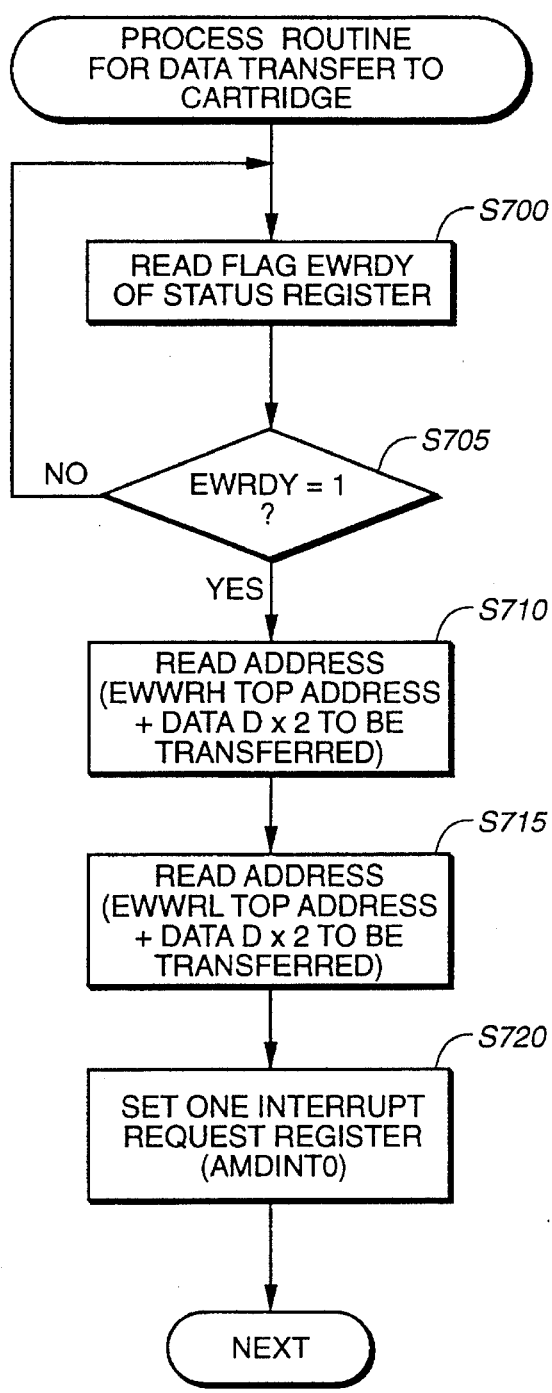
FIG._22
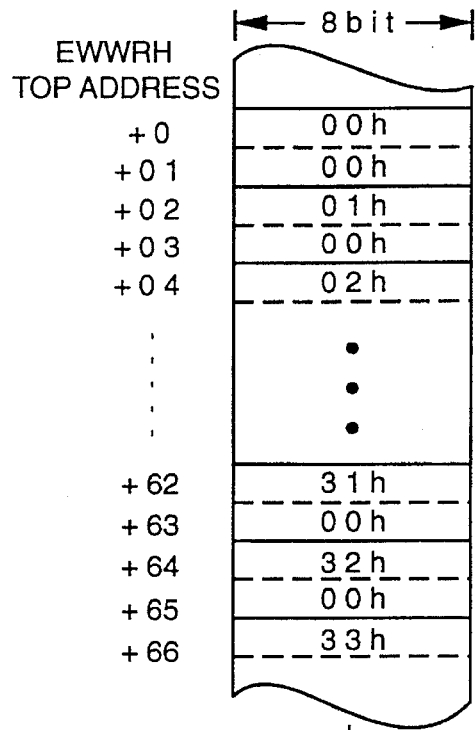
FIG._23
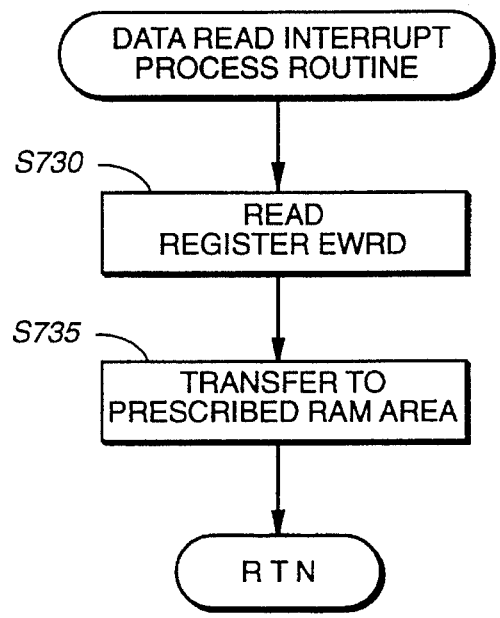
FIG._24

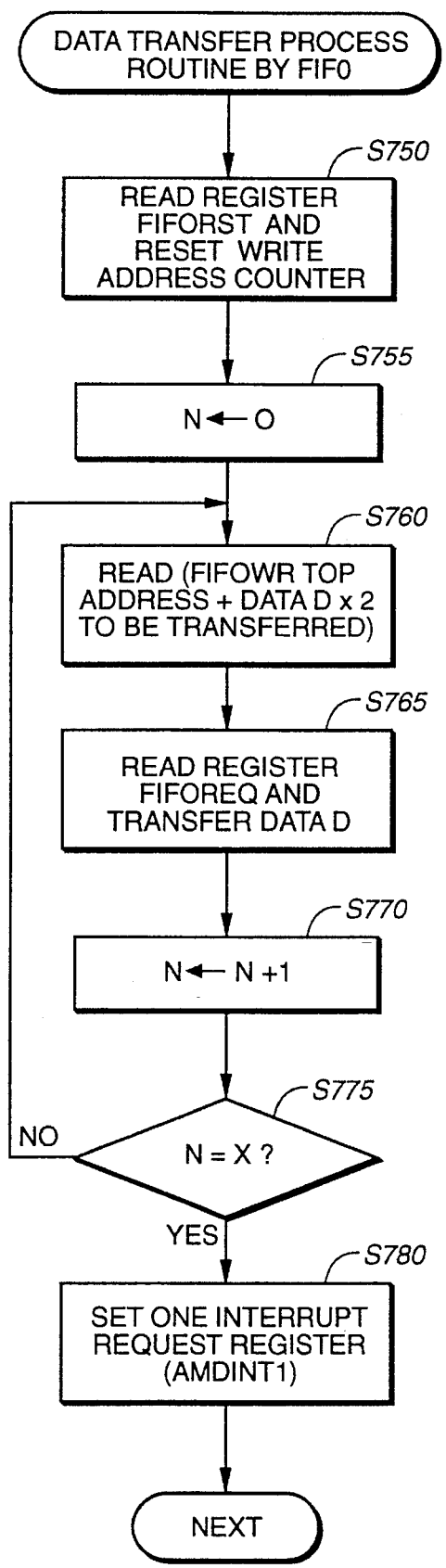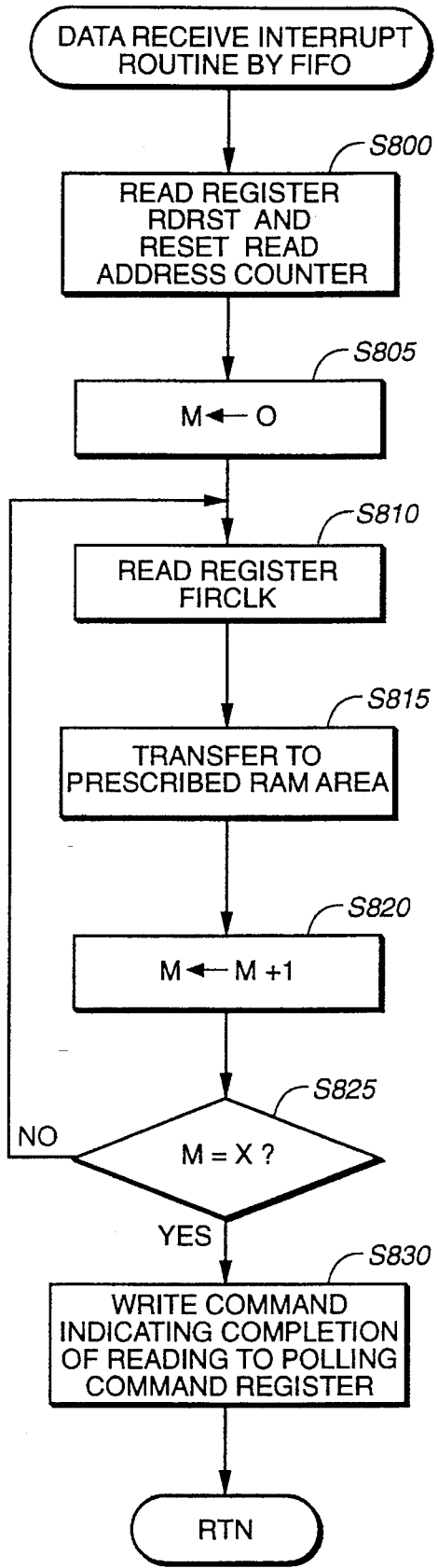
*FIG._25*  *FIG._26*

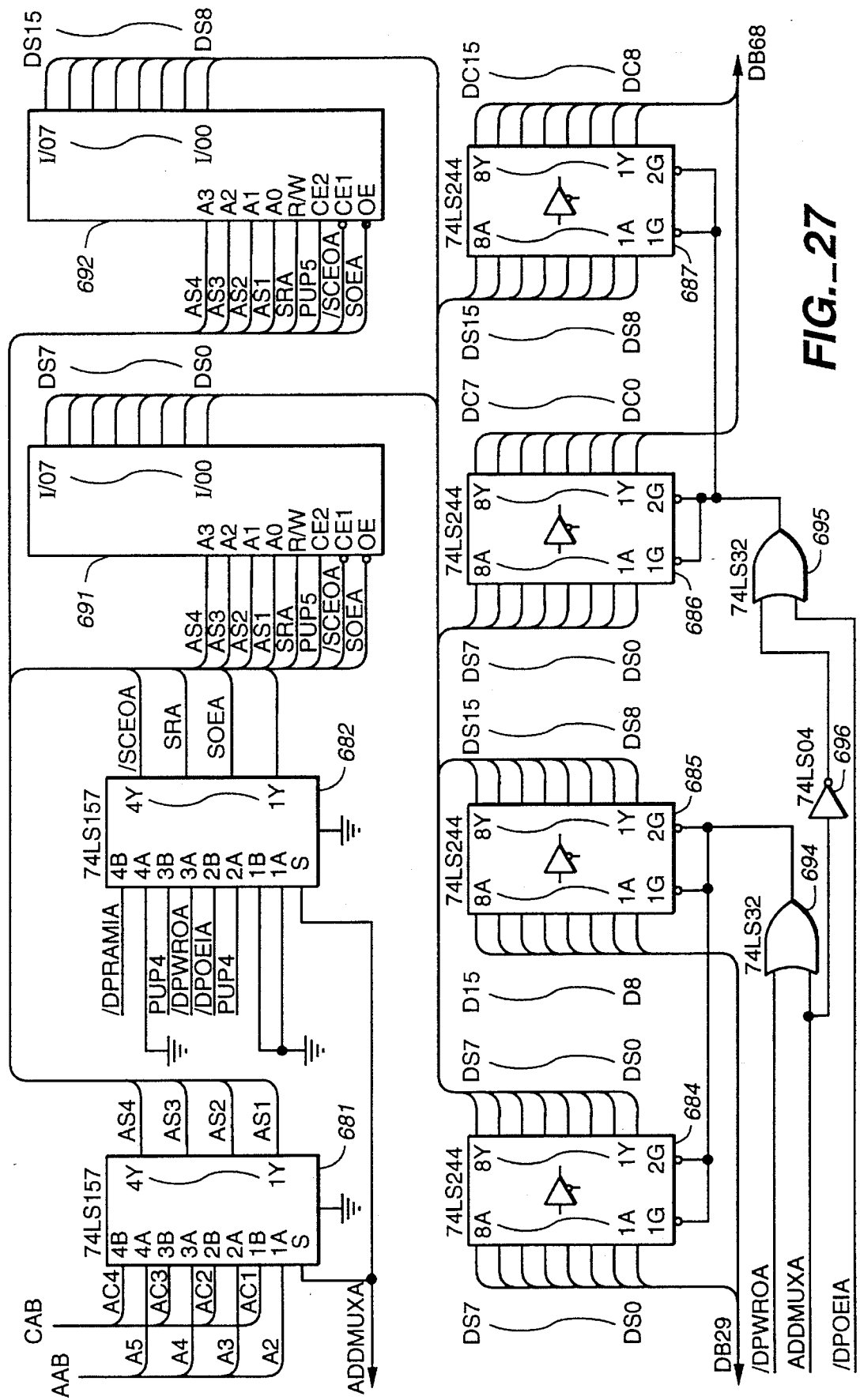
FIG._27

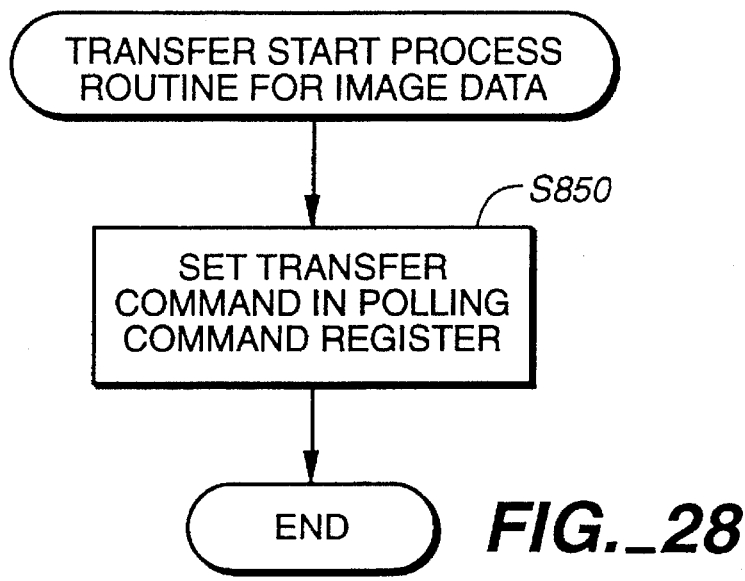
FIG._28
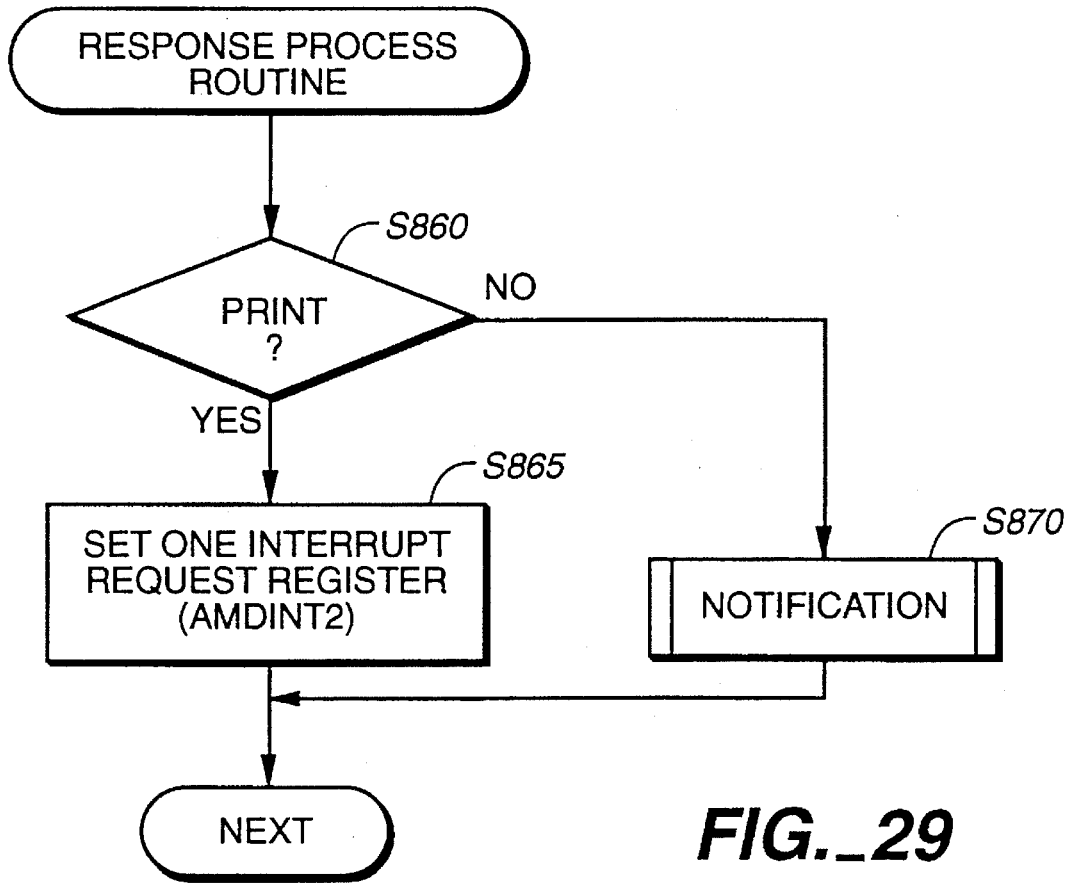
FIG._29

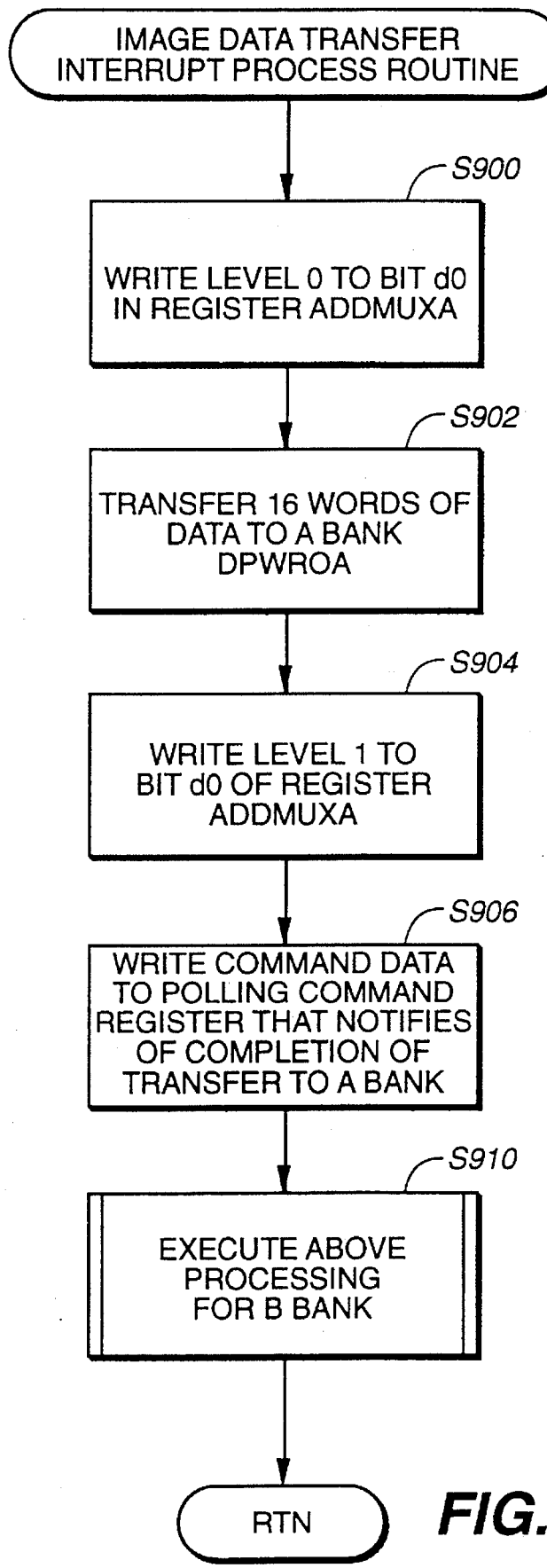
FIG._30

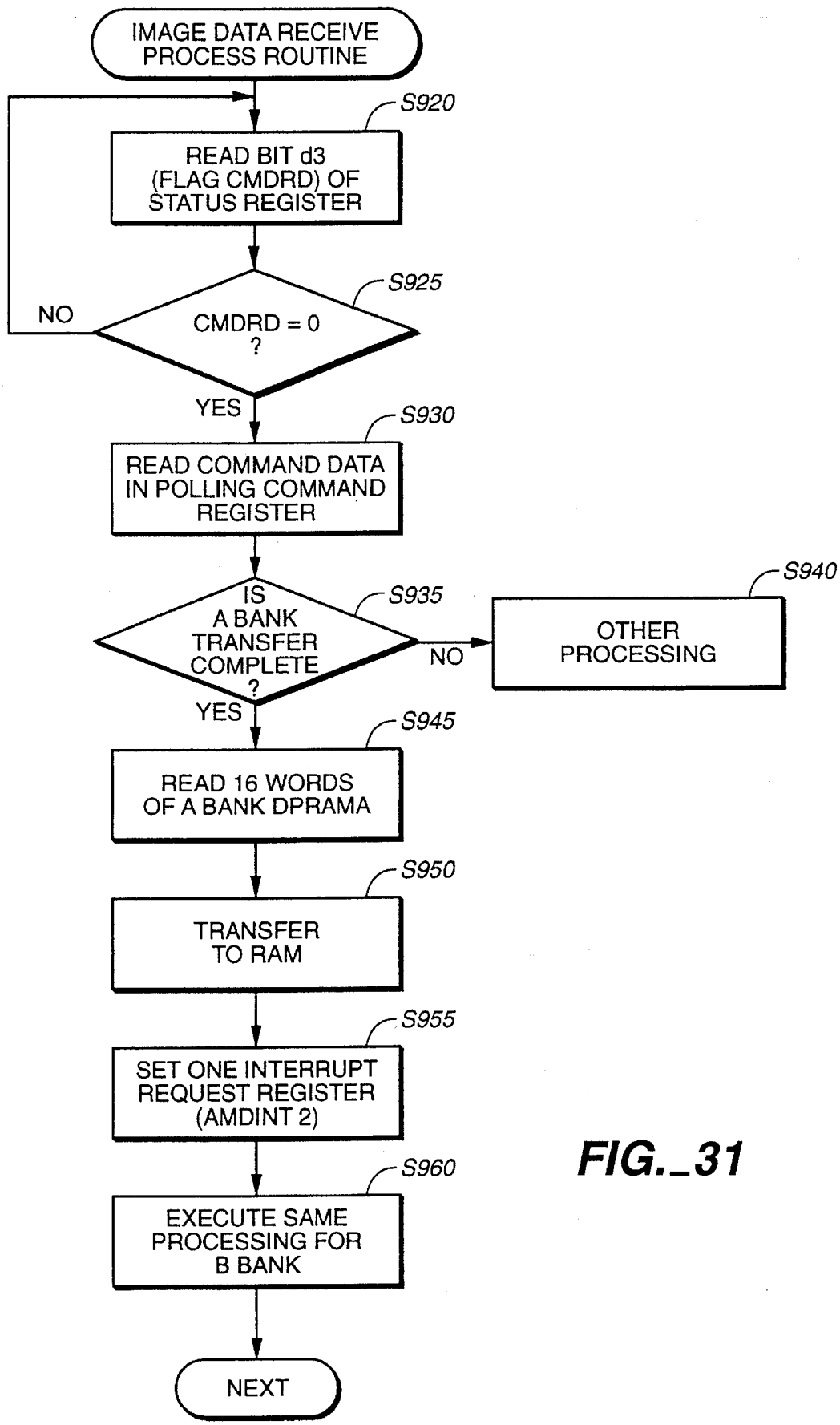
FIG._31

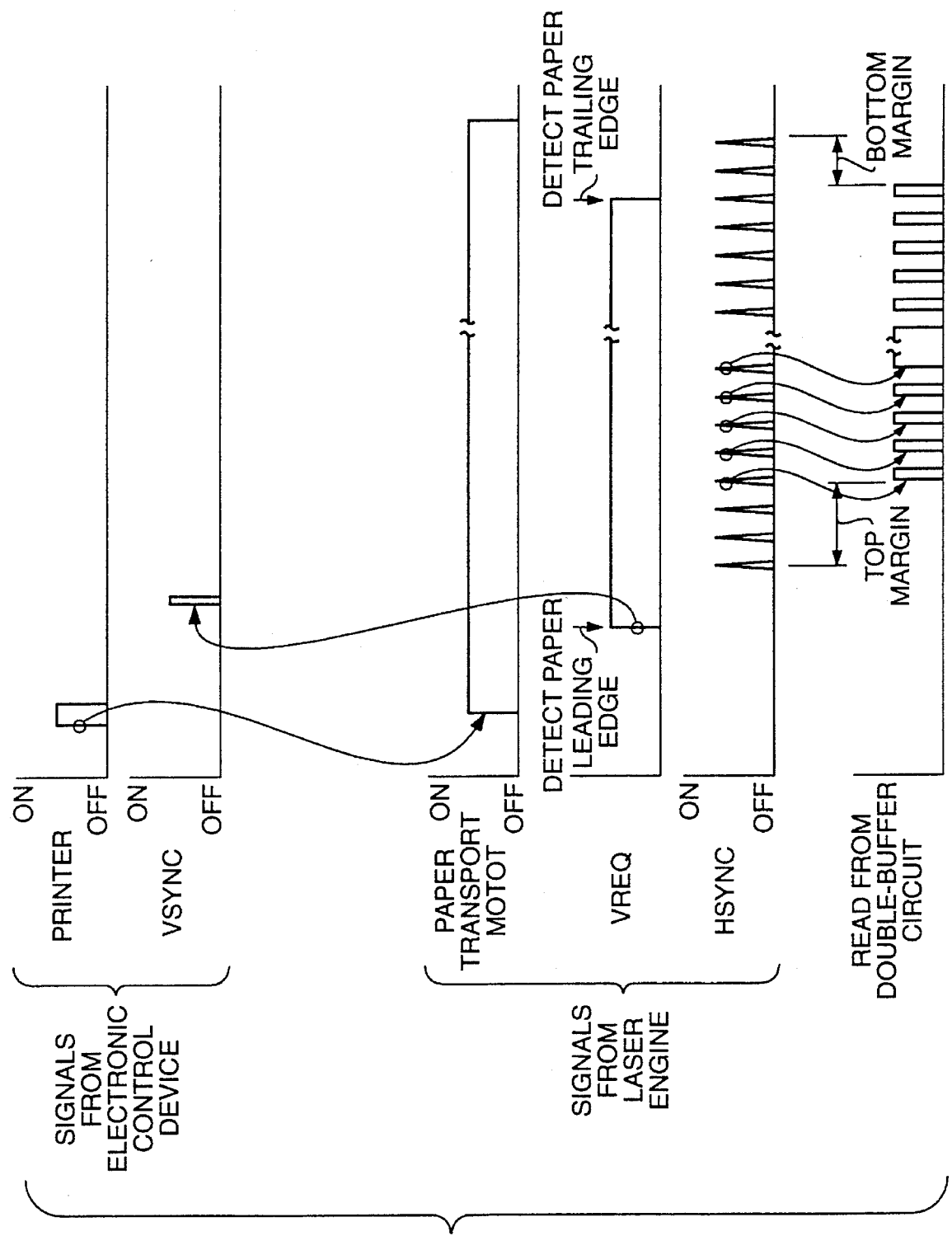
FIG._32

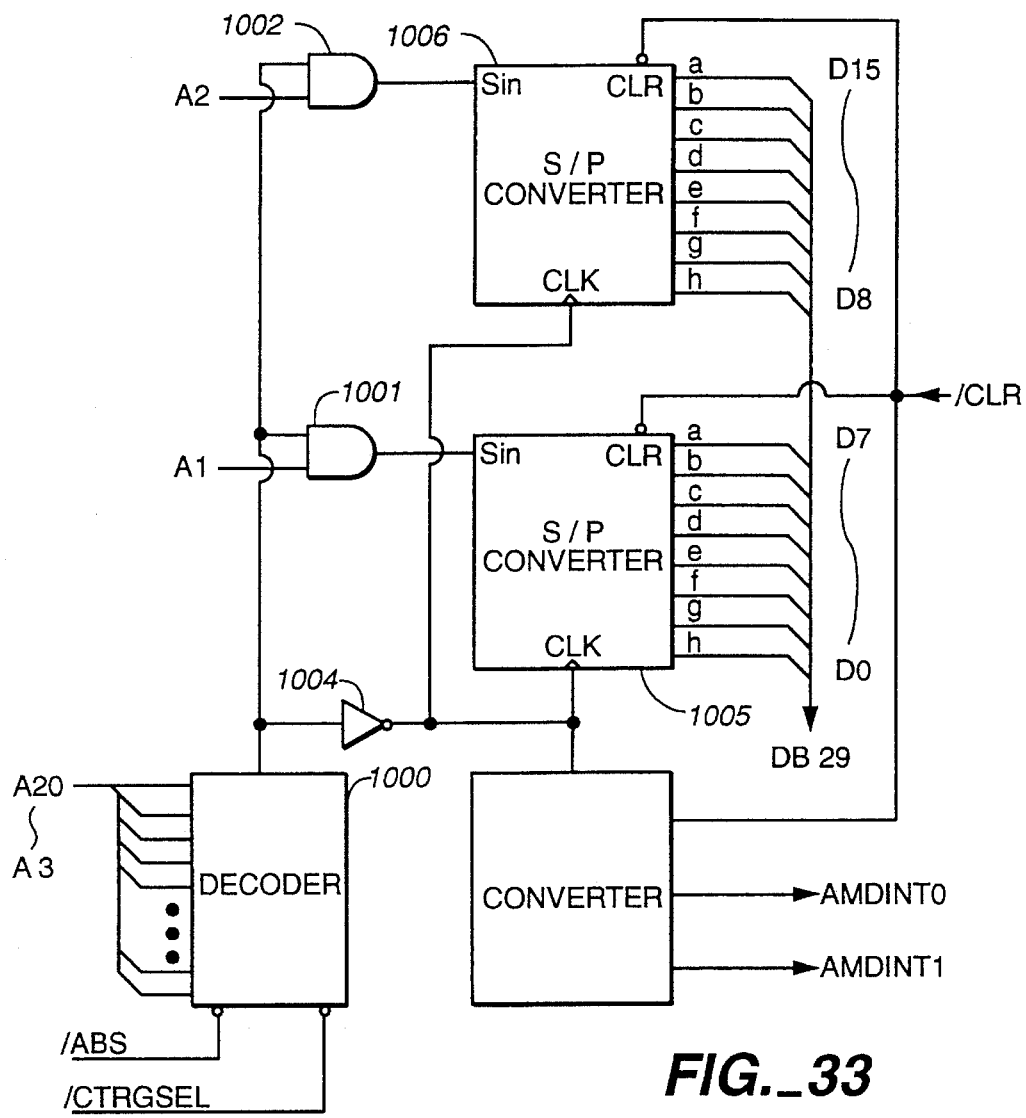
FIG._33
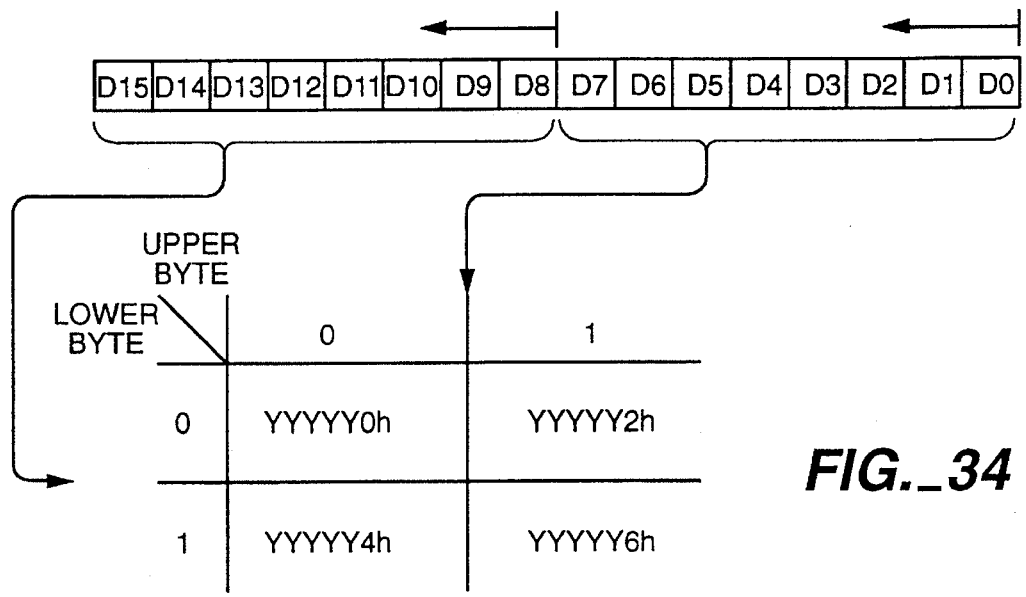
FIG._34

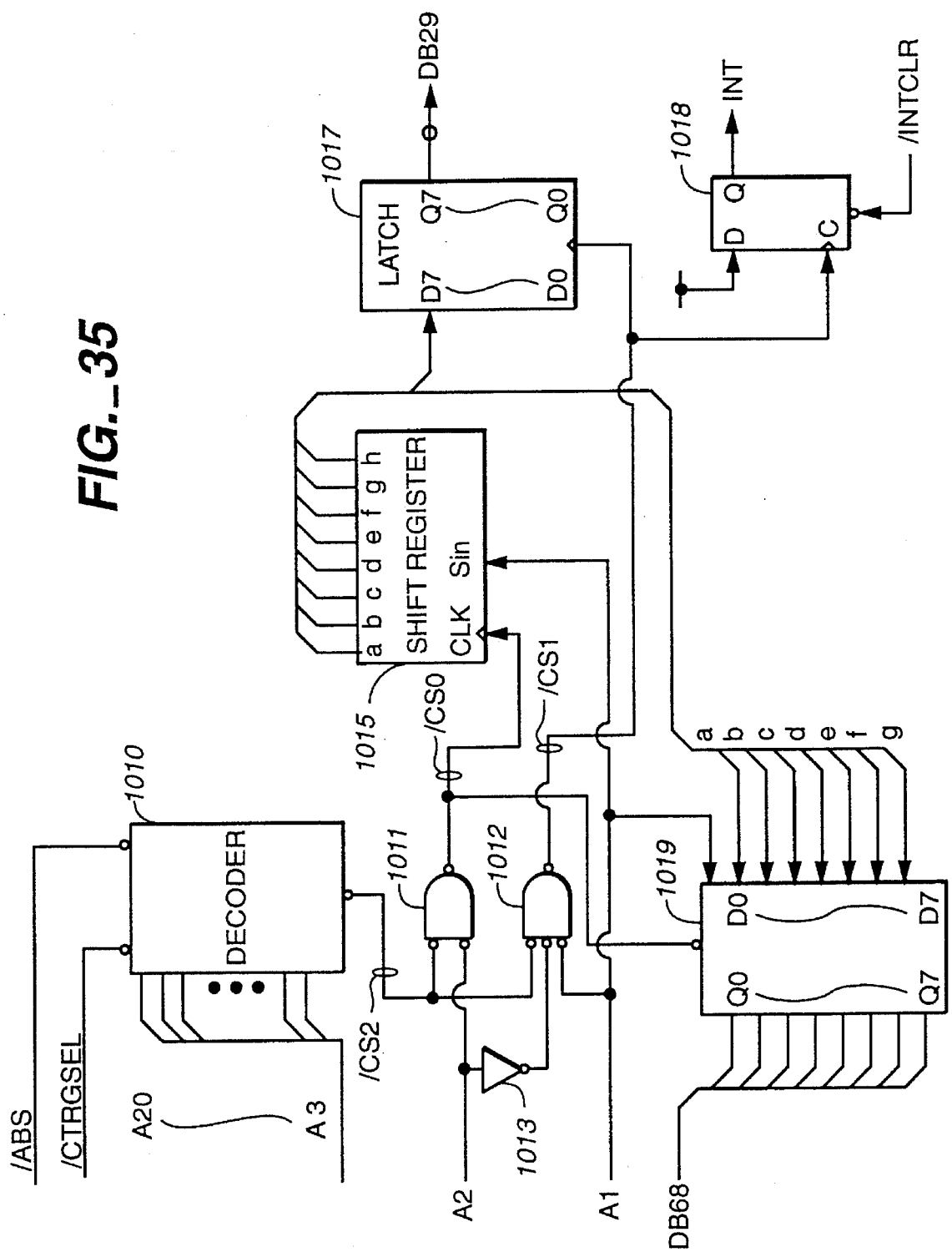
FIG._35

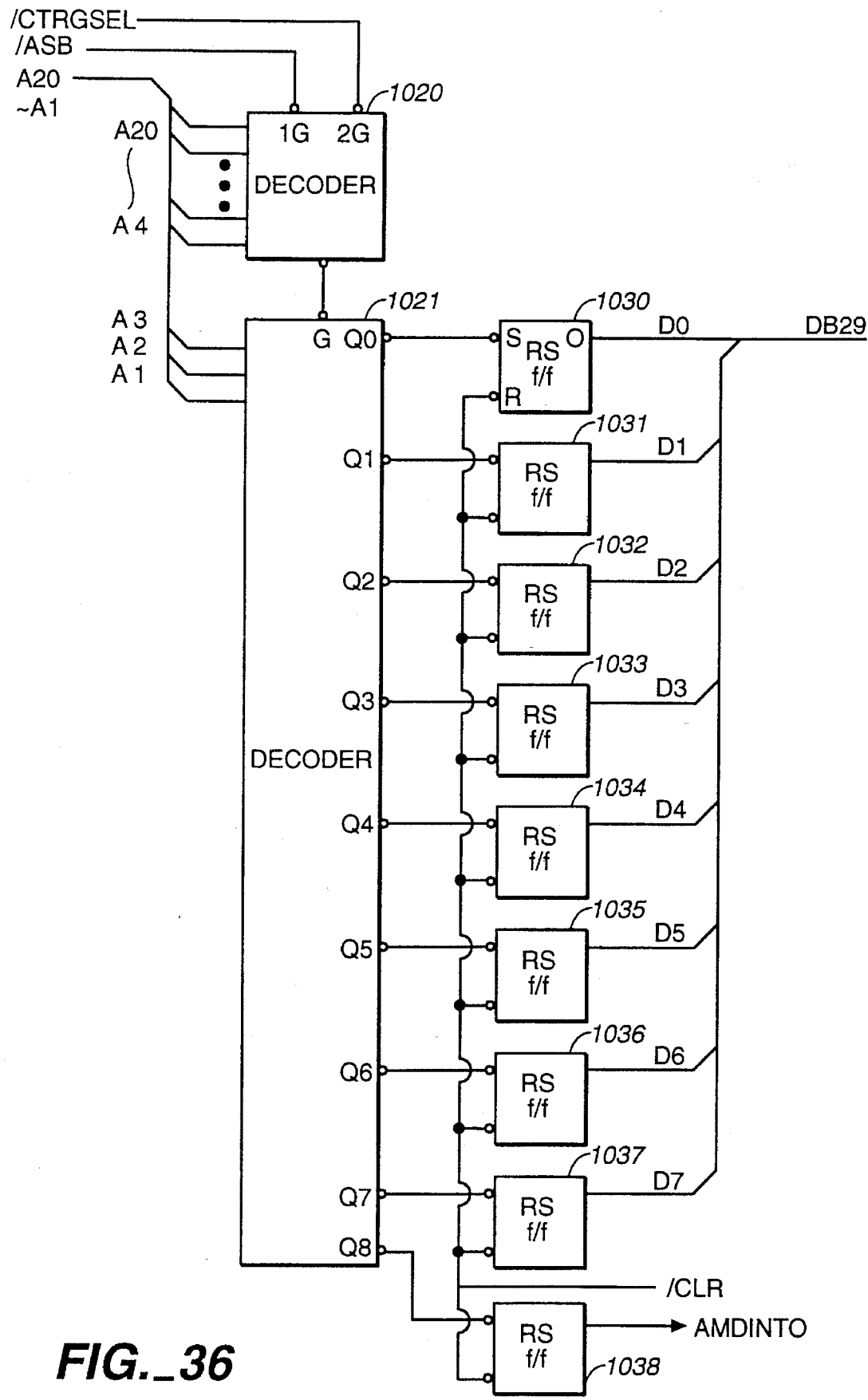
FIG._36

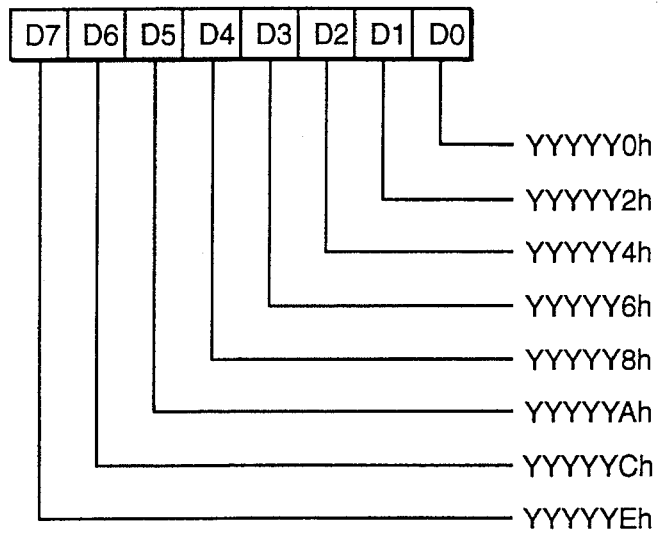
FIG._37
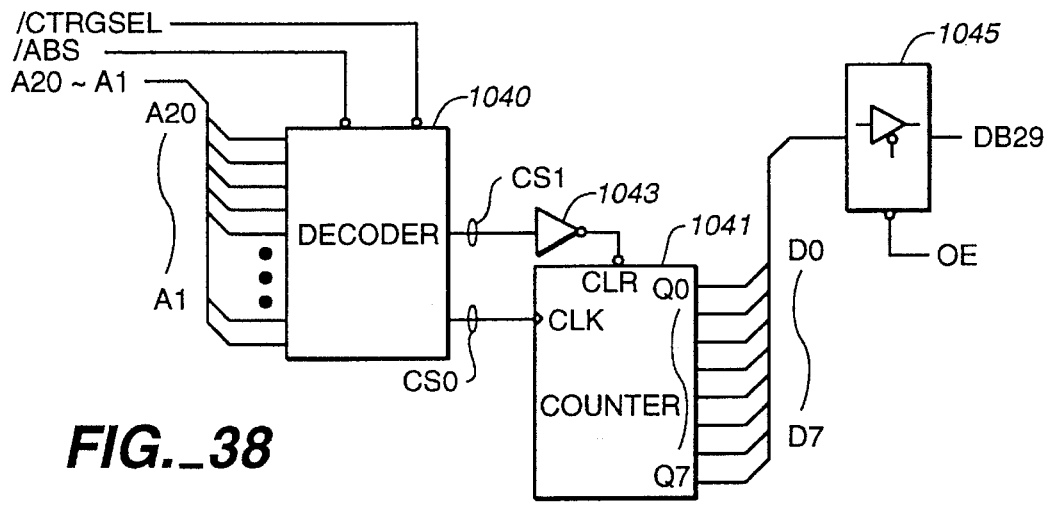
FIG._38
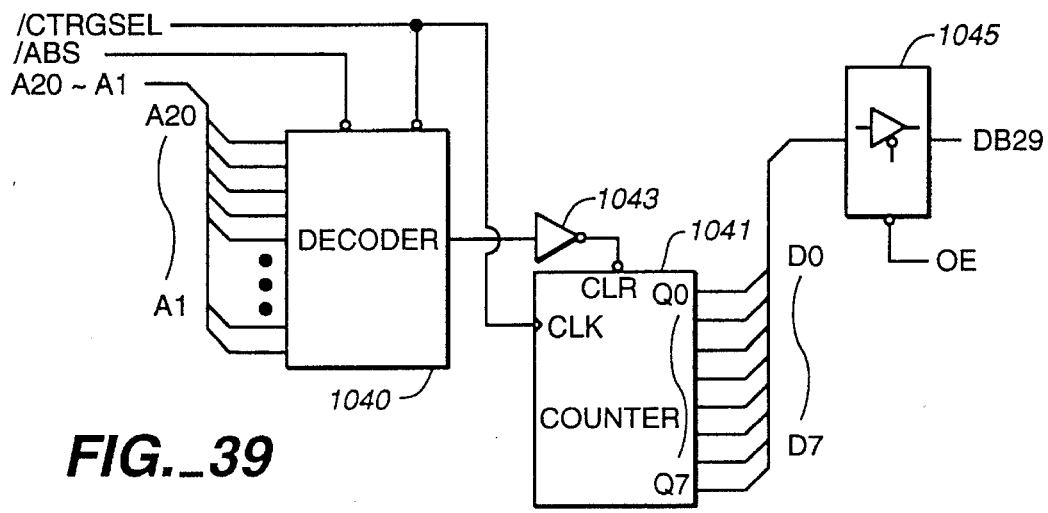
FIG._39

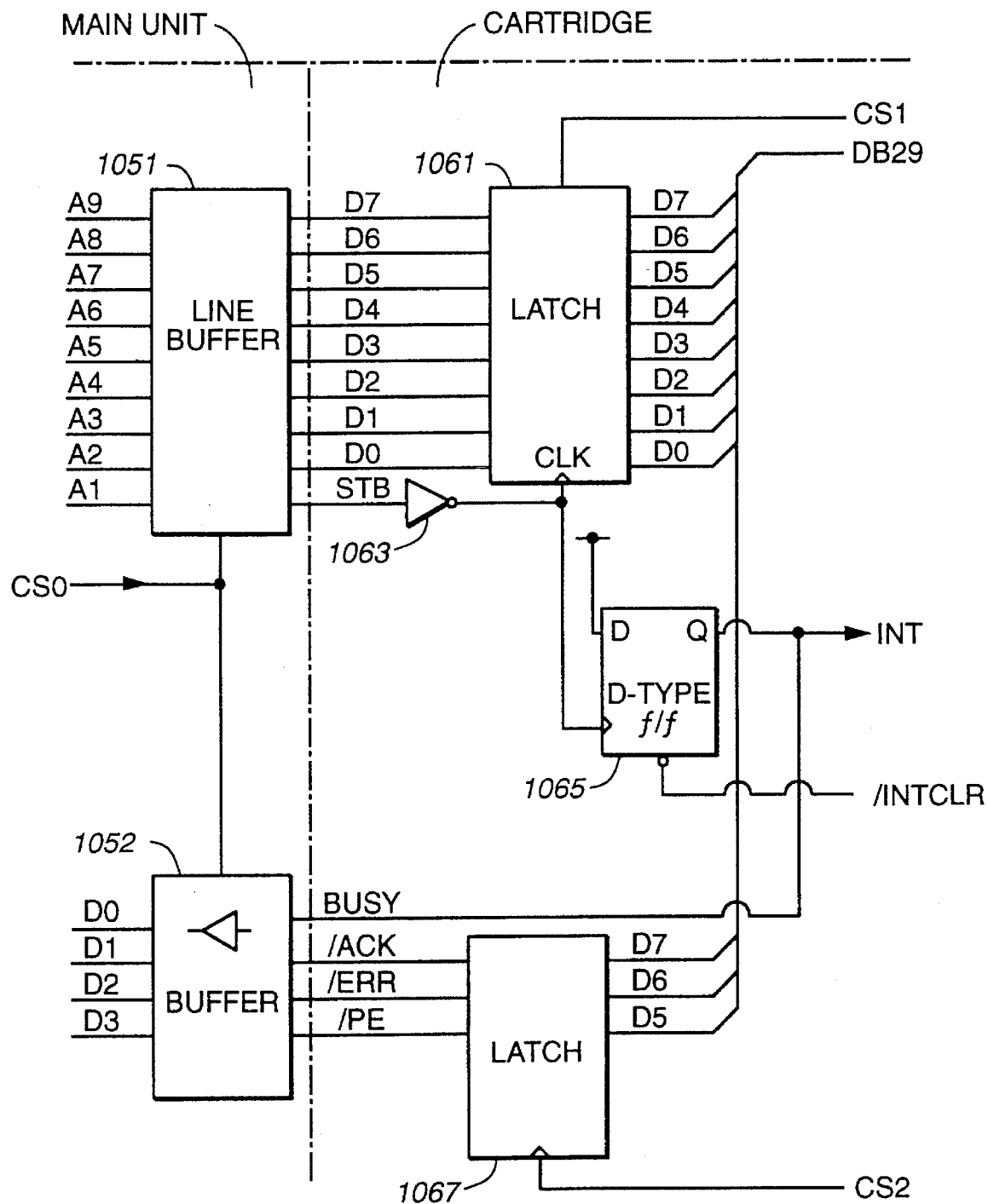
FIG._40

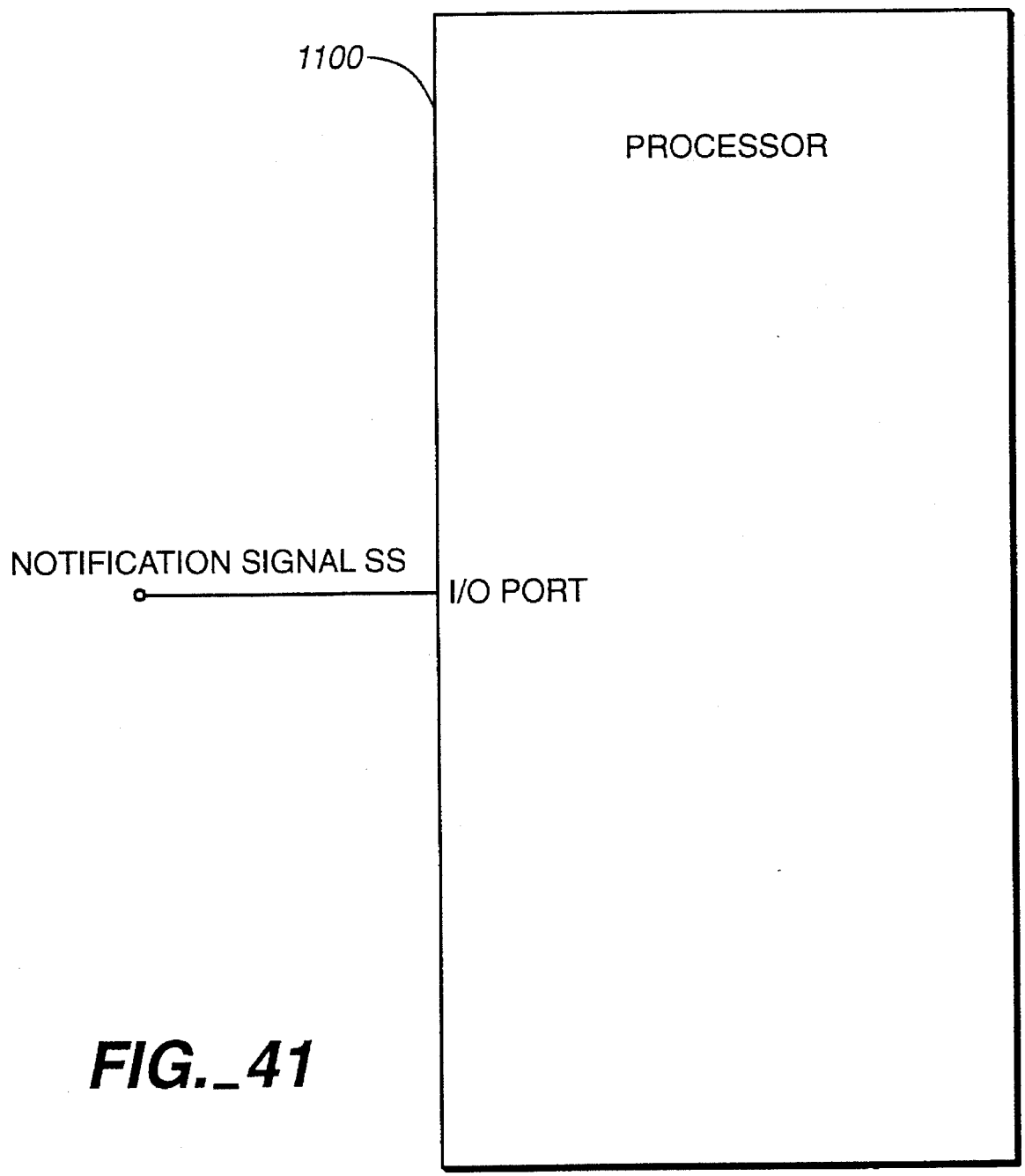
FIG._41

INFORMATION PROCESSING DEVICE AND ACCESSORY CONTROL DEVICE

CROSS REFERENCES TO RELATED APPLICATIONS

This application is related to the following other applications:

This application is a continuation-in-part of "INTELLIGENT CARTRIDGE FOR ATTACHMENT TO A PRINTER TO PERFORM IMAGE PROCESSING TASKS IN A COMBINATION IMAGE PROCESSING SYSTEM AND METHOD OF IMAGE PROCESSING", Wakabayashi et al., Ser. No. 07/816,455, filed Dec. 30, 1991, now U.S. Pat. No. 5,410,641.

"INFORMATION PROCESSING DEVICE IN AN ELECTRONIC APPARATUS UTILIZING AN ACCESSORY CONTROL DEVICE AND METHODS OF APPLICATION", Wakabayashi et al., Ser. No. 07/883,773, filed May 15, 1992 now U.S. Pat. No. 5,461,705.

"INFORMATION PROCESSING DEVICE IN AN ELECTRONIC APPARATUS UTILIZING AN ACCESSORY CONTROL DEVICE AND METHODS OF APPLICATION", Wakabayashi et al., Ser. No. 07/895,537, filed Jun. 8, 1992.

"ADD-ON ELECTRONIC DEVICE AND ELECTRONIC SYSTEM", Wakabayashi et al., Ser. No. 07/854,643, filed Jul. 1, 1992 now U.S. Pat. No. 5,437,041.

"TEMPERATURE CONTROL FOR ADD-ON ELECTRONIC DEVICES", Wakabayashi et al., Ser. No. 07/907,988, filed Jul. 1, 1992.

"INFORMATION PROCESSING DEVICE AND THE ACCESSORY CONTROL DEVICE AND INFORMATION PROCESSING METHOD IT USES", Wakabayashi et al., Ser. No. 07/910,590, filed Jul 8, 1992.

"APPARATUS TYPE IDENTIFICATION DEVICE AND METHOD THEREFOR", Wakabayashi et al., Ser. No. 07/908,671, filed Jul. 2, 1992, now abandoned.

"INFORMATION PROCESSING DEVICE AND THE ACCESSORY CONTROL DEVICE AND INFORMATION PROCESSING METHOD IT USES", Wakabayashi et al., Ser. No. 07/910,851, filed Jul. 7, 1992, now U.S. Pat. No. 5,461,704.

BACKGROUND OF THE INVENTION

1. Field of the Invention

The present invention relates to information processing devices made up of various types of electronic devices and the accessory control devices that are installed in them and the accessory control devices and the information processing methods used in these information processing devices, and more specifically it relates to configurations that notify of the completion of transfer in cases in which data is transferred from the electronic device to the accessory control device and the information processing methods used in those cases.

2. Related Art

In recent years, personal computers, word processors, workstations and other electronic devices founded on digital operation, and printers, facsimile machines, electronic pocketbooks, electronic musical instruments, electronic cooking appliances, electronic cameras and other electronic devices containing microprocessors are being used in all areas of society. Further, the use of microprocessors is spreading to automobiles, robots and machine tools, as well as all types of electric products.

Devices founded on this type of digital logic operation have the potential of flexible control and data processing as compared with simple feedback control, etc., realized with hardware only, and they also have the advantage of being able to change essential functions by changing the software. Therefore, it is possible to realize completely different control within the same hardware just by changing the contents of the ROM where procedures (i.e., software programs) are stored, or loading a new program to the main memory from an external device such as a floppy disk. Another advantage is the ability to upgrade functions just by changing the software.

However, since the throughput of the processor that actually performs control is dependent on the hardware, i.e., number of operations per unit time, number of bits that can be handled at one time and width of the bus that performs data transfer, improvement by upgrading the software is limited to only improved useability, and any significant improvement in the performance of the existing electronic device cannot be achieved. Further, upgrading by changing the software requires replacement of the ROM if the software is burned into the ROM, thus making it difficult in many cases. Therefore, upgrading the software is difficult in cases except in which ROM replacement is designed into the device from the beginning or the software is supplied on a replaceable medium such as a floppy disk.

In personal computers, for example, accelerators are used which improve the functionality of the entire computer by completely replacing the microprocessor, but this requires replacement of the CPU on the motherboard or other difficult operations that cannot by performed by just anyone. In electronic devices intended for use as a personal computer, a connector is often provided for the installation of ROM cards, font cartridges, etc. If an accessory control device could be installed in this connector, the functionality of the electronic device could be improved, added to or changed, but examination of the data transfer bus of these connectors will show that many of them are read-only signal lines as seen from the internal processor, in which case an accelerator cannot be installed in the connector since it cannot receive data from the processor in the electronic device.

Normally, no consideration has been made regarding the improvement or changing of the functionality of printers, facsimile machines, electronic pocketbooks, electronic musical instruments, electronic cooking appliances, electronic cameras and other consumer electronics containing a microprocessor, electrical equipment for automobiles, robots, machine tools and other industrial electronic apparatus, and all types of electric appliances, and even if a connector for expansion is provided, it is generally restricted to the function of only reading out data. This problem is described in detail below using a page printer as an example.

In recent years, the diffusion of laser printers and other page printers has become extremely widespread, and high speed output devices for data from computers have become common. In the case of laser printers, their resolutions range from 240 to 800 dots per inch (DPI), and printers capable of printing several pages a minute are being developed. These printers employ a xerography unit that uses a photosensitive drum as the engine for printing, and since they continuously perform each of the charging, exposure, toner application and transfer processes in sync with the rotation of the photosensitive drum, printing processing begins after the image for a single page is stored in memory.

Therefore, the memory provided in page printers for image development must have the capacity to hold the image for at least one page, and if compression of image data is not performed, the capacity is determined by the resolution and the size of the paper that can be processed. For example, in the case of a resolution of 300 DPI and a paper size of 8 inches by 10 inches, then 7,200,000 (8×10×300× 300) dots must be manipulated and at least a 0.9-megabyte memory is required.

In printers with a function that receives character codes, row and column pitch and other information as print data and expands this into the image, or in printers that receive a program described by a page description language and expand the image by interpreting it, it is necessary to calculate and produce a bit image based on this print data, which greatly reduces the overall processing speed compared to simple bit image transfer. That is, the processing speed of a printer is determined mainly by the throughput of the processor that performs processing and memory access time and falls far short of the printing throughput of the xerography unit itself.

For example, in a page printer capable of printing 10 pages in one minute, only six seconds is allowed to prepare the image data for one page of printing, and to develop all of this 0.9 megabytes of data in this period of time means that the processing time allowed for one byte is a mere 6.67 microseconds (6 s/0.9 MB). This processing speed can possibly be realized with one of the high-speed RISC type processors currently available on the market. In contrast to this, there are currently many xerography units capable of printing 10 pages per minute. Therefore, the throughput of the controllers that process print data has become a bottleneck in improving overall print speeds.

For this reason, there are cases in which the image developing throughput is always below the xerography unit's throughput in prior art laser printers, and even if it becomes possible to obtain a processor with a high image developing throughput as microprocessor technology advances, it is impossible to improve functionality later. There are some page printers whose functionality can be improved by providing an expansion slot and installing a cartridge with built-in fonts or programs in it, but the structure of the data bus of the slot connector is read only from the cartridge connector and data cannot be transferred to the cartridge and processed.

The purpose of the accessory control device, information processing device and information processing method of the invention is to solve this problem and make it possible to improve, change or add to the overall functionality of electronic devices.

SUMMARY OF THE INVENTION

The present invention relates to configurations that notify the accessory control device of the completion of data transfer in cases in which data is transferred from the electronic device to the accessory control device, and it has the action and effect of realizing reliable data transfer and facilitating the processing of data in the accessory control device in information processing devices made up of an accessory control device installed in an electronic device. Overall, the device makes it possible to perform at least some of the processing on data in the accessory control device, in which case the functions of the electronic device can be improved, added to or changed.

One embodiment of the present-invention is an information processing device comprising an electronic device equipped with a first processor capable of logic operation, a first memory means that stores the processing executed by the processor and a connector to which a signal line of the first processor is connected either directly or indirectly; and an accessory control device connected to the connector of the electronic device; wherein the electronic device is equipped with a data output means that outputs the data to be transferred to the accessory control device via the connector based on processing by the first processor; and the accessory control device is equipped with a data fetch means that receives the notification of data output and fetches the data that has been output.

When the data output means outputs data via the connector, the information processing device notifies the accessory control device of same by means of the data output notification means. When it receives this notification, the accessory control device fetches the data output from the electronic device via the data fetch means.

Here, the accessory control device can be a simple electronic circuit having no processor, or it may be equipped with a second processor that executes processing separate from the first processor and it may also be equipped with a second memory means that stores procedures executed by the second processor.

The second processor may perform processing unrelated to the transferred data, but it may also process the data sent from the electronic device.

The accessory control device can be equipped with an interrupt request receiving means that receives the notification from the data output notification means of the electronic device as an interrupt signal for the second processor. By performing notification using interrupts, notification can be performed efficiently.

A configuration is also possible in which a notification cancel means is used to cancel notification from the data output notification means when the second processor fetches the data output by the data output means of the electronic device. In this case, the electronic device can know that the transferred data was read by the accessory control device after notifying it of the transfer of data, thus facilitating efficient transfer of subsequent data.

The data output notification means of the electronic device can have configurations other than this; for example, it can be configured as a means that performs notification of data transfer by writing data to a register readable by the second processor. In this case, the data fetch means of the accessory control device should be equipped with a judgment means that judges whether or not the prescribed data have been written to the register and a means that fetches the data output by the data output means of the electronic device when the prescribed data have been written to the register.

It is also desirable that a notification cancel means be provided that erases the data in the register written by the data output notification means when the second processor fetches the data output by the data output means of the electronic device to thereby notify the electronic device that the transfer of data is complete.

Further, the data output notification means of the electronic device can be configured as a means that performs notification of data transfer by outputting a signal to the input port of the second processor. In this case, the data fetch means of the accessory control device can be equipped with a judgment means that judges whether or not the prescribed signal has been input to the input port and a means that fetches the data output by the data output means of the electronic device when the prescribed signal is input to the input port.

In order to notify the electronic device of the completion of data transfer, it is desirable to provide the data fetch means of the accessory control device with a data transfer completion notification means that notifies the first processor of the electronic device of the completion of transfer of data.

If a data signal line is connected to the connector of the electronic device in which the accessory control device is installed, data can be transferred via this, but in some cases this data signal line may be a read-only signal line as seen from the electronic device. In this case, the data output means can be configured as a means that reflects the data to be transferred in an address signal and the data fetch means of the accessory control device can be configured as a means that fetches the data reflected in the address signal from the output address signal. This configuration makes it possible to transfer signals to an accessory control device to which data transfer was not originally possible.

In addition to an address signal, a control signal can also be used. That is, in a case in which at least a control signal line of the first processor is connected to the connector of the electronic device, the data output means can be configured as a means that reflects the data to be output in a control signal and outputs it, and the data fetch means of the accessory control device can be configured as a means that fetches the data reflected in the control signal from the output control signal.

The accessory control device can be provided with a third memory means that stores the procedure which performs data transfer in the electronic device, which is the procedure executed by the first processor of the electronic device, In this case, an electronic device that performs specific processing alone without the accessory control device installed can be easily given new processing functions as an information processing device.

Also, it is desirable that the accessory control device be configured as a cartridge equipped with a printed circuit board on which at least the second processor is mounted and having a case that houses the printed circuit board to facilitate its use as a single unit.

The second processor should be positioned for effective radiation of heat while the accessory control device is mounted in the electronic device. For example, if more than half of the accessory control device extends out from the electronic device when installed in the electronic device, then the exposed part of the printed circuit board in the accessory control device can be considered, and if the majority of the accessory control device is housed inside the electronic device, then a position that can be easily cooled by the ventilated air inside the electronic device should be considered.

The accessory control device can also be equipped with a processed data output means that processes the data read by the data fetch means and outputs the data after being processed to the electronic device. In this case, the overall information processing capability can be improved.

The electronic device that makes up the information processing device can be equipped with a display means that performs display of at least characters, graphics, or colors (e.g., drawing on a CRT or printing on a printer), and the accessory control device can be equipped with an image data generation means that generates image data for display on the above display based on data transferred from the electronic device. In image processing, there is often much data to be processed which requires much time, but by generating image data in the accessory control device, it is possible to improve overall processing capability. In this case, the electronic device can also be a printer that receives print data and prints it.

The present invention contrived as an accessory control device is an accessory control device connected to an electronic device via a connector provided on the electronic device which is equipped with a first processor capable of logic operation and a first memory means that stores the processing executed by the processor, wherein the accessory control device is equipped with a data fetch means that fetches the output data when the electronic device outputs the data to be transferred to the accessory control device via the connector based on processing by the first processor and notifies the accessory control device of the output of data.

When this accessory control device receives the output of data by the electronic device via the connector based on processing by the first processor together with notification, the accessory control device fetches the data output from the electronic device by means of a data fetch means. Here, the accessory control device can be merely an electronic circuit without a processor, or it may be equipped with a second processor that executes processing separate from the first processor of the electronic device and also be equipped with a second memory means that stores procedures executed by the second processor.

The second processor may perform processing unrelated to the transferred data, or it may perform processing of the data transferred from the electronic device. In addition, the accessory control device may take on the various configurations explained above.

The present invention contrived as an information processing method is a method performed by the electronic device, which is equipped with a first processor capable of logic operation and a first memory means that stores processing performed by this processor, and the accessory control device, which is connected to the electronic device via a connector and has a second processor that performs processing separate from the first processor, working together; wherein in the electronic device the data to be transferred to the accessory control device are output via the connector and the accessory control device is notified of the output of data, and in the accessory control device the notification is received and the data is received via the connector.

Data transfer from the electronic device to the accessory control device is performed by means of notification. Further, the electronic device can be notified of the reception of the data by the accessory control device.

Here, the notification of data transfer can be performed by interrupt requests. Notification can also be performed by writing data to a register readable by the second processor. Further, it can also be performed by outputting a signal to the input port of the second processor.

Other objects, advantages, and attainments together with a fuller understanding of the invention will become apparent and appreciated by referring to the following description and claims taken in conjunction with the accompanying drawings.

BRIEF DESCRIPTION OF THE DRAWINGS

FIG. 1 is a generalized block diagram showing a printer device which is an embodiment of the invention.

FIG. 2 is block diagram showing the configuration of electronic control device 10 built into main printer unit 1 of the embodiment.

FIG. 3 is a perspective view showing the outside of cartridge 3 and its attachment to main printer unit 1.

FIG. 4 is a block diagram showing the general internal configuration of cartridge 3.

FIG. 5 is a flowchart of the printing handler routine executed by electronic control device 10 of main printer unit 1.

FIG. 6 is a flowchart of the data transfer handler routine for same.

FIG. 7 is a flowchart of the data developing handler routine executed in cartridge 3.

FIG. 8 is an explanatory diagram for explaining readout of data from ROM 91 which is performed using data as an index.

FIG. 9 is a block diagram showing another configuration that transfers data from electronic control device 10.

FIG. 10 is a block diagram showing another configuration of same.

FIG. 11 is a block diagram showing the overall configuration of the second embodiment.

FIG. 12 is an exploded perspective view showing the configuration of cartridge 503 in the second embodiment.

FIGS. 13a and 13b shows plane views of the top and bottom of printed circuit board 550 indicating where the elements are mounted, FIG. 14 is an explanatory diagram showing the configuration of signal lines in the connector CN11.

FIG. 15 is an explanatory diagram showing the address map of cartridge 503 as seen from electronic control device 501.

FIG. 16 an explanatory diagram showing the address map of cartridge 503 as seen from microprocessor 601.

FIG. 17 is a block diagram showing the internal configuration of cartridge 503.

FIGS. 18a to 18c constitute a circuit diagram showing an example configuration of interrupt request registers 640.

FIG. 19 is a circuit diagram showing an example configuration of polling command registers 643.

FIG. 20 is an explanatory diagram showing the contents of status registers 645.

FIG. 21 is a circuit diagram showing an example configuration of read control circuit 620.

FIG. 22 is a flowchart of the processing performed by electronic control device 501 for realizing data transfer using read control circuit 620.

FIG. 23 is an explanatory diagram showing the configuration of data in ROM 671.

FIG. 24 is a flowchart of the processing performed by cartridge 503 for realizing data transfer using read control circuit 620.

FIG. 25 is a flowchart showing the processing performed by electronic control device 501 for realizing data transfer using FIFO control circuit 623.

FIG. 26 is a flow chart showing the processing performed by cartridge 503 for realizing data transfer using FIFO control circuit 623.

FIG. 27 is a circuit diagram showing an example configuration of double-bank control circuit 624.

FIG. 28 is a flowchart of the processing for beginning data transfer using double-bank control circuit 624.

FIG. 29 is a flowchart of the response processing executed in electronic control device 501 of same.

FIG. 30 is a flowchart of the processing executed in electronic control device 501 for realizing data transfer using double-bank control circuit 624.

FIG. 31 is a flowchart of the processing executed in cartridge 503 for realizing data transfer using double-bank control circuit 624.

FIG. 32 is a timing chart showing the timing for the printing of image data performed by controlling laser engine 505.

FIG. 33 is a circuit diagram showing an example configuration of a circuit that transfers data by superposing serial data on an address signal.

FIG. 34 is an explanatory diagram showing the relationship between the data to be transferred and read processing.

FIG. 35 is a circuit diagram showing another example configuration that transfers serial data by superposing it on an address signal.

FIG. 36 is a circuit diagram showing an example configuration of a circuit that provides a register corresponding to each bit of the data to be transferred and transfers data by setting the registers.

FIG. 37 is an explanatory diagram showing the relationship between each bit of the data and the register addresses.

FIG. 38 is a circuit diagram showing an example configuration of a circuit that performs data transfer using a counter.

FIG. 39 is another circuit diagram showing an example configuration of same.

FIG. 40 is a circuit diagram showing an example configuration of a circuit that reproduces an interface with an external device as is in the connector part of the cartridge.

FIG. 41 is a block diagram showing a configuration that inputs a data transfer notification signal directly to the input port of the processor.

DETAILED DESCRIPTION OF THE INVENTION

Several illustrative embodiments are explained below, but due to the wide area covered by the explanations, they are divided up into the following items.

[i] First Embodiment

A. Overall Configuration of Hardware
B. Configuration and Operation of Electronic Control Device 10
C. Configuration of Cartridge 3
D. Transfer of Data from Electronic Control Device 10
E. Electronic Control Device 10 and Cartridge 3 Working Together
F. Effectiveness of First Embodiment
G. Example Modification of First Embodiment—No. 1
H. Example Modification of First Embodiment—No. 2

[ii] Second Embodiment

A. Explanation of Overall Configuration
B. Structure of Cartridge
C. Address Space of Cartridge
D. Internal Configuration of Cartridge
E. Explanation of Data Transfer Controller 603
F. Explanation of Registers G. Configuration and Operation of Read Control Circuit 620

H. Configuration and Operation of FIFO Control Circuit 623

I. Configuration and Operation of Double-Bank Control Circuit 624

J. Printing of Image Data

K. Effectiveness of Second Embodiment

L. Other Embodiments
  (1) Configuration Utilizing Address Bus as Communication Line—No. 1
  (2) Configuration Utilizing Address Bus as Communication Line—No. 2
  (3) Configuration Transferring Data by Setting Each Bit of Data to Be Transferred by Means of a Data Read Signal
  (4) Configuration Transferring Data Using a Counter
  (5) Configuration Performing Data Transfer Using a Control Signal
  (6) Configuration Transferring Data by Reproducing a Signal as Received from Outside M. Other

[i] First Embodiment

A. Overall Configuration of Hardware

First is an explanation of an embodiment in which the invention is applied to a printer. FIG. 1 illustrates the general configuration of a main printer unit 1 having a cartridge 3 installed in it.

As shown in the figure, main printer unit 1 is a "page printer" that uses a xerography method, to form an image on paper P based on print data sent from external computer 5. Inside main printer unit 1 are disposed electronic control device 10, which inputs print data and develops the image, the address bus of electronic control device 10, connector 11 to which the data bus, etc., are connected, semiconductor laser device 12 driven by electronic control device 10, xerography unit 15 configured around photosensitive drum 14, paper cassette 17, which houses paper P, transport mechanism 19, which transports paper P so that it comes in contact with the outside circumference of photosensitive drum 14, thermal fixing roller 21 which fixes the toner by heating paper P to which the toner has been transferred, and tray 23 into which the printed paper P is ejected.

Xerography unit 15 comprises a charging unit 25 that charges the surface of photosensitive drum 14, a toner unit 27 that applies toner, which has been charged itself, to areas where the charge has been dissipated by a laser beam from semiconductor laser device 12, and a toner removal unit 29 that removes toner remaining on photosensitive drum 14 after transfer to paper P. Electronic control device 10 drives semiconductor laser device 12 synchronously with the rotation of photosensitive drum 14 so that areas corresponding to the image to be printed are irradiated with a laser beam to form a latent image. Since those areas irradiated by the laser beam lose their charge, the toner charged with the same sign as photosensitive drum 14 is transferred to only those areas that have lost their charge.

One sheet of paper P is pulled from paper cassette 17 in sync with the rotation of photosensitive drum 14 and is transported to photosensitive drum 14 by transport mechanism 19. Since paper P is transported between photosensitive drum 14 and transfer roller 30, the majority of the toner on photosensitive drum 14 is transferred to paper P. Paper P is transported to the heat fixing roller 21 with the toner on its surface, and here the toner is melted by heat and fixed to paper P. This is a brief explanation of the printing process in main printer unit 1, but the invention is not limited to laser printers and can also be applied to printers that use LEDs for exposure of photosensitive drum 14, printers that use an ink jet method for printing and other types of printers.

B. Configuration and Operation of Electronic Control Device 10

As shown in FIG. 2, electronic control device 10 is configured as an arithmetic logic operation circuit centering around CPU 31, which is a commonly used processor that performs all processing, and in the configuration, each of the elements below are connected to address bus 32, data bus 34 and control signal bus 36. The elements connected to these buses include address decoder 41, ROM 43, dynamic RAM (DRAM) 45, memory control unit (MCU) 47, I/O port 49, laser I/F 51 and connector 11. Each element is connected in such a way that it can read and write to each bus, but only connector 11 is provided with a bus driver 52 between it and data bus 34, and as seen from the CPU, cartridge 3 connected to connector 11 is a read-only device.

The address decoder 41 decodes the address signals generated by CPU 31, and when a certain address is specified, it outputs a select signal to ROM 43, DRAM 45, the I/O port 49 and the laser I/F 51 according to the assignments to memory space. The ROM 43 contains a processing program, and normally CPU 31 operates according to the program stored in ROM 43. The DRAM 45 is used to develop the image data, and since it is necessary to store image data for at least one page, it has a 2 megabyte capacity in this embodiment.

MCU 47 analyzes the control signal output by CPU 31, outputs control signals for ROM 43 and DRAM 45, outputs read-write signals for memory and the I/O port, and determines the refresh timing for DRAM 45. Refresh timer 53 is connected to MCU 47, which receives a signal from the refresh timer 53, and if MCU 47 judges that it is a timing at which refresh is possible, then MCU 47 outputs the refresh addresses to DRAM 45 via multiplexer 55. I/O port 49 receives print data from external computer 5 and also serves as an interface for the motor, etc., which are not shown, of xerography unit 15. Further, laser I/F 5 1 is connected to cartridge 3, which drives semiconductor laser device 12, and serves as the interface for semiconductor laser device 12. Electronic control device 10 is also provided with a timer 57 connected to connector 11 and CPU 31.

The basic functions of main printer unit 1 equipped with this electronic control device 10 are to develop the print data (data already developed into a bit image) received from external computer 5 via I/O port 49 in the internal DRAM 45, and control xerography unit 15 and drive semiconductor laser device 12 when the data for one page have been prepared so that the image data is printed as is. In addition to these basic functions, main printer unit 1 of this embodiment is capable of a higher level of printing as an expansion function using a cartridge connected to connector 11. In the case of this main printer unit 1, a cartridge 3 with a built-in processor as described below can be connected to it in addition to existing cartridges such as font cartridges containing fonts and cartridges containing programs that interpret page description languages.

C. Configuration of Cartridge 3

As shown in FIG. 3, cartridge 3 is installed in connector fitting 61 on main printer unit 1, and in contrast to the rectangular solid shape of the end inserted in connector fitting 61, that part protruding from the case of main printer unit 1 has a trapezoidal-shaped longitudinal section. When cartridge 3 is inserted in connector fitting 61, the connector on the end of cartridge 3 engages connector 11, and both become electrically connected. In this condition, the raised part of cartridge 3 moves to a position that brings it nearly in contact with the case of main printer unit 1. The front part of cartridge 3 that protrudes from the case of main printer unit 1 is inclined on top so that no objects can be inadvertently placed on it.

FIG. 4 is a block diagram of the internal configuration of cartridge 3. In the figure, bus lines are drawn as single lines, but bus lines are drawn with slanted lines where they bend and branch off to distinguish them from signal lines (lines with right-angle bends).

Cartridge 3 contains a CPU 71, which is a processor different from CPU 31 in electronic control device 10 in main printer unit 1. This CPU 71 is a RISC type, which is suited to the processing of page description languages. Address bus CAD of CPU 71 is also connected to a ROM 73 containing the page description language processing program, a RAM 75 where data is stored, a logic array 77 and a selector 79, which perform switching of the address bus of CPU 71. Further, data bus CD is connected to ROM 73, RAM 75, the data input side D of a first latch 81, the data output side O of a second latch 82 and the output side of a bi-directional first buffer 84.

When cartridge 3 is installed in connector 11 of main printer unit 1, address bus PAD, read-only data bus PD, interrupt signal line IA and timer 57 signal line TB of electronic control device 10 are connected to connector 90 of cartridge 3. Address bus PAD is connected to selector 79, ROM 91 and logic array 77. Data bus PD is connected to unidirectional second buffer 92. Since cartridge 3 realizes bi-directional exchange (reading and writing) of data via read-only data bus PD, the internal configuration is somewhat complicated. This is explained further below.

The bus on the input side of second buffer 92 is called the output bus OD. ROM 91 data, output O of first latch 81, the input D of second latch 82 and the output of unidirectional third buffer 93 are connected to output bus OD. The input side of third buffer 93 is a bus to which first buffer 84 and data terminal of RAM 95 are connected. This bus is called the print data bus PCD. Latches 81, 82 are tristate output devices, and depending on control by logic array 77, they can latch the contents of the input D and hold them at output O, and also depending on control by logic array 77, they can make that output high impedance. Logic array 77 also controls selector 79 and RAM 95, which elements operate as follows according to control by logic array 77. Logic array 77 controls these according to the address specification by CPU 71 via address bus CAD or according to the address specification of CPU 31 in electronic control device 10 via address bus PAD.

D. Transfer of Data from Electronic Control Device 10

When there is a specification from CPU 31 in electronic control device 10 to read the contents of a prescribed address in RAM 95 in cartridge 3, the address is analyzed and logic array 77 switches selector 79 to enable address bus PAD and sets RAM 95 to a read condition. The data read from RAM 95 is passed to CPU 31 in electronic control device 10 via print data bus PCD, third buffer 93, output bus OD, second buffer 92 and data bus PD. Therefore, by having CPU 71 in cartridge 3 write the desired data in advance in a prescribed area of RAM 95 via the data bus CD, first buffer 84 and print data bus PCD, the desired data can be passed from cartridge 3 to electronic control device 10.

There is one more way desired data can be passed from cartridge 3 to electronic control device 10. Since first latch 81 is connected to data bus CD of CPU 71, CPU 71 can hold the desired data in first latch 81. If electronic control device 10 specifies an address assigned to first latch 81 in this condition, then logic array 77 enables output from first latch 81, thus making it possible to pass that data to electronic control device 10.

The data bus that connects electronic control device 10 and cartridge 3 is read-only as seen from electronic control device 10, and therefore data from cartridge 3 can be easily passed as described above, but cartridge 3 cannot receive data through normal access. Therefore, using the above configuration, data is passed to cartridge 3 by the following method in this embodiment.

When CPU 31 in electronic control device 10 specifies to read the contents of a prescribed address in ROM 91, this address is analyzed and logic array 77 drives second latch 82 at a prescribed timing. As a result, the data read from ROM 91 is latched in second latch 82, thus making it possible for CPU 71 in cartridge 3 to read the data. Second buffer 92 is closed at this time, and therefore CPU 31 in electronic control device 10 cannot read this data. Not closing second buffer 92 and allowing CPU 31 to read the data does not present a problem.

CPU 71 outputs the prescribed address to logic array 77 via address bus CAD, enables the output of second latch 82, reads the contents and stores them in RAM 75. Therefore, by storing data related to that address in a prescribed area in ROM 91 in advance and changing the data to be passed from electronic control device 10 to the address in ROM 91 and accessing it, data can be passed from electronic control device 10 to cartridge 3.

E. Electronic Control Device 10 and Cartridge 3 Working Together

In this embodiment, cartridge 3 is capable of processing a page description language, and main printer unit 1 passes the page description language sent from external computer 5 to cartridge 3, receives the processed result and drives xerography unit 15 to perform printing. FIG. 5 is a flowchart of the printing handler routine executed by electronic control device 10.

When print processing is started, CPU 31 in electronic control device 10 first performs processing that reads the contents of a prescribed address (step S100). Since this address returns specific data when cartridge 3 is installed, if it is not the specific data (step S110), then the print data is received from external computer 5 as though cartridge 3 is not installed, and electronic control device 10 generates image data for one page accordingly (step S120).

In the case in which the contents of the prescribed address are the specific data and cartridge 3 is judged to be installed (step S110), the print data is received from external computer 5 and transferred to cartridge 3, and cartridge 3 performs a series of processes that receives image data developed from the print data (step 140). Processing of data transfer is discussed below. This data transfer processing is realized by CPU 31 in main printer unit 1 directly executing a program in cartridge 3.

By means of the above processing, the image data generated by electronic control device 10 when cartridge 3 is not installed or the image data developed in cartridge 3 when cartridge 3 is installed are stored in DRAM 45. Processing is then performed that drives xerography unit 15 according to this image data and prints the image on paper P (step 150). This has been a summary of the printing processing performed in main printer unit 1.

The transfer of data from electronic control device 10 to cartridge 3 is realized by the data transfer handler routine of main printer unit 1 shown in FIG. 6 and by the data developing handler routine of cartridge 3 shown in FIG. 7. Electronic control device 10 in main printer unit 1 initiates the handler routine shown in FIG. 6 when there is data to be transferred to cartridge 3. When this processing is initiated, electronic control device 10 reads address YYYYh+DDh of ROM 91 in cartridge 3 using the hexadecimal data DDh (h is a code indicating a hexadecimal number) to be transferred as an index (step S200).

When this operation is received, logic array 77 controls second latch 82 in cartridge 3 so that it latches the data read from ROM 91. As shown in FIG. 8, data from OOh to FFh are written to the 256 bytes after address YYYY in ROM 91. Therefore, when reading beginning from the address YYYY using the data DDh to be transferred as an index, the data corresponding to the index are output to the output bus OD, and these are then latched by the second latch 82. In FIG. 8, an example is shown in which the data to be transferred is 41h.

At this time, CPU 71 in cartridge 3 is executing the data developing handler routine, by which it first judges whether the second latch 82 has latched the data (step S210) and stands by until the data is latched. Since the latching of data by latch 82 is performed by logic array 77, it can be determined whether or not data have been latched by latch 82 by judging the internal condition of logic array 77.

Following latching of the data by the second latch 82, the CPU performs processing that transfers the data from the second latch 82 to RAM 75 (step S220) and judges whether or not all of the print data for one page have been read from electronic control device 10 (step S230). The processing in steps S210 to S230 is repeated until all of the print data for one page have been read. Here, the data sent from electronic control device 10 and transferred to RAM 75 are the page description language program.

When all of the print data for one page have been read (step S230), CPU 71 performs processing that develops the data (step S240). Here, the data developing processing performed by CPU 71 is referred to as graphic processing or other type of processing that develops a 300 DPI image from a page description language program, and it generates the image data. The final processing result is sequentially developed in RAM 95 (step S250), and the above processing is repeated until developing of the data and storing of the processing result are completed (steps S240 to S260). The data developing processing performed here (step S240) is performed by CPU 71, which is a different processor than CPU 31 in electronic control device 10. Upon completion of data developing (step S260), processing escapes to END and is terminated, but the developed image data is sequentially transferred to electronic control device 10 (FIG. 5, step S140).

F. Effectiveness of First Embodiment

As described above, by means of main printer unit 1 and cartridge 3 of this embodiment, cartridge 3, which is equipped with a processor suited to image processing, is installed in connector 11 in electronic control device 10, and data is transferred from main printer unit 1 to cartridge 3. At this time, electronic control device 10 notifies CPU 71 of cartridge 3 regarding the transfer of data by latching data in latch 82, and therefore cartridge 3 immediately reads the transferred data. As a result, electronic control device 10 is then capable of transferring the next data and data transfer from electronic device 10 to cartridge 3 is continued.

Cartridge 3 receives the transferred data and develops the image. Therefore, compared to the case in which the processing program of the page description language is merely supplied by cartridge 3, the throughput of the page description language is greatly improved. Further, it is also possible to supply a higher level page processing language via cartridge 3.

Also, though only a connector 11 provided for the purpose of supplying fonts and the processing program of the page description language to main printer unit 1 and having only a read-only data bus as seen from electronic control device 10 is used, it is possible to transfer data to cartridge 3. Therefore, it can be used in existing printers not designed to receive cartridges equipped with a processor, thereby improving the effective utilization of equipment. Normally, as the functionality of computers is improved, printers become a bottleneck, and in many cases the entire printer itself is replaced when the functionality of the computer is upgraded, but not only is a cartridge with a high-function processor installed in main printer unit 1 by means of this embodiment, it is also extremely cost effective.

Further, since the data to be transferred is included as part of the address and the data is fetched using a ROM 91 in which the data, having a one-to-one correlation with the addresses, are stored, the correlation between the addresses and the data is easy to understand. On the other hand, the data to be transferred can also be enciphered by destroying the correlation between the addresses and the data. Also, a RAM can be used in place of ROM 91, in which case a table for fetching the data is laid out within a prescribed range of addresses as part of an initialization process, for example, before the data is transferred.

G. Example Modification of First Embodiment—No. 1

In the first embodiment described above, a ROM 91 in which data corresponding to addresses was used to write data through a read-only signal line. That is, address signals are handled as addresses, and the transfer of data is realized by using a ROM 91 in which data having correlation to the addresses are stored. However, the writing of data using a read-only signal line is not limited to this configuration; e.g., a configuration is possible in which part of the addressing at the time of read out is latched directly as data. This configuration, as shown in FIG. 9, uses a tristate buffer 19 instead of ROM 91 which performed address-data conversion in the embodiment described above.

When data is transferred from electronic control device 10 in this configuration, CPU 31 of electronic control device 10 reads data at the effective address (YYOOh+Dh) determined by both the previously set address YYOOh as an index and the displacement (lower 8 bits in this case) of the data D to be transferred. Logic array 77 at this time opens tristate buffer 191 and outputs the lower 8 bits of the address, while it also sends the latch signal DL to latch 82 and causes latch 82 to hold the lower 8 bits of the address output by tristate buffer 191.

As a result, the data D to be transferred is held in latch 82, and when it receives notification of the transfer data, CPU 71 in cartridge 3 is able to read this data, as in the embodiment described above. Transfer of this data to RAM by CPU 71 is the same as in the above configuration. By means of this configuration, only the tristate buffer need be used in place of the ROM, thus simplifying the configuration and reducing the cost. Further, if a ROM is used, time must be allowed for reading data from ROM, but in the configuration shown in FIG. 9, this read time is not required, thus facilitating high speed data transfer.

H. Example Modification of First Embodiment—No. 2

Instead of a configuration that latches the output of tristate buffer 191 in latch 82, a configuration is possible that stores the lower 8 bits (AD0–AD7) of the address, which is the data being transferred, directly in RAM in cartridge 3 as shown in FIG. 10. This configuration can be realized using tristate buffers 291, 292, 293 and RAM 295. Each of the elements are connected as follows.

The most significant 4 bits (AD24–AD20) of the 24-bit address signal (AD23–AD0) from electronic control device 10 are connected to an address decoder, which is not shown, and function to cause a specific area to become a write area for data and another area to become a read area. In this example, /?the addresses [AD23, AD22, AD21, AD20] become [1000], i.e., the most significant bits make the 8h range a write area, and the addresses [AD23, AD22, AD21, AD20] become [1001], i.e., the most significant bits make the 9h range a read area.

The 20 bits of the address signals AD19 to AD0, however, are connected as follows. Of the address signals AD19 to AD0, the least significant 8 bits (AD7–AD0) are connected to the input side of first tristate buffer 291, the next 12 bits (AD19–AD8) are connected to the input side of second tristate buffer 292, and the lower 12 bits (AD11–AD0) are connected to the input side of the third tristate buffer 293. The outputs of first and second tristate buffers 291, 292 are enabled when an address corresponding to a write operation on RAM 295 is accessed, and they go to a high impedance condition at other times. The output of first tristate buffer 291 is connected to the data input of RAM 295. The output of second tristate buffer 292 is connected to addresses RA11–RA0 in RAM 295.

The output of third tristate buffer 293 is enabled when an address corresponding to a read operation is accessed, and at all other times it is high impedance. This output has a wired OR connection with the output of second tristate buffer 292 and is input to addresses RA11–RA0 in RAM 295. RAM 295 has a 4-kilobyte capacity, and its effective addresses are 12 bit, i.e., from 000h to FFFh.

When electronic control device 10 writes the data DDh to a prescribed address (e.g., C5Ah) in RAM 295 in cartridge 3, the contents of the address 8C5ADDh may be read out. Since access of the addresses 8XXXXXh by electronic control device 10 is judged as a write operation, the outputs of the first and second tristate buffers 291 and 292 are enabled. That is, RAM 295 goes to a write mode, addresses AD19–AD8 from electronic control device 10 are output to the addresses RA11–RA0, and the data DDh are written to these addresses. When data transfer has been performed, notification that data was transferred from electronic control device 10 to cartridge 3 is given every byte or every several bytes. This notification can be performed, for example, by writing special data to a prescribed address in RAM 295.

When electronic control device 10 reads the contents of a prescribed address (e.g., C5Ah) in RAM 295 in cartridge 3, the contents of the address 9XXC5Ah can be read. Since access of the address 9XXXXXh by electronic control device 10 is judged as a read operation, the output of third tristate buffer 293 is enabled. That is, RAM 295 is set to a read mode, addresses AD11–AD0 from electronic control device 10 are output to addresses RA11–RA0, and the contents of these addresses are read. By using this configuration, electronic control device 10 can write to or read from any desired address in RAM 295 in cartridge 3.

[ii] Second Embodiment

A. Explanation of Overall Configuration

This embodiment combines a cartridge 503 as an accessory control device with a laser printer 500 as an electronic device. Laser printer 500 uses a xerography unit as in the main printer unit of the first embodiment, and the part that prints using a photosensitive drum functions independently as laser engine 505. Electronic control device 501, which performs control of the entire laser printer 500, can perform printing by only sending commands to laser engine 505 via connector CN 10 and transferring image data to a prescribed buffer.

As shown in FIG. 11, inside electronic control device 501 are disposed a commonly used CPU (Motorola's MC68000 in this embodiment), a ROM 511 that stores the programs executed by CPU 510, a RAM where print data or image data subsequent to being developed are stored, a data input port 514 that receives print data from host workstation 505, a line buffer 515 connected to bus line 516 which exchanges data with cartridge 503, a register 517 for exchanging commands and status information with laser engine 505, a console panel I/F 519 that serves as the interface with console panel 518 of laser printer 500, and a double-buffer circuit 520 where the image data to be transferred to laser engine 505 is stored. The bus line configuration and the control line configuration are the same as in the first embodiment and so they are simplified in this figure.

Double-buffer circuit 520 is equipped with the RAMs 520A and 520B, capable of holding 8 lines of print data, i.e., 4-kilobyte capacity, for printing by laser engine 505, and image data from CPU 510 are written alternately to these RAMs by the memory write controller 520C. Laser engine 505 performs printing by reading these two RAMs 520A and 520B alternately via the memory read controller 520D and converting the image data to a video signal in sync with the rotation of the photosensitive drum. RAMs 520A, 520B are provided and written and read alternately because access from CPU 510 and access from laser engine 505 must be performed independently.

After CPU 510 has written data to one RAM, it sets a flag at a prescribed bit in register 517. In response, laser engine 505 checks this flag and reads the image data stored in the RAM where the data were written. During reading, it sets a flag at another bit in register 517 to let CPU 510 know which RAM is being read. Since the other RAM is not accessed by laser engine 505 at this time, CPU 510 writes the next 8 lines of image data to this RAM during this time. When laser engine 505 finishes reading from one RAM, it resets the flag and switches to reading from the other RAM. Since the speed with which CPU 510 writes data is faster than the speed with which laser engine 505 reads data, i.e., speed with which printing is executed, it is easy to avoid interference between memory access by the two and realize the reliable transfer of one page of image data.

Cartridge 503 is mounted in connector CN11 of electronic control device 501. The relationship between laser printer 500 and cartridge 503 mounted in it is the same as in the first embodiment, in that electronic control device 501 judges whether cartridge 503 is installed in connector CN11 at the time of power on, and if it is judged to be installed, then after resetting, etc., are performed in electronic control device 501, it jumps to a prescribed address in the ROM (described below) provided in cartridge 503, after which the processing provided in cartridge 503 is executed in sequence. Cartridge 503 interprets the program generated by the page description language and output from workstation 507 to laser printer 500 and develops it into image data and laser engine 505 performs printing, which are the same as in the first embodiment.

B. Structure of Cartridge

Cartridge 503 of this embodiment, which is installed in the cartridge connector CN11 of printer 500, has a structure like that shown in FIG. 12 in which a multilayer printed circuit board 550 (printed circuit board below) is inserted between an upper case 521U recessed on the inside and a plate-like lower case 521L and a cap 540 is inserted on the connector side of printed circuit board 550. Microprocessor 601 described below and other circuit elements are mounted on printed circuit board 550. Both upper case 521U and lower case 521L are made from aluminum. Due to the high heat conductivity of aluminum, the heat generated by the internal elements can be effectively carried outside and released.

Two grounding spring members 522 for securing a ground connection with the main printer unit are fixed to lower case 521L with rivets 524, and a cylindrically shaped piece of silicon rubber 526 for applying pressure on printed circuit board 550 up from below is fitted in rubber retainer 528 on the inside surface of the lower case. Silicon rubber 526 for applying pressure is disposed directly below microprocessor 601. A sheet shaped piece of silicon rubber 552 for radiating heat is positioned between the top surface of microprocessor 601 and the inside surface of upper case 521U to improve contact and heat conductivity. When cartridge 503 is assembled, the silicon rubber 526 for applying pressure pushes up on printed circuit board 550 to improve the contact between microprocessor 601, the silicon rubber 552 for radiating heat and upper case 521U. As a result, good thermal conduction from microprocessor 601 to upper case 521U is achieved.

In assembly, first upper case 521U is turned upside down and silicon rubber 552 for radiating heat is fixed in a prescribed position on upper case 521U, after which printed circuit board 550 is secured to the inside of the upper case by one screw 560. Lower case 521L is then fitted in upper case 521U and each of the corners are secured in place with screws 562. Cartridge 503 is then completed by inserting cap 540 in the cap opening between upper case 521U and lower case 521L.

FIG. 13A is a plane view showing the top of printed circuit board 550, and 13B is a plane view showing the bottom of printed circuit board 550. As shown in FIG. 13 (A), microprocessor 601 is attached at one end to the top surface of printed circuit board 550, and at the other end is formed an insertion plug 551 in which multiple electrodes are formed in a row for connecting to the connector of the main printer unit.

On each of the sides of printed circuit board 550 near microprocessor 601 are disposed ROMs 606 to 609 for storing the control program, etc., for microprocessor 601. Four tristate address buffers 617 are disposed in a square pattern in the center of printed circuit board 550 next to microprocessor 601. Four dynamic RAMs 611 to 614 are arranged in a row between ROMs 606 to 609 and plug 551, and between address buffers 617 and plug 551. To simplify the drawing, the wiring pattern formed on the top of printed circuit board 550 is omitted.

Microprocessor 601 is a pin grid array (PGA) type element, and the other elements are SOJ types, SOP types or QFP types. A 25-MHz Am29030 RISC processor (manufactured by Advanced Micro Devices of Sunnyvale, Calif.), for example, is used as microprocessor 601.

As shown in FIG. 13B, plug 551 is also formed at one end on the bottom surface of printed circuit board 550. Further, the pins 601p of microprocessor 601 protrude at the other end. Two tristate data buffers 619 are disposed on each side of microprocessor 601. ASIC (special-application LSI) 603, which contains the control circuit and registers for microprocessor 601, is disposed in a position in the center of printed circuit board 550 toward plug 551. ASIC 603 functions as a data transfer controller, which is described below.

EEPROM 670, which stores the configuration of the main printer unit (number of pages to be printed, paper size, margins, fonts, communication parameters and other parameters related to the operation of the printer), is disposed on the side of printed circuit board 550 near the ASIC 603. Next to EEPROM 670 is disposed a ROM 618, which stores the program for operating the microprocessor of the main printer unit.

On the side opposite EEPROM 670 are disposed two liquid crystal oscillators 661, 665. First oscillator 661 is a first oscillating circuit (FIG. 17, 663) that generates a signal which becomes the basis for the clock signal of microprocessor 601 and generates a 50-MHz clock signal, for example. Second oscillator 665 is a second oscillating circuit (FIG. 17, 667) that generates a clock signal for use in the interval timer processor described below and generates a 5-MHz clock signal, for example. By providing oscillator 661 exclusively for microprocessor 601 in this way, the clock frequency of microprocessor 601 can be easily changed by only replacing oscillator 661.

Next to oscillator 665 are disposed a reset signal output circuit 637, which uses a reset element, a FIFO memory 621 and a NAND gate 680 in a row along the edge of printed circuit board 550. Five tristate octal buffers 684 to 688, are disposed in a row parallel to plug 551.

As shown in FIG. 13, the longitudinal direction of rectangular elements is arranged in the direction of insertion of cartridge 3 on both the top and bottom of printed circuit board 550. This arrangement facilitates air flow, as indicated by the arrows, from plug 551 toward microprocessor 601, thus contributing to cooling of microprocessor 601. As described above, cartridge 3 is inserted in the font cartridge insertion opening of the main printer unit. Regular font cartridges only house ROM in which font data is stored. In contrast to this, cartridge 3 is equipped with a microprocessor 601, ROMs 606 to 609 in which the processing program for microprocessor 601 is stored, a ROM 618 in which the processing program for the processor in the main printer unit is stored and control circuits including ASIC 603.

FIG. 14 shows the wiring relationship between plug 551 formed on the end of printed circuit board 550 and connector CN11. Plug 551 has 25 terminals formed on each of the two sides (A side and B side) of the two-sided printed circuit board. FIG. 14 lists the signal names corresponding to each of the terminals of plug 551. The slash (/) attached to the front of signal names indicates that the signal is low active. The meaning of each of the signals is as follows.

Signal /ASB: address strobe signal output by CPU 510 (MC68000, Motorola Corporation).

Signal/UDS: upper data strobe signal output by CPU 510.

Signal/LDS: lower data strobe signal output by CPU 510.

Signal/ADS: auxiliary address strobe signal generated based on the address strobe signal/ASB in electronic control device 501. This auxiliary address strobe signal/ADS demonstrates different behavior in different types of printers when the printer is initialized. In this embodiment, as described below, the printer type is judged based on the behavior of this auxiliary address strobe signal /ADS at the time of initialization.

Signal /ODTACK: output data acknowledge signal for when data is transferred from cartridge 503 to electronic control device 501.

Signal /CTRGSEL: cartridge selection signal when CPU 510 selects cartridge 503 and accesses the ROM 56, register, etc., assigned to the address space inside the cartridge.

Signals A1–A20: address signals output by CPU 510.
Signals D1–D15: output signals from cartridge 503.
Signal R/W: read-write signal output by CPU 510.
Signal SCLK: clock signal output from the oscillator (not shown) built into laser printer 500.

The signal /CTRGS supplied to laser printer 500 is asserted low when cartridge 503 is inserted, and CPU 510 detects that cartridge 503 has been inserted connector CN11 by this.

CPU 510 specifies word addresses using the 23-bit address signals A1 to A23, and it specifies the upper byte and lower of each word using the signals /UDS and /LDS. As a result, CPU 510 is capable of using the 16-megabyte address space from 000000h to FFFFFFh. The "h" added to the end of the address here is a hexadecimal indicator.

C. Address Space of Cartridge

Cartridge 503 is assigned to part of the address space handled by CPU 510 in electronic control device 501. CPU 510 handles the 16-megabyte address space from 000000h to FFFFFFh, and part of that is set aside for the ROM cartridge. The space assigned cartridge 503 differs depending on the type of laser printer, but in the case of a Hewlett Packard laser printer, normally the 2-megabyte space from 200000h to 3FFFFFh or from 400000h to 5FFFFFh is assigned as shown on the left side of FIG. 15.

Referring to FIG. 16, microprocessor 601 disposed in cartridge 503 of this embodiment is a 25-MHz Am29030 (produced by Advanced Micro Devices Corporation of Sunnyvale, Calif.) and the address space it can handle is 4 gigabytes from 00000000h to FFFFFFFFh. This address space is assigned to not only ROM or RAM but also to the various registers, etc., used to exchange data with electronic control device 501 in the printer.

D. Internal Configuration of Cartridge

Referring to FIG. 17, cartridge 503 is configured around microprocessor 601, which handles all control, and comprises mainly a memory section 602 made up of the ROM, RAM and their peripheral circuitry, data transfer controller 603, which handles all exchange of data with electronic control device 501, and other circuits. Memory section 602 comprises ROMs 606 to 609, totaling 2 megabytes, where the programs executed by microprocessor 601 are stored, selector 610 for facilitating use of ROMs 606 to 609 by bank selection, and RAMs 611 to 614, totaling 2 megabytes, where the print data from electronic control device 501 are stored or the image data after being developed are stored. ROMs 606 to 609, totaling 2 megabytes, are each 4-megabit (16 bits×256 kilobits) mask ROM, and as shown in FIG. 16, they are assigned the address space 00000000h to 001FFFFFh. ROMs 606, 607 and ROMs 608, 609 each make up a bank, and each bank of two make up a 32-bit data bus. ROMs 606 to 609 and microprocessor 601 are connected via address bus AAB and the control signal bus. Data bus IDB of ROMs 606 to 609 is connected to data bus DB29 via data selecter 610, whereby microprocessor 601 is capable of reading data from ROMs 606 to 609.

Except for the least significant 3 bits (A0, A1, A2) of address bus AAB from microprocessor 601, all address signals are input to ROMs 606, 607 and ROMs 608, 609. The least significant 2 bits (A0 and A1) are not input because the reading of data by microprocessor 601 is done in 1-word=32-bit (4-byte) units. Also, since address A2 is not assigned, when data of a prescribed area is read, ROMs 606 to 609 output data simultaneously. It is data selector 601 that arranges data that have been simultaneously output. That is, since access of ROM by microprocessor 601 is often performed on consecutive addresses, two consecutive words, where one word is 32 bits, are read from ROMs 606 to 609 at one time, and when words that are actually consecutive are read, the bank to which the ROM belongs is sequentially switched by data selector 610 to facilitate the continuous reading of data. As a result, the reading of data in two contiguous words is extremely fast.

RAMs 611 to 614, are 16-bit×256-kilobit=4-megabit DRAM, and as shown in FIG. 16, they are assigned to the two megabytes of address space from 20000000h to 201FFFFFh. The memory in cartridge 503 can be increased by 2 megabytes, for which expansion RAM interface 615 is provided. Expansion RAM interface 615 is assigned to the address space from 20200000h to 203FFFFFh. Up to 2 megabytes of SIMM type RAM can be installed in the expansion RAM interface 615. The data lines of RAMs 611 to 614 and expansion RAM interface 615 are connected directly to data bus DB29 of microprocessor 601, and the address line is connected to address bus AAB of microprocessor 601 via data transfer controller 603. The I/O of each of the registers, etc., described below is assigned to the address space beginning from 80000000h.

When cartridge 503 is seen from electronic control device 501 of printer 500, the ROM is assigned the top 128 kilobytes as shown on the right side of FIG. 15. That is, cartridge 503 contains the program (sometimes referred to software program in this field) executed by CPU 510 of electronic control device 501, and when cartridge 503 is installed, CPU 510 of the electronic control device 501 executes a jump instruction to go to a prescribed address in this ROM upon completion of initialization. Following this, CPU 510 operates according to the procedure stored in this ROM.

When CPU 510 accesses this 128-kilobyte space beginning from the top of the 2-megabyte space assigned to cartridge 503, ROM 618 is accessed by the address signal output via address buffer 617 provided in address bus CAB for the connector of cartridge 503, and the instructions and data stored in ROM 618 are sent to CPU 510 in electronic control device 501 via data buffer 619 provided in data bus CDB for the connector. In FIG. 15, "X" indicates the value of the most significant 4 bits of the top address of the assigned space.

E. Explanation of Data Transfer Controller 603

Referring to FIGS. 15–16, addresses other than the addresses assigned to ROM and RAM contain the various control registers and status registers. Since these registers are realized by data transfer controller 603, data transfer controller 603 will be explained next. The explanation will center around the circuitry, but the address maps (FIGS. 15–16) are referred to as required.

Data transfer controller 603 shown in FIG. 17 is realized by means of an ASIC of the usable gate 7900. This ASIC is a low-power CMOS standard cell, model No. SSC3630, produced by Seiko Epson Corporation. Data transfer controller 603 was designed using Seiko Epson's ASIC design system; LADSNET, which is a CAD system. This CAD system contains latches, flip-flops, counters, programmable logic arrays and other elements used in logic circuit design in the form of libraries, and after the required logic circuit is designed using these, the pattern of the ASIC can be automatically generated.

Data transfer controller 603 controls the exchange of data between CPU 5 10 of electronic control device 501 and microprocessor 601 of cartridge 503 when cartridge 503 is installed in connector CN11 of printer 500. The exchange of data between these two is realized by means of read control circuit 620 for sending data from electronic control device 501 to cartridge 503 via the read-only data bus, FIFO control circuit 623, which performs the same function by passing data via the FIFO memory 621 using part of the configuration of read control circuit 620, and double-bank control circuit 624, which makes it possible to read data prepared by cartridge 503 from electronic control device 501. FIFO memory 621 is a RAM that stores and reads data based on a first-in-first-out procedure, and in this embodiment, Mitsubishi Electric's M66252FP is used.

Address bus CAB is connected to data transfer controller 603 via address buffer 617, and data bus CDB is connected to data transfer controller 603 via data buffer 619 as signal lines with electronic control device 501. Inside data transfer controller 603 is a first decoder 631 that receives the signal of address bus CAB and cartridge select signal CSEL, and outputs a selection signal to the respective parts inside data transfer controller 603. In a similar manner, address bus AAB and control signal CCC from microprocessor 601 are connected to data transfer controller 603, and inside data transfer controller 603 is a second decoder 632 that receives address bus AAB and outputs a selection signal to each of the internal circuits. There is also a bus controller 635 that receives address bus AAB and control signal CCC, and outputs address signals and control signals to ROMs 606–609, RAMs 611–614 and expansion RAM interface 615.

Data transfer controller 603 also contains various registers, a number of which are automatically written to when a specific process is performed in addition to those that are read from and written to by normal read-write operation. The configuration of these special registers is described below. In a relationship that treats cartridge 503 as a read-only device as seen from electronic control device 501, the registers writeable from electronic control device 501 have a configuration whereby they are written by performing reading from a prescribed address. That is, by specifying a prescribed address, a selection signal is output from first decoder 631, and the data is written to the register by this signal. Reading from the register is performed by a normal read cycle. Further, the reading and writing of data by microprocessor 601 are performed by normal read-write operation. In FIG. 17, registers are shown connected to a readable bus and writing operation is indicated by arrows. These registers include interrupt request registers 640, polling command registers 643, status registers (STATUS in FIG. 15) 645, transfer flag registers (BPOLL in FIG. 16) 647, PROM control registers 649 and control registers 650.

Except for status registers 645 and transfer flag registers 647, all of these registers are generic names for multiple registers assigned as memory mapped I/O to CPU 510 of electronic control device 501 or microprocessor 601 of cartridge 503. The multiple registers are not necessarily assigned contiguous addresses. Interrupt request registers 640 include registers AMDINT0, -1 and -2 and registers AMDCLR0, -1 and -2 shown in FIG. 15 and FIG. 16. Polling command registers 643 include register POLL and register MCONTCS. PROM control registers 649 include the registers EEPCS, EEPSK and EEPDI.

Control registers 650 include those registers not belonging to read control circuit 620, FIFO control circuit 623 and double-bank control circuit 624 and are all those registers not mentioned in the above explanation. These are the registers ADDMUXA, ADDMUXB, CLKDIV, RTCVAL, RTCON, RTCSEL, RTCCLR and SYSKEEP shown in FIGS. 15–16.

Each of the 512-byte areas EWWRL and EWWRH shown in the memory maps in FIGS. 15–16 are used to write from electronic control device 501 to first and second latches 651, 652 of read control circuit 620, and register EWRD corresponds to latches 651, 652 seen as one word from microprocessor 601. Registers FIFOREQ, FIFORST and FIFOWR correspond to FIFO register 653 of FIFO control circuit 623, and registers FIRCLK, RDCLK, FIFORD and RDRST correspond to FIFO read register 655 of FIFO control circuit 623. FIFO control circuit 623 has a latch 657 that uses some of the functions of read control circuit 620 to retain the data to be written to FIFO memory 621.

The areas indicated by codes DPRAMA and DPRAMB in FIG. 15 are buffers with a 32-byte capacity, and they correspond to first and second buffers 658, 659 of double-bank control circuit 624 as seen from electronic control device 501. Buffers 658, 659 as seen from microprocessor 601 are banks DPWROA and DPWROB shown in FIG. 16. Prescribed bits d1 and d2 of status registers 645 are used in the exchange of data via double-bank control circuit 624.

F. Explanation of Registers Interrupt request registers 640 generate a request for an interrupt from electronic control device 501 to microprocessor 601 and retain it. Interrupts from electronic control device 501 to microprocessor 601 are prepared in three levels, and as shown in FIG. 15, they have three registers (AMDINT0, -1,-2). By reading one of these interrupt request registers 640 from electronic control device 501, an interrupt request for microprocessor 601 is generated. These registers are set by a read operation from electronic control device 501, but the data read has no meaning and is not related to the generation of an interrupt request.

Specific examples of configurations of interrupt request registers 640 are shown in FIG. 18. These registers are configured from three D-type flip-flops. These flip-flops are referred to below as interrupt request registers 640a, -b and -c, and the output terminals Q of interrupt request registers 640a, -b and -c are set to active low by the signals /AMDINT0, -1 and -2 output by first decoder 631 by the read operation of the above registers by electronic control device 501, resulting in the output of the interrupt signals/INT0, -1 and -2. The slash (/) affixed to the front of signal names indicates that that signal is low active (same below). The registers that clear the outputs of these flip-flops 640a, -b and -c are assigned, as shown in FIG. 16, to prescribed addresses as three read-only registers (AMDCLR0, -1, -2). Therefore, when reading of each of the addresses assigned to these registers is performed by microprocessor 601, second decoder 632 outputs each of the signals /INTCLR0, -1 and -2), and the corresponding flip-flops are preset.

When an interrupt request is given from electronic control device 501, any of interrupt request registers 640 can be accessed, and microprocessor 601 judges the precedence and performs processing in response to the interrupt requests. In this case, microprocessor 601 clears the corresponding interrupt request registers 640a, -b and -c. Signals such as PUP2 that start with the code PUP are signals output from reset signal output circuit 637 and are asserted low at the time of reset, etc. Signal PUP2 shown in FIG. 18 is used to clear three interrupt requests at once.

Polling command registers 643 are used to pass commands from microprocessor 601 to electronic control device 501, and these registers are writeable by microprocessor 601 and readable by electronic control device 501. An example of a hardware configuration of these registers is shown in FIG. 19. As shown in the figure, polling command registers 643 comprise two octal D-type flip-flops 643a and -b and one D-type flip-flop 643c, which make up a 16-bit-wide data latch.

Data bus DB29 (16-bit-wide bus) from microprocessor 601 is connected to the data input terminals 1D to 8D of octal D-type flip-flops 643a and -b, and the data bus DB68 (16-bit-wide bus) from electronic control device 501 is connected to the output terminals 1Q to 8Q. The signal/ MCONTCS output from second decoder 632 at the time of access (register MCONTCS in FIG. 16) of polling command registers 643 by microprocessor 601 is connected to the clock terminal CK of octal D-type flip-flops 643a and -b, and when this signal becomes active low, the contents of the data bus DB29 of microprocessor 601 are latched in octal D-type flip-flops 643a and -b. Further, the signal/POLL output from the first decoder 631 at the time of access (register POLL in FIG. 15) of polling command registers 643 by electronic control device 501 is connected to the output-enable terminal OE, which enables the output of octal D-type flip-flops 643a and -b, and when this signal becomes low active, the data latched in octal D-type flip-flops 643a and -b are output to the data bus DB68 of electronic control device 501.

Signals /MCONTCS and /POLL are connected to clock terminal C and preset terminal PR of flip-flop 643c, and signal CMDRD from the output terminal Q is set to high level when octal D-type flip-flops 643a and -b latch data (signal /MCONTCS is low) and to low level when this data is read by electronic control device 501 (signal/POLL is low level). Signal CMDRD output from flip-flop 643c becomes the prescribed bit d3 (flag CMDRD below) of status registers 645, which are readable by electronic control device 501. Therefore, when electronic control device 501 reads status registers 645, electronic control device 501 knows that a command was set in polling command registers 643 from microprocessor 601.

When electronic control device 501 looks at flag CMDRD, which is bit d3 of status registers 645, and knows that a command has been set, it reads the contents of polling command registers 643, i.e., command sent from microprocessor 601, in a normal read cycle. The command may be an instruction to begin transfer of the print data to data transfer controller 603, an instruction to begin printing or the display of a message on console panel 518. When electronic control device 501 reads the contents of polling command registers 643, the output signal CMDRD of D-type flip-flop 643c is inverted to a high by the signal /POLL as shown in FIG. 19. Therefore, microprocessor 601 can know whether the command it output was read by electronic control device 501 by monitoring the prescribed bit d2 of transfer flag registers 647. In addition to the above-described information that indicates whether a command has been set from microprocessor 601, status registers 645 also hold the information shown in FIG. 20. Bit d0 is asserted low by the signal EWRDY generated in read control circuit 620 when data is written to read control circuit 620 from electronic control device 501, and when this data is read by microprocessor 601, bit d0 is set to high level by a signal from second decoder 632. This bit is called flag EWRDY.

Bits d1 and d2 indicate whether double-bank control circuit 624 can be accessed from electronic control device 501 or microprocessor 601, and are respectively referred to as flags ADDMUXA and ADDMUXB. These two bits correspond respectively to the two transfer banks built into double-bank control circuit 624. These bits d1 and d2 are set and reset by microprocessor 601 writing data to bit d0 of registers ADDMUXA and ADDMUXAB included in control registers 650 as shown in FIG. 16. Therefore, by setting this flag low before microprocessor 601 writes data to one of the banks of double-bank control circuit 624 and resetting it to high level upon completion of writing and having electronic control device 501 read data from the bank for which the flag is high level, data can be passed continuously from microprocessor 601 to electronic control device 501 by alternately writing data to and reading data from these two banks.

Bit d3 (flag CMDRD) has already been described. Bit d5 is flag CLKDIV, which is set based on the operation clock of microprocessor 601. The operation clock of microprocessor 601 is the clock CLK output from first oscillator 661, which uses an externally attached liquid crystal vibrator CRC1, and when microprocessor 601 writes level 0 to the prescribed bit d0 of the register CLKDIV of the control register 650, the operation CLK of microprocessor 601 becomes 25 MHz, and when level 1 is written to bit d0, then the operation clock becomes 12.5 MHz. The flag CLKDIV of status registers 645 as seen from electronic control device 501 is set low when this clock CLK is 25 MHz and to high level when it is 12.5 MHz. When it is necessary for electronic control device 501 to know the frequency of the operating clock, i.e., operating speed, of microprocessor 601 in order to match timing for data transfer, etc., it checks this bit of status registers 645.

Bit d6 is the flag ADMON, which is set to high level when microprocessor 601 is operating and to low level when it enters the sleep mode. In this embodiment, microprocessor 601 performs processing that receives the page description language from electronic control device 501 and develops it into image data, and therefore when a prescribed amount of time has elapsed during which no page description language to be processed is sent from electronic control device 501, microprocessor 601 reduces its initial operating frequency by one half to 12.5 MHz in order to reduce power consumption, and after more time has elapsed, it stops its own operation and enters the so-called "sleep mode." At this time, microprocessor 601 writes level 0 to register ADMON of the control registers 650. As a result, this bit d6 of status registers 645 becomes low level as seen from electronic control device 501, and by checking this bit, electronic control device 501 can know the operating mode of microprocessor 601.

This time is measured with a real-time clock built into data transfer controller 603. The clock RCLK for this real-time clock is a clock from the second oscillator 667 configured using an externally attached liquid crystal vibrator 665. The real-time clock is disposed inside the bus controller 635, and it receives instructions from microprocessor 601 to measure the elapse of prescribed time periods. The reason why two sets of liquid crystal vibrators and oscillators are employed is to make it possible to change the operating clock CLK of microprocessor 601 independently of the operating clock RCLK of the real-time clock.

The real-time clock sets the d1 bit of registers RTCVAL and RTCSEL, which belong to the control registers 650, to low or high, and it is capable of specifying four interval timers, which it can start by writing level 1 to the prescribed bit d0 of the register RTCON. A timer that has been started outputs an interrupt request signal to microprocessor 601 at prescribed intervals until level 0 is written to bit d0 of register RTCON and it is stopped. When microprocessor 601 receives this interrupt request signal, it reads register RTCLR and clears the interrupt request. The outputs of these interval timers are used for counting user time, etc., in the processing of the page description language.

Next is an explanation of the configuration of PROM control registers 649. PROM control registers 649 include registers the EEPCS, EEPSK and EEPDI shown in FIG. 16, but these registers are memory built into cartridge 503 and are used to exchange data with EEPROM 670, which is capable of electrical erasure and rewriting of data.

Cartridge 503 of this embodiment stores the various variables (configuration) required for operation of laser printer 500 in EEPROM 670. This EEPROM 670 is one that reads, erases and writes data by serial transfer, and in this embodiment National Semiconductor's NMC93C66X3 is used. This EEPROM 670 has a storage capacity of 16 bits×256 bytes (number of registers) and is capable of reading, erasing or writing the contents of any specified register. When EEPROM 670 is set to a selection condition by the chip select signal CS, the "0" and "1" data sent to the serial data input terminal Din are received in sync with the serial data clock SL, but the first three transferred bits of the data is interpreted as a command to the EEPROM, and the next 8 bits are interpreted as the register number where the data is to be read, erased or written. In the case of writing data, the data to be stored are supplied to the data input terminal Din in sync with the serial data clock SL following these command and register specifications.

The register EEPCS switches the chip select signal, and when microprocessor 601 writes level 1 to bit d0 of this register, EEPROM 670 goes to a select condition. Register EEPSK generates the serial data clock SK, and when microprocessor 601 alternately writes level 0 and level 1 to this register, it generates the serial data clock for EEPROM 670. The register EEPDI holds the 1-bit data to be written to EEPROM 670, and microprocessor 601 rewrites the register EEPSK and rewrites the prescribed bit d0 of register EEPDI according to the data to be written in sync with the generation of the serial data clock SK. The data output terminal Dout of EEPROM 670 is the prescribed bit d0 of transfer flag registers 647 explained above, and if microprocessor 601 reads bit d0 of transfer flag registers 647 in sync with the serial data clock SK after it outputs the data read command and the number of the register to be read to EEPROM 670, then it can read the contents of the specified register. Since the data stored in EEPROM 670 are retained even after the power is turned off, the contents of EEPROM 670 can be read immediately after laser printer 500 is powered on again, thus making it possible to return the configuration to the condition it was in immediately before powering off.

G. Configuration and Operation of Read Control Circuit 620

Next, an example configuration of read control circuit 620 and a data transfer procedure using read control circuit 620 are explained. Read control circuit 620 comprises two 8-bit first and second latches 651, 652 in addition to, as shown in FIG. 21, a ROM 671 that outputs the data required for transfer, a three-input AND gate 672, and a D-type flip-flop 674 that generates flag EWRDY (bit d0) for status registers 645. When read control circuit 620 is viewed from electronic control device 501, latches 651, 652 correspond to the two registers EWWRL and EWWRH, which transfer data in 8-bit units as shown in FIG. 15. These registers are used to transfer the lower byte and upper byte, respectively, of the 16-bits/word data. First and second latches 651, 652 correspond to register EWRD shown in FIG. 16 when viewed from microprocessor 601. That is, microprocessor 601 can read both latches 651, 652 as one word via data bus DB290.

ROM 671 of read control circuit 620 stores 256 bytes of data; e.g., it can be realized with a fuse ROM, a low-capacity PROM, etc. Of course it may also be realized using part of a large-capacity ROM, and the same function can be achieved when RAM is used by transferring the data in advance. The lower 8 bits (AC1 to AC8) of the address line from the connector address bus CAB are connected to address terminals A0 to A7 of ROM 671, and data terminals 00 to 07 are connected to inputs 1D to 8D of first latch 651 and second latch 652. The outputs of ROM 671 are also output to FIFO control circuit 623 as the data bus Z0 to Z7 for FIFO control circuit 623.

The outputs of latches 651, 652 are connected to data bus DB29, and these can be read by microprocessor 601 as the register EWRD. The output signal /EWROM of AND gate 672 is input to chip select CE and output-enable OE of ROM 671, and when any one of signals /EWWRH, /FIFOWR and /EWWRL input to the respective inputs of three-input AND gate 672 becomes low active, this signal becomes active, at which time ROM 671 outputs the data at the address specified by the lower 8 bits of connector address bus CAB.

Signal /EWWRH becomes low when transfer of the upper byte is specified by read control circuit 620, signal /EWWRL becomes low when transfer of the lower byte is specified by same, and signal /FIFOWR becomes low when data transfer is specified by FIFO control circuit 623. Since signals /EWWRL and /EWWRH are input to clock terminals CK of latches 651, 652, respectively, when these signals become active and data is output from ROM 671, this data is held in latches 651, 652. Since signal /EWWRL is input to clock terminal C of flip-flop 674, the output Q of flip-flop 674 is inverted to low level when the lower byte is transferred. The output EWRDY is handled as bit d0 of status registers 645 and bit d1 of transfer flag registers 647, i.e., flag EWRDY.

First latch 651 and second latch 652 are handled as register EWRD by microprocessor 601, and therefore when microprocessor 601 goes to read the data held by first latch 651 and second latch 652, it performs a read operation on the register EWRD. At this time, signal EWRD becomes low, and this signal outputs the previously held data from the output side of first latch 651 and second latch 652, to data bus DB29, connected to the output-enable terminal. Signal /EWRD is connected to preset terminal PR of D-type flip-flop 674, and therefore signal EWRDY, which is the Q output of D-type flip-flop 674, is inverted to high level at the same time microprocessor 601 reads the data of first latch 651 and second latch 652. That is, flag EWRDY, which is bit d0 of status registers 645 and bit d1 of transfer flag registers 647, is set to level 1.

Assuming this hardware, electronic control device 501 and microprocessor 601 transfer data from electronic control device 501 to microprocessor 601 according to the following procedure. The data to be transferred from electronic control device 501 to microprocessor 601 is print data electronic control device 501 has received from workstation 507 and is the page description language program to be processed in microprocessor 601 of cartridge 503. Data transfer by read control circuit 620 is performed by the routine for handling data transfer to the cartridge executed by CPU 510 of electronic control device 501 (FIG. 22) and by the data read interrupt handler routine executed by microprocessor 601 (FIG. 24).

When the print data to be transferred to cartridge 503 are complete, CPU 510 initiates the processing shown in the flowchart in FIG. 22, whereby it first reads the flag EWRDY (bit d0) of status registers 645 (step S700). Flag EWRDY goes low when data is set in first latch 651 and second latch 652, and when this data is read by microprocessor 601, the flag is set high, after which flag EWRDY is judged whether it has been set to high (step S705).

CPU 510 stands by until flag EWRDY goes high, and when it becomes high, CPU 510 performs processing that reads the addresses corresponding to top address of area EWWRH+data D×2 to be transferred. When reading of the area EWWRH is performed, the data is output from ROM 671. As shown in FIG. 23, the 256 data at the even-numbered addresses from 00h to FFh from the top address EWWRH are written in order to ROM 671. The reason why data is not positioned at odd-numbered addresses is basically because data access by CPU 510 is performed in single words (16 bits) and because word units cannot be accessed beginning from odd-numbered addresses (results in address bus error). When an address separated from the top of the area EWWRH by D×2 is read, the data D from ROM 671 are read and are latched in second latch 652 as shown in FIG. 21.

When transfer (second latch 652 holds data) of the upper byte of the data to be transferred is performed in this manner, CPU 510 performs transfer of the lower byte (first latch 651 holds data) in the same manner (step S715). Assuming one word of data is being held by the first and second latches 651, 652 as a result of the above processing, CPU 510 performs processing that sets one interrupt request register (AMDINT0 in this embodiment) (step S720).

CPU 510 then repeatedly executes the transfer handler routine shown in FIG. 22, but when data is held by first latch 651, flag EWRDY is set to low level as shown in FIG. 21, and therefore the next data transfer is not processed until this flag EWRDY becomes high level (level 1) (steps S700, S705). When CPU 510 sets the interrupt request register (AMDINT0), microprocessor 601 receives this interrupt request and initiates the data read interrupt handler routine shown in FIG. 24. That is, this interrupt request is handled as a notification of data transfer to cartridge 3. This processing is initiated immediately after data is held in the first and second latches 651 and 652 in read control circuit 620, and microprocessor 601 reads the one word of data prepared by electronic control device 501 by reading the register EWRD (step S730). Next, microprocessor 601 transfers the data it just read to a prescribed area in RAMs 611 to 614 (step S735).

By means of the processing described above, electronic control device 501 is capable of transferring data to cartridge 503, which is connected by no more than data bus CDB, which is a read-only line. Moreover, since cartridge 3 is notified by interrupt request that data have been transferred immediately after data transfer, cartridge 3 can receive data efficiently from electronic control device 501. Therefore, microprocessor 601 in cartridge 3 does not need to continue monitoring the transfer of data by electronic control device 501, and it does not need to wait for electronic control device 501 to transfer the next data. Further, in this embodiment, the transfer of data from electronic control device 501 can be known by bit d1, i.e., flag EWRDY, of transfer flag registers 647. Therefore, even in a case in which multiple conditions are assigned the interrupt request register AMDINT0, when it receives this interrupt request, microprocessor 601 can reliably discriminate requests for data transfer from other requests by confirming flag EWRDY.

Also in this embodiment, when microprocessor 601 reads the data set from CPU 510 and terminates the transfer of data, electronic control device 501 can immediately know that data transfer has been terminated since flag EWRDY is inverted by the hardware. Therefore, in this embodiment, the sequential transfer of multiple data can be performed at high speed. Also, since data is written in byte units and read in word units in this embodiment, microprocessor 601 can take in data efficiently. This explanation covers the transfer of one word of data, but data do not have to be transferred in word units and can be transferred in byte units. In that case, only transfer that uses the area EWWRL is performed and the upper eight bits of data can be discarded by microprocessor 601.

H. Configuration and Operation of FIFO Control Circuit 623

FIFO control circuit 623 is equipped with latch 657 that latches the data to be written to FIFO memory 621, FIFO write registers 653 that control the writing of data to FIFO memory 621 and FIFO read registers 655 that control the reading of data from same. FIFO memory 621 can hold 2048 bytes of data and is equipped internally with an address counter for writing and a counter for reading. FIFO memory 621 also has a write reset terminal and a read reset terminal for resetting these respective counters, an 8-bit data bus on the write side, an 8-bit data bus on the read side, a clock terminal for writing and a clock terminal for reading.

To utilize FIFO memory 621 to transfer data from electronic control device 501 to microprocessor 601, CPU 510 of electronic control device 501 executes the transfer handler routine shown in FIG. 25, and microprocessor 601 of cartridge 503 executes the routine shown in FIG. 26.

CPU 510 uses FIFO control circuit 623 to transfer multiple bytes of data.

When CPU 510 initiates the data transfer handler routine shown in FIG. 25, first the register FIFORST belonging to FIFO write circuit 654 of FIFO control circuit 623 is read and the write address counter is reset (step S750). Next, the variable N is reset to 0 to count the number of data to be read out (step S755). Following this, the addresses [top address of register FIFOWR+ data D×2 to be transferred] are read (step S760). When these addresses are read, a prescribed address in ROM 671 is accessed (see FIG. 23) in the same manner as read control circuit 620, the data D to be transferred by CPU 510 are output and latched in latch 657 via the bus Z0 to Z7 shown in FIG. 21.

Next, the data D read from register FIFOREQ of FIFO control circuit 623 and held in latch 657 are transferred to the FIFO memory 621 (step S765). When register FIFOREQ is read, a write clock is output to the write clock terminal of the FIFO memory 621, and the data D held in latch 657 are written to the address indicated by the write address counter of the FIFO memory 621. At the same time, the contents of the write address counter in the FIFO memory 621 are incremented by 1. When one byte of data is written in this manner, the variable N, which indicates the number of data transferred, is incremented by 1 (step S770), and judgment is performed to determine whether the variable N is equal to the total byte number X of the data to be transferred (step S775). Therefore, the processing in steps S760 to S775 is repeated until the byte number N of the transferred data is equal to the total byte number X of the data.

When all data have been transferred, CPU 510 sets one of the interrupt request registers (AMDINT1) to notify microprocessor 601 that the transfer of data is complete (step S780), after which the routine escapes to NEXT and is terminated.

Microprocessor 601, on the other hand, initiates the data receive interrupt routine shown in the flowchart in FIG. 26 when it receives this interrupt request AMDINT1. When this routine is initiated, microprocessor 601 first reads the register RDRST belonging to the FIFO read registers 655 of FIFO control circuit 623 and resets the address counter on the read side of the FIFO memory 621 (step S800). Next, the variable M for counting the number of received data is reset to 0 (step S805).

Following this, register FIRCLK belonging to FIFO read registers 655 is read (step S810), and the read data is transferred to a prescribed area in RAMs 611 to 614 (step S815). When register FIRCLK is read, a read clock is output to the clock terminal on the read side of FIFO memory 621, and the data D at the address indicated by the read address counter at that time are read out. At the same time, the contents of the read address counter in FIFO memory 621 are incremented by 1.

When one byte of data is received, the variable M is incremented by 1 (step S820), and the variable M is judged whether or not it is equal to the total byte number X (step S825) of the data to be transferred. Therefore, the processing in steps S810 to S825 above is repeated until the byte number M of the received data equals the total number X for the data.

When it is judged that all data have been received, the microprocessor 6 10 writes a command to polling command registers 643 that indicates the completion of the reading of data (step S630). CPU 510 of electronic control device 501 knows that data reception by FIFO control circuit 623 is complete by reading the contents of polling command registers 643. Microprocessor 601 then escapes to RTN and terminates this routine.

By means of the processing described above, large amounts of data can be efficiently transferred from electronic control device 501 to microprocessor 601. Moreover, since cartridge 3 is notified by the interrupt request signal AMDINT1 that data have been transferred immediately after several bytes of data have been transferred, microprocessor 601 in cartridge 3 does not need to continue monitoring the transfer of data by electronic control device 501 while electronic control device 501 is transferring data, thus freeing it to perform other processing and improving overall processing efficiency. Of course, it does not need to wait for the writing of the next data by electronic control device 501. The transferred data is stored in a prescribed area in RAMs 611 to 614 of data transfer controller 603 and wait for processing by microprocessor 601. Microprocessor 601 receives all of the print data to be developed by electronic control device 501, activates the program stored in ROMs 606 to 609, and processes the print data stored in the prescribed area in RAMs 611 to 614. This processing develops the image, and the developed result is stored as image data in a prescribed area in RAMs 611 to 614.

I. Configuration and Operation of Double-Bank Control Circuit

The image data obtained upon completion of image development are then transferred to electronic control device 501, where they are stored in RAM 512 and printed by laser engine 505 according to a prescribed timing. This image data is transferred by double-bank control circuit 624. Double-bank control circuit 624 transfers from microprocessor 601 to electronic control device 501 and is equipped with two banks that store 32 bytes (16 words) of data. These are referred to as A bank and B bank, and since the hardware of both is exactly the same, only the configuration of A bank is shown in FIG. 27.

The address and data buses of each of these banks are configured such that they can be switched from microprocessor 601 and from electronic control device 501, and as shown in the figure, they are configured from data selectors 681, 682, which select the address line, four octal line buffers 684–687, which are used in two sets of two each and select the data bus (16 bits wide), RAMs 691, 692, which have a 32-byte storage capacity, OR gates 694, 695, which make up the other gates, and inverter 696. In FIG. 27, a configuration is shown in which two memory chips with a 32-byte storage capacity are used, but the memory can also be realized by switching the upper address of a single memory chip.

Data selector 682 is configured such that it selects the least significant four bits (AC1 to AC4) of address bus CAB on electronic control device 501 side and the lower four bits (A2 to A5) of address bus AAB on microprocessor 601 side and outputs them, and selection of the address bus is performed by the signal ADDMUXA (bit d0 of register ADDMUXA) connected to the select terminal S. Data selector 682 switches the read-write signal for RAMs 691, 692 in addition to selecting an address bus, and in a similar manner, the signal ADDMUXA connected to the select terminal S determines which signal is connected to the chip select terminals CE1 and -2 and the output-enable terminal OE of RAMs 691, 692 by switching them.

Octal line buffers 684, 685 are tristate line buffers connected to data bus DB29, and when gate terminals 1G and 2G become low, data bus DB29 on the microprocessor 601 side and the data bus of RAMs 691, 692 are connected, resulting in a condition that allows writing of data from microprocessor 601 to RAMs 691, 692. The output of OR gate 694, whose inputs are the signals /DPWROA and ADDMUXA, is connected to the gate terminals 1G and 2G of octal line buffers 684, 685. Signal /DPWROA becomes low when microprocessor 601 writes data to A bank. Therefore, by setting bit d0 of register ADDMUXA low in advance of writing data to A bank, when microprocessor 601 does write data to A bank, the gates of octal line buffers 684, 685 open and the data output to data bus DB29 are output to the data bus of RAMs 691, 692, where they are written.

When the gate terminals 1G and 2G of octal line buffers 686, 687 become low, data bus DB68 on electronic control device 501 side and the data bus of RAMs 691, 692 are connected, resulting in a condition in which data can be read out from RAMs 691, 692 to electronic control device 501. The output of OR gate 695, whose inputs are the signals /DPOE1A and ADDMUXA inverted in inverter 696, is connected to the gate terminals 1G and 2G of octal line buffers 686, 687. Signal /DPOE1A becomes low level when electronic control device 501 tries to read the data of A bank. Therefore, by setting bit d0 of register ADDMUXA high in advance of reading the data of A bank, the gates of octal line buffers 686, 687 open and the data output to the data bus of RAMs 691, 692 are output to data bus DB68 when electronic control device 501 performs a read operation on A bank.

The transfer processing of image data by microprocessor 601 and its receiving processing by CPU 510 of electronic control device 501 are explained below assuming this hardware. FIG. 28 is a flowchart showing the transfer start handler routine for image data executed by microprocessor 601. As shown in the figure, microprocessor 601 sets a transfer start command in polling command registers 643 before transferring image data (step S850).

CPU 510 of electronic control device 501 reads this polling command registers 643 and executes the response handler routine shown in FIG. 29. That is, electronic control device 501 judges whether or not laser printer 500 is in a print-enabled condition (step S860), and if it judges that it is in a condition that will allow printing, then it sets one (AMDINT2) of the interrupt request registers (step S865) and escapes to NEXT and temporarily terminates the routine. If the printer is not in a condition that will allow printing, then CPU 510 performs processing that notifies microprocessor 601 (step S870). A condition that will not allow printing is one in which the laser engine has not completely warmed up, or there is a paper jam or other condition that will not allow printing even though the image data has been received. When interrupt request signal AMDINT2 is received from electronic control device 501, microprocessor 601 initiates the image data transfer interrupt handler routine shown in FIG. 30. When this processing is activated, microprocessor 601 first writes level 1 to bit d0 of register ADDMUXA (step S900). When bit d0 of register ADDMUXA is level 1, the data bus of RAMs 691 and 692, which make up A bank, is connected to the data bus DB29 on microprocessor 601 side as was explained using FIG. 37, thus disabling access from electronic control device 501.

Next microprocessor 601 transfers 16 words (32 bytes) of data to A bank DPWROA (step S902). When data is written to A bank DPWROA, the signal /DPWROA shown in FIG. 27 becomes low level, and the data is written to RAMs 691 and 692 via the octal line buffers 684 and 685. Upon completion of transfer of the 16 words of data, microprocessor 601 writes level 1 to bit d0 of register ADDMUXA (step S904), and the data bus of RAMs 691 and 692, which make up A bank, is connected to the data bus DB68 of electronic control device 501.

Microprocessor 601 then writes the command data that notifies that transfer to A bank is complete to polling command registers 643 (step S906). This completes transfer of data to A bank, and microprocessor 601 then executes the same processing as above with respect to B bank (step S910). When data transfer to B bank is complete, microprocessor 601 writes command data that notifies that transfer is complete in the same way to polling command registers 643. In this way, the transfer of a total of 32 words (64 bytes) of data to A and B banks from cartridge 503 is completed.

In response to the above processing performed by microprocessor 601, CPU 510 executes the image data receive handler routine shown in FIG. 31. That is, CPU 510 first reads bit d3 of status registers 645, i.e., flag CMDRD, (step S920) and judges whether it is at level 0 (step S925). When command data is written to polling command registers 643 by microprocessor 601, flag CMDRD is set to level 0, and therefore CPU 510 reads the command data in polling command registers 643 (step S930).

CPU 510 checks the command data read and judges if they command data that indicate that data transfer to A bank is complete (step S935), and if they are not, then CPU 510 executes other processing (step S940). When the command data in polling command registers 643 indicate that data transfer to A bank is complete, electronic control device 501 reads the 16 words in A bank DPRAMA (step S945; see FIG. 15) and transfers the read data to RAM 512 (step S950). Since the above processing completes the reading of the 16 words of data in A bank, electronic control device 501 sets one interrupt request register (AMDINT2) that will allow transfer of the next 16 words from microprocessor 601. The processing in steps S920 to S955 is then repeated with respect to B bank. That is, when it is judged that the transfer of data by microprocessor 601 from B bank has been completed based on the command data in polling command registers 643, then one interrupt request register is set to send an interrupt request to microprocessor 601 after the 16 words of data in B bank DPRAMB are read and transferred to RAM 512.

When it receives the interrupt request, microprocessor 601 executes the interrupt handler routine shown in FIG. 30 again, and therefore microprocessor 601 and CPU 510 complete the transfer of all image data by executing both routines (FIGS. 30–31). If new print data is not received from electronic control device 501 after all image data has been transferred, then microprocessor 601 writes level 1 to register CLKDIV of the control registers 650 after a prescribed time period has elapsed and switches its own operating frequency by half, i.e., to 12.5 MHz, to reduce power consumption and reduce the amount of heat generated.

By means of the above configuration, cartridge 503 can efficiently transfer the developed image data to electronic control device 501 using interrupts and flag CMDRD of the registers. The image data, as explained below, are sent to laser engine 505 for printing at the same time, and therefore it is extremely important that the transfer of image data from cartridge 503 be performed efficiently.

J. Printing of Image Data

Electronic control device 501, which receives the transfer of all image data, prints the image data by exchanging signals with laser engine 505 using double-buffer circuit 520 and register 517 explained above. The exchange of signals between electronic control device 501 and laser engine 505 is roughly depicted in FIG. 32. Printing is summarized below referring to this figure.

When the image data that have been developed are received from cartridge 503, electronic control device 501 inquires whether laser engine 505 is in a print-enabled condition, and if it does judge that warming up, etc., are complete and the laser engine is in a print-enabled condition, then it outputs the print signals shown in FIG. 32 to laser engine 505 via register 517. When laser engine 505 receives these signals, it immediately starts the motor for paper transport. Rotation of the photosensitive drum, charging processing, etc., are started in sync with this.

When the paper to be printed on reaches a position at a prescribed distance from the photosensitive drum, laser engine 505 detects the end of the paper and outputs signal VREQ to electronic control device 501 via register 517. When electronic control device 501 receives VREQ, it waits a prescribed period of time, i.e., the time required for the photosensitive drum to rotate to the position where formation of the latent image by the laser beam begins, and outputs signal VSYNC via register 517. When laser engine 505 receives VSYNC, it outputs the laser beam horizontal sync signal HSYNC via register 517. Since signal HSYNC is a signal that instructs to begin reading one line of image data, laser engine 505 reads image data from either RAM 520A or RAM 520B of double-buffer circuit 520 in sync with this signal. When there is a top margin, control is performed that ignores signal VSYNC for the number of lines corresponding to the top margin. This control is the same when a bottom margin is formed. At the same time, CPU 510 counts this signal and transfers the necessary image data to RAM 520A or RAM 520B of double-buffer circuit 520. When a prescribed amount of time has elapsed or the count of the horizontal sync signal becomes equal to a value previously set to conform with the paper size after laser engine 505 detects the trailing edge of the paper, CPU 510 terminates the transfer of image data to double-buffer circuit 520. By means of the above processing, one page of image data is transferred to laser engine 505 and the image is printed on the paper.

K. Effectiveness of Second Embodiment

By means of the second embodiment, data can be transferred from electronic control device 501 to cartridge 503 by using a read-only data bus as in the first embodiment, and data can be efficiently transferred in the opposite direction as before. Moreover, since interrupts are used to notify of data transfer as well as notification of transfer by flags and processing in cartridge 503 is initiated by interrupt requests in this embodiment, microprocessor 601 of cartridge 503 does not need to continually monitor the operation of the electronic control device and microprocessor 601 can be utilized efficiently. That is, processing overhead can be reduced, thus improving overall efficiency. Also, since an ASIC is used in this embodiment, the circuit can be made more compact and simpler. Further, since both read control circuit 620 and FIFO control circuit 623 are employed to transport data from electronic control device 501 to data transfer controller 603, data can be transferred efficiently by using one or the other depending on the type of data to be transferred. Also, if one system should fail, the other system can be used to compensate.

L. Other Embodiments

Specific configurations of the invention were explained above, but the invention is not limited to these embodiments. Other configurations for the transfer of data and notification in devices with a read-only data bus are explained in the following order: configuration that transfers data using the address bus as a communication line (FIGS. 33–35), configuration that transfers data by setting each bit of the data to be transferred by means of a data read signal (FIGS. 36–37), configuration that transfers data using a counter (FIGS. 38–39), and configuration that transfers data by reproducing a signal as received from outside (FIG. 40). The following explanations assume the configuration of the second embodiment in order to simplify the explanations and the same signal names are used, but these configurations for data transfer are not limited to the second embodiment.

1) Configuration that Utilizes Address Bus as Communication Line—No. 1

FIG. 33 is a block diagram showing the configuration of the part of the accessory control device that receives data. This circuit comprises, decoder 1000, which detects that this circuit has been selected based on the address signals A3 to A20, address strobe signal /ABS and cartridge select signal /CTRGSEL, AND gates 1001, 1002 which, obtain the logical product of the output signal of the decoder and the address signals A1 and A2, respectively, two serial-parallel converters (S/P converters) 1005, 1006 whose data inputs are from AND gates 1001, 1002 and whose clock signal CLK is the output of decoder 1000 inverted by inverter 1004, and counter 1008, which counts clock signal CLK and generates an interrupt request signal.

Each time S/P converters 1005, 1006 input clock signal CLK, they take in the data of input terminal Sin and convert it to a parallel output by shifting the data one bit at a time from output a to output h. Clear signal /CLR from microprocessor 601 is connected to the clear CLR terminals of S/P converters 1005, 1006, and the outputs a to h of S/P converters 1005, 1006 are cleared prior to data transfer.

Data transfer using this circuit is explained below. The top address assigned this transfer circuit is YYYYY0h. The upper 8 bits of the transfer data is transferred via the address signal A2, and the lower 8 bits are transferred via the address signal A1. That is, the transferring side (electronic control device 501 in this case) develops the data to be transferred into "0" and "1" signals beginning from the lower bit. Since the upper byte and lower byte of the data is transferred at the same time, the data is fetched from D8 for the upper byte and from D0 for the lower byte as shown in FIG. 34, and the address that performs readout is determined by their combination. That is, in a case in which bit Dd (d=8, 9, . . . , 15) of the upper byte is level 0 and bit Dd-8 of the lower byte is level 0, then processing that reads data from address YYYYY0h is performed.

When electronic control device 501 reads data from address YYYYY0h, both address signals A2 and A1 become low level, and therefore the outputs of AND gates 1001, 1002, i.e., the data Sin of S/P converters 1005, 1006, go low, and data 0 is received. Similarly, in a case in which bit Dd of the upper byte is level 0 and bit Dd-8 of the lower byte is level 1, in a case in which bit Dd of the upper byte is high and bit Dd-8 of the lower byte is low from the address YYYYY2h, and in a case in which bit Dd of the upper byte and bit Dd-8 of the lower byte are both high, processing is performed that reads each data from address YYYYY6h. As a result, the data corresponding to bits Dd and Dd-8 of the data to be transferred are taken in by S/P converters 1005, 1006, respectively, and developed to the outputs a to h.

Upon completion of the transfer of all data (normally 16 bits) in this manner, counter 1008 counts clock signal CLK and detects it, at which time it makes interrupt request signal AMDINT0 active. When data is transferred in byte units, the signal which counts up based on eight clock signals CLK can be used as the interrupt request signal AMDINT1, thus performing notification while distinguishing between the two. Or as in the embodiment described above, electronic control device 501 can set an interrupt request signal, which is not shown, to notify microprocessor 601 in cartridge 503 that transfer is complete. When it receives this interrupt request, microprocessor 601 reads the outputs of S/P converters 1005, 1006 via data bus DB29, after which it resets S/P converters 1005, 1006 by making clear signal /CLR low active. In this way, 16-bit data can be transferred from electronic control device 501 to cartridge 503.

In this embodiment, the data to be transferred are converted to serial data and reflected in address signals A1 and A2, and the signal lines for address signals A1 and A2 are utilized as communication lines. In this case, the read cycle for data may be terminated as soon as address strobe signal /ABS is established, and therefore the time required for data transfer can be shortened. The bit number of the address signal used for transfer may be 1. In this case, a simple circuit configuration can be used for transfer. Also, the time until completion of transfer of 3 bits or more can be further shortened.

(2) Configuration that Utilizes Address Bus as Communication Line—No. 2

Another configuration is shown in FIG. 35 that transfers data using the address bus as a signal line for communication. This circuit comprises decoder 1010 that outputs selection signal /CS2 when this circuit is selected, OR gate 1011 that outputs selection signal /CSO from selection signal /CS2 of decoder 1010 and address signal A2, three-input OR gate 1012 that outputs selection signal /CS1 when selection signal /CS2, inverted address signal A2 inverted by inverter 1013 and address signal A1 become low, 8-bit shift register 1015 that operates using selection signal /CSO as a clock CLK and address signal A1 as data Sin, latch 1017 that holds the outputs a to h of shift register 1015 by means of selection signal /CS1, D-type flip-flop 1018 whose output Q is also set by selection signal /CS1, and tristate buffer 1019 that outputs a to g of shift register 1015 and address signal A1 to data bus DB68 of electronic control device 501. The outputs Q0 to Q7 of latch 1017 are connected to the lower byte D0 to D7 of data bus DB29 of microprocessor 601.

After the 1-byte (8-bit) data to be transferred is sequentially converted to serial data from bit D0 in this circuit, they are reflected as is in address signal A1. Therefore, assuming the top address assigned this circuit is YYYYY0h, electronic control device 501 reads address YYYYY0 when bit Dd is level 0 and address YYYYY2 when bit Dd is level 1. When addresses corresponding to each 1 byte or 8 bits of data is read 8 times, a condition results in which 1 byte of data is set in the outputs a to h of shift register 1015. When the address YYYYY4h is now read by electronic control device 501, the selection signal /CS1 becomes low active, and the output of shift register 1015 is set in the latch 1017. At the same time, the output Q of the D-type flip-flop 1018 is set to high level, and an interrupt request is issued to microprocessor 601 by the output signal INT.

Microprocessor 601, which receives interrupt request signal INT, reads the data held in latch 1017 via data bus DB29 and resets flip-flop 1018 by setting the interrupt clear signal /INTCLR to low. By means of the above processing, data can be transferred from electronic control device 501 to microprocessor 601. In this embodiment, the transfer of data is performed by read processing, and since the output of shift register 1015 and the address signal A1 are output to the data bus DB68 of electronic control device 501 via the tristate buffer 1019, data sent from electronic control device 501 can be read and the sent data confirmed when the eighth bit data D7 is transferred.

In the two circuits explained above, data is sent serially as temporal variations in the address signal, and they are read by microprocessor 601 after they are converted to parallel data by the hardware, and the completion of data transfer is notified by interrupts.

(3) Configuration that Transfers Data by Setting Each Bit of the Data to Be Transferred by Means of a Data Read Signal The circuit shown in FIG. 36 comprises decoder 1020 that outputs a selection signal when this circuit is selected, decoder 1021 whose inputs are address signals A1–A3 and that is enabled when it receives the selection signal from decoder 1020, and RS flip-flops (RS f/f) 1030 to 1038 that are set by each of the outputs Q0 to Q8 of decoder 1021. Clear signal /CLR output by microprocessor 601 accessing a prescribed address is connected to the reset terminals of RS f/f 1030 to 1038, and the outputs of R/S f/f 1030 to 1037 are connected to the lower byte D0 to D7 of data bus DB29 of microprocessor 601. The output of RS f/f 1038 becomes the interrupt request signal AMDINT0. Before data is transferred from electronic control device 501, microprocessor 601 outputs clear signal/CLR and resets all the RS f/f 1030 to 1038 (output Q=0).

When data is sent from electronic control device 501 in this configuration, each bit Dd (d=0, 1, . . . , 7) of the 1-byte data is checked, and processing is performed that reads data of a corresponding address for level 1 bits. That is, when bit Dd is level 1 in a case in which the top address assigned this circuit is YYYYY0h as shown in FIG. 37, then processing is performed that reads the address

[YYYYY0+2×d]

corresponding to the bit Dd. As a result, that bit Dd is set to level 1. When bit Dd is level 0, then no processing is performed with respect to the address corresponding to that bit.

When the above processing is performed for all bits, each bit of the data to be transferred is set in the RS f/f 1030 to 1037. Following this, electronic control device 501 accesses the address [YYYY10]h. As a result, the interrupt request signal AMDINT0 is output to notify microprocessor 601 that the transfer of data is complete. When it receives this, microprocessor 601 reads the addresses assigned the outputs of the RS f/f 1030 to 1037. Microprocessor 601 then outputs the clear signal /CLR and resets each of the RS f/f 1030 to 1038. This is how data transfer is performed.

In this configuration, the addresses required for data transfer need only be one word. Also, the circuit configuration can be made relatively simple.

(4) Configuration that Transfers Data Using a Counter

The circuit shown in FIG. 38 comprises decoder 1040 that outputs selection signals when this circuit is selected, 8-bit counter 1041 that performs counting by means of the selection signal CS0 from decoder 1040, and inverter 1043 that inverts the other selection signal CS1 from decoder 1040 and inputs it to the clear terminal of counter 1041. The eight outputs Q0 to Q7 of counter 1041 are connected to the lower byte D0 to D7 of data base DB29 of microprocessor 601 via tristate buffer 1045.

When data is transferred from electronic control device 501 to microprocessor 601 in this configuration, electronic control device 501 first performs a read operation on a prescribed address and sets the selection signal CS1 of decoder 1040 to high level, whereby it clears counter 1041 to zero. Following this, processing is performed that reads a number of prescribed addresses equal to the number of data D to be transferred, and the selection signal CS0 is switched on and off a prescribed number of times. As a result, counter 1041 counts this number D and the outputs Q0 to Q7 become equal to the data D to be. transferred. Electronic control device 501 notifies microprocessor 601 that data transfer has been completed by means of an interrupt request signal, which is not shown, or by processing that sets a prescribed flag. When microprocessor 601 receives the interrupt request signal, it enables the output of the tristate buffer 1045 and completes data transfer by reading the output of this counter 1041.

When the amount of data to be transferred becomes large in this embodiment, much time is required for transfer, but only a very few number of addresses need be occupied. In this example, the counter 1041 was cleared to zero by electronic control device 501, but a configuration is also possible in which it is cleared by microprocessor 601, in which case it becomes possible to transfer data by assigning only one address.

(5) Configuration that Transfers Data Using a Control Signal

As shown in FIG. 39, cartridge selection signal /CTRG-SEL that indicates cartridge 503 has been selected can be used as the clock signal of counter 1041. In this example, the address signal is used to clear counter 1041, but by clearing the counter from microprocessor 601 and transferring the start and completion of data transfer via interrupt request signals, data can be transferred without specifying addresses.

In the two circuits described above, an 8-place counter was used, but by using a counter with more places, data of more than 8 bits can be transferred at the same time. Of course, data in units of less than 8 bits can also be transferred, (6) Configuration that Transfers Data by Reproducing a Signal as Received from Outside The circuit shown in FIG. 40 performs the transfer of data by transmitting an image of the signal as received by laser printer 500 from workstation 507 to cartridge 503 when that signal is a parallel signal based on the Centronics standard. FIG. 40 shows, on the left side, part of line buffer 515, which is the interface for electronic control device 501, and, on the right side, that part of cartridge 503 concerned with data transfer. The figure shows line buffer 1051, which outputs address signals A1 to A9 to cartridge 503 by means of selection signal CS0, and tristate buffer 1052, which receives the output of the data bus from cartridge 503 in electronic control device 501 by means of selection signal CS.

The circuit of cartridge 503 comprises latch 1061 that holds address signals A2 to A9 from electronic control device 501 as the data D0 to D7, inverter 1063 that outputs the address signal A1 from electronic control device 501 to clock CLK of latch 1061 as the strobe signal STB, D-type flip-flop 1065 that sets the output Q by means of this clock signal, and latch 1067 that holds the data D5 to D7 of data bus DB29 of microprocessor 601 by selection signal CS2.

Selection signal CS1, which is generated by the microprocessor accessing a prescribed address, is connected to the output enable terminal OE of latch 1061, and the output of latch 1061 is connected as is to the lower byte D0 to D7 of data bus DB29. Therefore, by accessing this address, microprocessor 601 can read the data held in latch 1061. Output Q of D-type flip-flop 1065 becomes the interrupt request signal INT for microprocessor 601, while at the same time it becomes the signal BUSY and can be read by electronic control device 501 as bit D0 of the data from cartridge 503.

When data is transferred using the circuit described above, electronic control device 501, after reading bit D0 and confirming in advance that the signal BUSY is not active high, reflects the data as received from workstation 507 via the Centronics interface, as well as the strobe signal STB, in the address signals A2 to A9 and the address signal A1 and outputs them.

When the output address signals are held in latch 1061, the interrupt request signal INT for microprocessor 601 becomes active, but since this signal becomes the signal BUSY for electronic control device 501, electronic control device 501 holds the signal BUSY as is at the interface with workstation 507 at high level (busy condition). Microprocessor 601, which receives the interrupt request INT, reads the output of latch 1061 and outputs clear signal /CLR. As a result, D-type flip-flop 1065 is reset, and the signal BUSY is inverted to low level. When it reads this, electronic control device 501 inverts the signal BUSY at the interface with workstation 507 to low level. Workstation 507, which is monitoring this signal, judges from the inversion of the signal BUSY to low level that laser printer 500 has received the signal and outputs the next data. By repeating this procedure, the print data output by workstation 507 can be transferred to cartridge 503.

When selection signal CS2 is active, signals /ACK, /ERR and /PE at the Centronics interface can be controlled by outputting prescribed data to bits D5 to D7 of data bus DB29.

In the embodiment described above, the interface with workstation 507 is reproduced as is and is transmitted to cartridge 503, and therefore processing of data transfer in electronic control device 501 can be simplified. Further, since cartridge 503 exchanges data directly with the external device, workstation 507 in this case, that transfers the print data, the handling of errors, etc., is simplified. This example used a Centronics interface, but the same configuration is possible when using an RS-232C or an RS-422C interface or an AppleTalk (trademark of Apple Corporation) interface.

In this embodiment, the notifications of data transfer are all handled as interrupt signals, but as shown in FIG. 41, a configuration is also possible that inputs the signal SS, which indicates a notification of data transfer, directly into the input port of the processor of cartridge 3. In this case, a processor is used that is equipped with an I/O port or a serial communication port. By inputting the data transfer signal directly into the processor 1100, the configuration is simplified.

M. Other

The embodiments explained above concern the application of the invention to a printer, but application of the invention is not limited to printers, e.g., it can also be applied to word processors, personal computers and workstations. In recent years, in addition to expansion slots, many computer-related devices have the ability to accommodate cartridge-type expansion devices such as IC cards. By mounting the accessory control device of the invention in a word processor, personal computer, etc., equipped with an expansion slot, IC card, etc., and shifting processing by the processor of the main unit to processing stored in the memory built into the accessory control device by a monitor command, etc., and processing information together with the processor in the accessory control device, the information processing function can be easily improved, added to or changed. Further, once control is shifted to the accessory control device, the contents of the processing can be changed in any manner, and therefore the functions of devices that have already been purchased can be changed or improved and the software in word processors and other dedicated devices can be upgraded.

In this way, the invention can be applied to all types of devices that employ a processor, e.g., electrical equipment for vehicles, facsimile machines, telephones, electronic notebooks, electronic musical instruments, electronic cameras, translating machines, handy copiers, cash dispensers, remote controllers, calculators and any other information processing device to which an accessory control device can be connected via a connector. If the processor in the main unit of these types of information processing devices has a function that recognizes an accessory control device and transfers its processing to an address prepared in the accessory control device, the accessory control device and information processing device of the invention can be easily realized even in existing electronic devices. Even in cases in which this function is not provided, various means can be considered for shifting the processor of the main unit to processing stored in the accessory control device.

When the 68000 family of processors read data from a prescribed address, data on the data bus is judged to be fixed or not by the signal DTACK returned to the processor of the device (slave) outputting the data. Therefore, when the main unit processor attempts to execute a jump instruction to an absolute address while executing processing stored in ROM in the main unit, the accessory control device analyzes the instruction and detects it as the execution of a jump instruction to an absolute address, and before the original ROM in the main unit can output the target absolute address of the jump to the data bus, the accessory control device outputs the execution address in ROM in the accessory control device to the data bus and returns the signal DTACK to the processor in the main unit, whereby processing is forcibly shifted to after a prescribed address in the accessory control device. Once processing is shifted to ROM in the accessory control device, subsequent processing can be configured in any manner.

This example is premised on the execution of a jump instruction to an absolute address by the processor in the main unit, but since the jump instruction itself comes from ROM in the main unit, a configuration can be employed that supplies a code equivalent to the jump instruction from the accessory control device to the data bus when the instruction is first read from ROM after powering on and also returns the signal DTACK. In these methods, there is a possibility of conflict with the signal DTACK, but the methods can be realized through careful analysis of the bus timing.

In the embodiments described above, the accessory control device is configured as a cartridge capable of being handled as a single unit in which a printed circuit board is housed in a case, but it may also be configured as a single circuit board that mounts in an expansion slot. An accessory control device having multiple connectors can also be realized. In another configuration, the case itself may be configured as a printed circuit board.

The invention is not limited by the above embodiments; e.g., a configuration in which the cartridge, with built-in outline fonts, receives the character point size and other data from the printer, generates a bit image at the specified point size and transfers it to the printer, a configuration in which data received from the electronic device are not subjected to particularly complex processing in the accessory control device but rather are merely stored or displayed, a configuration in which the main printer unit is an ink jet printer, and other configurations are possible as long as they do not deviate from the essential points of the invention.

The invention can be applied to all types of devices that employ a processor, e.g., printers, electrical equipment for vehicles, facsimile machines, telephones, electronic pocketbooks, electronic musical instruments, electronic cameras, translating machines, handy copiers, cash dispensers, remote controllers, calculators and any other information processing device to which an accessory control device can be connected via a connector.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as may fall within the spirit and scope of the subjoined claims.

What is claimed is:

1. An information processing device comprising:
   an electronic device comprising a first processor for performing logic operation, a first memory means for storing software programs executed by the first processor and a connector connected to an address signal line of the first processor; and
   an accessory control device connected to the connector; wherein
   the electronic device further comprises a data output means for outputting data to be transferred to the accessory control device via the connector, and a data output notification means for notifying the accessory control device that data has been output by the data output means; and wherein
   the accessory control device comprises a data fetch means for receiving the notification of data output and fetching the output data;
   at least a control signal line of the first processor is connected to the connector of the electronic device and the data output means is a means that reflects the data to be transferred in the control signal and outputs it; and
   the data fetch means of the accessory control device is a means that fetches the data reflected in the control signal from the control signal that has been output.

2. The information processing device of claim 1 wherein the accessory control device further comprises:
   a second processor that performs processing separate from the first processor; and
   a second memory means for storing software programs executed by the second processor.

3. The information processing device of claim 2 wherein the accessory control device further comprises an interrupt request receiving means for receiving notification from the data output notification means as an interrupt request signal for the second processor.

4. The information processing device of claim 3 wherein the interrupt request receiving means comprises a notification cancel means for cancelling the notification received from the data output notification means when the second processor fetches the data output by the data output means of the electronic device.

5. The information processing device of claim 2 wherein the data output notification means is a means that notifies of data transfer by writing data to a first register readable by the second processor; and
   the data fetch means of the accessory control device comprises:
   a judgment means for judging whether the prescribed data have been written to the first register, and
   a means for fetching data output by the data output means when the prescribed data have been written to the first register.

6. The information processing device of claim 5 wherein the data fetch means of the accessory control device further comprises:
   a notification cancel means for erasing the data in the first register written by the data output notification means when the second processor fetches the data output by the data output means.

7. The information processing device of claim 2 wherein the data output notification means is a means that notifies of data transfer by outputting a signal to the input port of the second processor; and
   the data fetch means of the accessory control device further comprises:
   a judgment means that judges whether the prescribed signal has been input to the input port, and
   a means for fetching the data output by the data output means when the prescribed signal has been input to the input port.

8. The information processing device of claim 7 wherein the data fetch means further comprises:
   a data transfer completion notification means for notifying the first processor of the completion of data transfer when the second processor fetches the data output by the data output means.

9. The information processing device of claim 1 wherein the data output means comprises means for applying the control signal to the accessory control device a number of times corresponding to the data; and
   the data fetch means comprises a counter for reproducing the data by counting said number of times.

10. The information processing device of claim 9 wherein the data ouput means further comprises means for applying an address to the accessory control device to select the accessory control device.

11. The information processing device of claim 1 wherein the accessory control device is equipped with a second memory means that stores a procedure which is executed by the first processor of the electronic device and is the procedure that performs data transfer from the electronic device.

12. The information processing device of claim 2 wherein the accessory control device is configured as a cartridge equipped with at least a printed circuit board on which the second processor is mounted and having a case that houses the printed circuit board to facilitate its use as a single unit.

13. The information processing device of claim 2 wherein the second processor is disposed in a position for good heat dissipation while the accessory control device is installed in the electronic device.

14. The information processing device of claim 1 wherein the accessory control device is equipped with a processed data output means that processes the data fetched by the data fetch means and outputs the data to the electronic device after being processed.

15. An accessory control device connected to an electronic device via a connector provided on the electronic device which is equipped with a first processor for performing logic operation, a first memory means that stores the processing executed by the processor, and control signal line connecting the first processor to the connector, wherein the accessory control device is equipped with a data fetch means that fetches data when the electronic device outputs the data to be transferred to the accessory control device via the control signal line and the connector based on processing by the first processor and notifies the accessory control device of the output of data; and the data fetch means of the accessory control device is equipped with a means that fetches the data reflected in a control signal that is output when the electronic device reflects the data to be transferred in the control signal of the first processor connected through the control signal line to the connector and outputs it.

16. The accessory control device of claim 15 wherein the accessory control device is equipped with second processor that executes processing separate from the first processor of the electronic device, and second memory means that stores the procedure executed by the second processor.

17. The accessory control device of claim 16 wherein the accessory control device is equipped with an interrupt request receiving means that receives the notification from the data output notification means of the electronic device as an interrupt request signal for the second processor.

18. The accessory control device of claim 16 wherein the accessory control device is equipped with an interrupt cancel means that cancels the interrupt request signal when the second processor reads the data output by the electronic device.

19. The accessory control device of claim 16 wherein the accessory control device is equipped with a means that causes the data fetch means to fetch the data output by the electronic device when the notification of data transfer is performed by writing data to a register readable by the second processor.

20. The accessory control device of claim 19 wherein the data fetch means is equipped with a means that erases the data written to the register when the second processor fetches the data output by the electronic device.

21. The accessory control device of claim 16 wherein the accessory control device is equipped with a means that causes the data fetch means to fetch the data output by the electronic device when the notification of data transfer is performed by outputting a signal to the input port of the second processor.

22. The accessory control device of claim 21 wherein the data fetch means is equipped with a means that notifies the first processor of the electronic device of the completion of data transfer when the second processor fetches the data output by the electronic device.

23. An accessory control device connected to an electronic device via a connector provided on the electronic device which is equipped with a first processor for performing load operation and a first memory means that stores the processing executed by the processor, wherein the accessory control device is equipped with a data fetch means that fetches data when the electronic device outputs the data to be transferred to the accessory control device via the connector based on processing by the first processor and notifies the accessory control device of the outer of data;

the data fetch means of the accessory control device is equipped with a means that retches the data reflected in a control signal that is output when the electronic device reflects the data to be transferred in the control signal of the first processor connected to the connector and outputs it;

the electronic device applies the control signal to the accessory control device a number of times corresponding to the data; and the data fetch means comprises a counter for reproducing the data by counting said number of times.

24. The accessory control device of claim 16 wherein the electronic device further applies an address to the accessory control device to select the accessory control device.

25. The accessory control device of claim 15 or 16 wherein the accessory control device is equipped with a second memory means that stores a procedure which is executed by the first processor of the electronic device and is the procedure that performs data transfer from the electronic device to the accessory control device.

26. The accessory control device of claim 16 wherein the accessory control device is configured as a cartridge equipped with a printed circuit board on which the second processor is mounted and having a case that houses the printed circuit board to facilitate its use as a single unit.

27. The accessory control device of claim 16 wherein the second processor is disposed in a position for good heat dissipation while the accessory control device is installed in the electronic device.

28. The accessory control device of claim 15 wherein the accessory control device is equipped with a processed data output means that processes the data fetched by the data fetch means and outputs the data to the electronic device after being processed.

29. The information processing device of claim 1 wherein the electronic device is equipped with a display means that displays at least characters, graphics or color; and the accessory control device is equipped with an image data generation means that generates the image data displayed on the above device based on data transferred from the electronic device.

30. The information processing device of claim 1 wherein the electronic device is a printer that receives print data and prints it.

31. The accessory control device of claim 15 wherein the accessory control device further comprises an image data developing means for developing image data based on data received from the electronic device.

* * * * *

UNITED STATES PATENT AND TRADEMARK OFFICE
CERTIFICATE OF CORRECTION

PATENT NO. : 5,504,669
DATED : April 2, 1996
INVENTOR(S) : Wakabayashi, et. al.

It is certified that error appears in the above-indentified patent and that said Letters Patent is hereby corrected as shown below:

Column 41, line 12, insert --a-- after "and".

Column 42, line 4, change "load" to --logic--.

Signed and Sealed this

Second Day of July, 1996

Attest:

BRUCE LEHMAN

Attesting Officer

Commissioner of Patents and Trademarks